United States Patent
Yan et al.

(10) Patent No.: US 11,503,646 B2
(45) Date of Patent: Nov. 15, 2022

(54) RANDOM ACCESS METHOD AND APPARATUS

(71) Applicant: Huawei Technologies Co., Ltd., Shenzhen (CN)

(72) Inventors: Mao Yan, Chengdu (CN); Huang Huang, Chengdu (CN); Kuandong Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/829,928

(22) Filed: Mar. 25, 2020

(65) Prior Publication Data

US 2020/0229244 A1 Jul. 16, 2020

Related U.S. Application Data

(63) Continuation of application No. PCT/CN2018/109058, filed on Sep. 30, 2018.

(30) Foreign Application Priority Data

Sep. 30, 2017 (CN) .......................... 201710917141.3

(51) Int. Cl.
 *H04W 74/08* (2009.01)
 *H04W 74/00* (2009.01)
(52) U.S. Cl.
 CPC ..... *H04W 74/0833* (2013.01); *H04W 74/008* (2013.01)
(58) Field of Classification Search
 None
 See application file for complete search history.

(56) References Cited

U.S. PATENT DOCUMENTS

| | | | |
|---|---|---|---|
| 9,736,863 B2 | 8/2017 | Zhiyu et al. | |
| 2012/0008575 A1* | 1/2012 | Vujcic | H04W 74/002 |
| | | | 370/329 |

(Continued)

FOREIGN PATENT DOCUMENTS

| | | |
|---|---|---|
| CN | 101478824 A | 7/2009 |
| CN | 101594691 A | 12/2009 |

(Continued)

OTHER PUBLICATIONS

Nokia et al.,"NR4-step RACH procedure",3GPP TSG-RAN WG1#89,Hangzhou,China,R1-1708244,May 15-19, 2017,total 11 pages.

(Continued)

*Primary Examiner* — Jamaal Henson
(74) *Attorney, Agent, or Firm* — Slater Matsil, LLP

(57) ABSTRACT

This application provides a random access method and apparatus. The method includes: receiving, by a terminal, first indication information transmitted by a network device, where the first indication information is used to indicate a random access configuration index; determining, by the terminal, a random access resource based on the random access configuration index; determining, based on an association relationship between the random access resource and a downlink signal, a random access resource corresponding to the downlink signal; and transmitting a random access preamble to the network device based on the random access resource corresponding to the downlink signal.

39 Claims, 27 Drawing Sheets

(56) References Cited

U.S. PATENT DOCUMENTS

| | | | |
|---|---|---|---|
| 2012/0063393 A1 | 3/2012 | Zhongda et al. | |
| 2015/0282215 A1 | 10/2015 | Erik et al. | |
| 2016/0295609 A1 | 10/2016 | Vajapeyam et al. | |
| 2017/0367069 A1* | 12/2017 | Agiwal | H04W 68/005 |
| 2018/0176948 A1* | 6/2018 | Islam | H04W 74/0833 |
| 2018/0241526 A1* | 8/2018 | Chendamarai Kannan | H04L 5/0048 |
| 2018/0324864 A1* | 11/2018 | Jung | H04W 72/005 |
| 2018/0331728 A1* | 11/2018 | Tsai | H04W 24/02 |
| 2018/0368189 A1* | 12/2018 | Narasimha | H04W 56/001 |
| 2020/0037297 A1* | 1/2020 | Pan | H04W 16/28 |
| 2021/0105820 A1* | 4/2021 | Kim | H04B 7/0695 |

FOREIGN PATENT DOCUMENTS

| | | | |
|---|---|---|---|
| CN | 101640922 A | 2/2010 | |
| CN | 101772181 A | 7/2010 | |
| CN | 101841922 A | 9/2010 | |
| CN | 102271418 A | 12/2011 | |
| CN | 108811165 A | 11/2018 | |
| EP | 2214448 A1 | 8/2010 | |
| EP | 3471497 A1 * | 4/2019 | H04W 56/0015 |
| EP | 3471497 A1 | 4/2019 | |
| WO | WO-2018110857 A1 * | 6/2018 | H04B 7/0617 |
| WO | WO-2019062779 A1 * | 4/2019 | H04L 5/0048 |

OTHER PUBLICATIONS

LG Electronics Inc., "Random Access procedure for multi-beam operation", 3GPP TSG-RAN2 WG2 Meeting RAN2#99, R2-1709062, Aug. 21-25, 2017, 3 pages, Berlin,Germany.

Huawei et al., "RACH Procedures and Resource Configuration", 3GPP TSG RAN WG1 Nr Ad Hoc Meeting, R1-1700049, Jan. 16-20, 2017, 8 pages, Spokane,USA.

"3rd Generation Partnership Project; Technical Specification Group Radio Access Network;NR; Physical layer procedures for control (Release 15)", 3GPP TS 38.213 V1.0.0 (Sep. 2017), 16 pages.

Samsung, "Remaining details on PRACH formats", 3GPP TSG RAN WG1 Meeting NR#3 R1-1715913, Sep. 18-21, 2017, 4 pages, Nagoya, Japan.

"3rd Generation Partnership Project; Technical Specification Group Radio Access Network; NR; Physical layer procedures for data (Release 15)", 3GPP TS 38.214 V0.1.1 (Aug. 2017), 36 pages.

"3rd Generation Partnership Project; Technical Specification Group Radio Access Network; NR; Radio Resource Control (RRC); Protocol specification (Release 15)", 3GPP TS 38.331 V0.1.0 (Oct. 2017), 42 pages.

Nokia et al., "WF on RACH Configuration Index", 3GPP TSG RAN WG1 Meeting #88bis, R1 -1706849, Apr. 3-7, 2017, 3 pages, Spokane,USA.

Zte et al., "WF on RACH association", 3GPP TSG RAN WG1 Meeting #88, R1-1703630, Feb. 13-17, 2017, 7 pages, Athens, Greece.

Nokiaet al., "NR Physical Random Access Channel", 3GPP TSG-RAN WG1#88bis, R1 -174942, Apr. 3-7, 2017, 45 pages, Spokane,USA.

Huawei et al., "WF on RACH association", 3GPP TSG RAN WG1 Meeting #88bis, R1-1706782, Apr. 3-7, 2017,3 pages, Spokane,USA.

"3rd Generation Partnership Project; Technical Specification Group Radio Access Network; NR; Physical channels and modulation (Release 15)", 3GPP TS 38.211 V0.1.2 (Aug. 2017), 34 pages.

ZTE et al, "Remaining details of PRACH formats", 3GPP TSG RAN WG1 Meeting NR#3, R1-1715381, Sep. 18-21, 2017, 3 pages, Nagoya, Japan.

NTT Docomo, Inc., "Discussion on remaining details on PRACH formats", 3GPP TSG RAN WG1 Meeting NR#3, R1-1716073, Sep. 18-21, 2017, 5 pages, Nagoya,Japan.

"3rd Generation Partnership Project; Technical Specification Group Radio Access Network; NR;User Equipment (UE) radio transmission and reception; Part 1: Range 1 Standalone (Release 15)", 3GPP TS 38.101-1 V0.0.1 (Aug. 2017), 11 pages.

"3rd Generation Partnership Project; Technical Specification Group Radio Access Network; NR;Base Station (BS) radio transmission and reception (Release 15)", 3GPP TS 38.104 V0.2.0 (Aug. 2017), 20 pages.

Samsung, "Discussion on RACH configuration", 3GPP TSG RAN WG1 Meeting NR#3, R1-1715920, Sep. 18-21, 2017, 4 pages, Nagoya, Japan.

Ericsson, "Remaining details on NR-RACH configurations and formats", 3GPP TSG RAN WG1 NR Ad-Hoc#3, R1-1716154, Sep. 18-21, 2017, 16 pages, Nagoya, Japan.

Ericsson, "NR four-step random access procedure", 3GPP TSG-RAN WG1 NR adhoc, R1-1700299, Jan. 16-20, 2017, R1-1700299, 6 pages, Spokane, USA.

ZTE Corporation et al., "Random access in NR", 3GPP TSG RAN WG2 Meeting #96, R2-167831, Nov. 14-18, 2016, 9 pages, Reno, USA.

Huawei, HiSilicon, "RACH Procedures and Resource Configuration", 3GPP TSG RAN WG1 Meeting #88bis, R1-1704188, Apr. 3-7, 2017, 8 pages, Spokane, USA.

3GPP TS 38.300 V1.0.1 (Oct. 2017), 3rd Generation Partnership Project; Technical Specification Group Radio Access Network; NR; NR and NG-RAN Overall Description; Stage 2 (Release 15), 62 pages.

3GPP TS 38.321 V1.0.0 (Sep. 2017), 3rd Generation Partnership Project; Technical Specification Group Radio Access Network; NR; Medium Access Control (MAC) protocol specification (Release 15), 46 pages.

3GPP TR 38.802 V14.2.0 (Sep. 2017), 3rd Generation Partnership Project; Technical Specification Group Radio Access Network; Study on New Radio Access Technology Physical Layer Aspects(Release 14), 145 pages.

\* cited by examiner

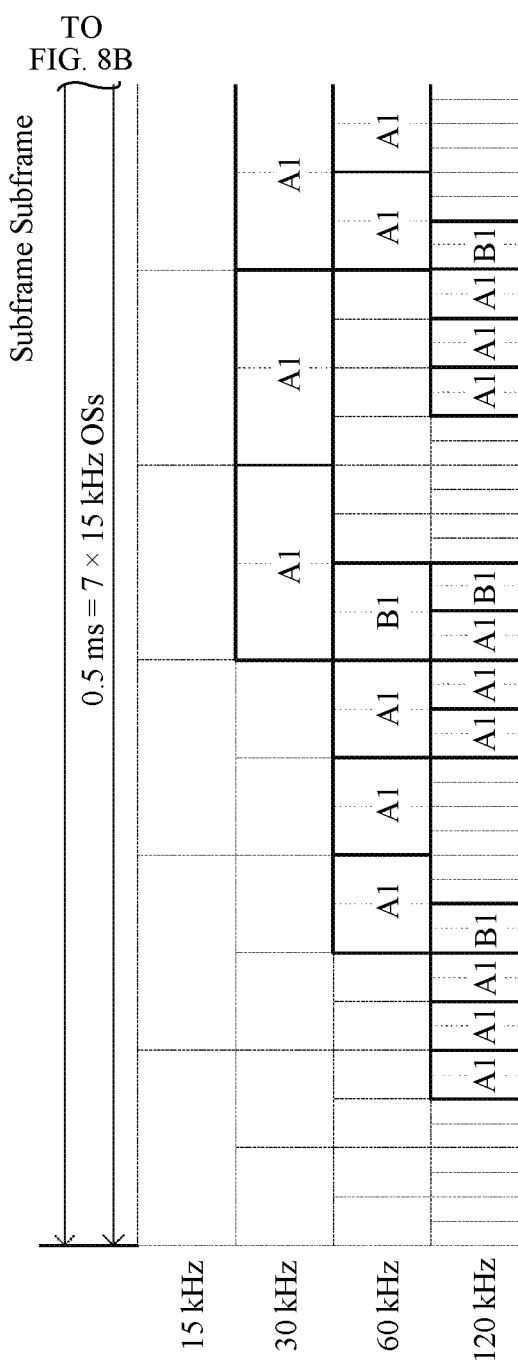

CONT. FROM FIG. 9A

CONT.
FROM

FROM

RANDOM ACCESS METHOD AND APPARATUS

CROSS-REFERENCE TO RELATED APPLICATIONS

This application is a continuation of International Application No. PCT/CN2018/109058, filed on Sep. 30, 2018 which claims priority to Chinese Patent Application No. 201710917141.3, filed on Sep. 30, 2017. The disclosures of the aforementioned applications are hereby incorporated by reference in their entireties.

TECHNICAL FIELD

This application relates to the wireless communications field, and in particular, to a random access method and apparatus.

BACKGROUND

In a multibeam network, before a base station communicates with a terminal, uplink synchronization and downlink synchronization need to be performed first. In a downlink synchronization process, the base station transmits a downlink synchronization signal by using a plurality of transmit beams. The terminal receives and detects the downlink synchronization signal by using one or more receive beams, and determines an optimum downlink transmit-receive beam pair, a downlink time, and system information. However, uplink synchronization is completed by using a random access process. The terminal first transmits a random access signal. The base station obtains an optimum uplink transmit-receive beam pair, an uplink time, and the like by detecting the random access signal, and implements uplink synchronization between the base station and the terminal.

In a current new radio (NR) technology, no appropriate manner is available for determining a random access resource. Therefore, there is a problem that the terminal blindly tries a random access resource when transmitting a random access signal, and a beam mismatch may occur when the base station receives the random access signal. Consequently, efficiency of the random access process is relatively low.

SUMMARY

This application provides a random access method and apparatus, to resolve a problem that efficiency of a random access process is relatively low.

A first aspect of this application provides a random access method, including: receiving, by a terminal, first indication information transmitted by a network device, where the first indication information is used to indicate a random access configuration index; determining, by the terminal, a random access resource based on the random access configuration index; determining, by the terminal based on an association relationship between the random access resource and a downlink signal, a random access resource corresponding to the downlink signal; and transmitting, by the terminal, a random access preamble to the network device based on the random access resource corresponding to the downlink signal.

Optionally, the association relationship between the random access resource and the downlink signal includes an indexing mode of the random access resource.

In a possible implementation, the determining, by the terminal based on an association relationship between the random access resource and a downlink signal, a random access resource corresponding to the downlink signal includes: first determining, by the terminal at a time of the random access resource based on the indexing mode of the random access resource and a quantity of random access resources at a same time, a time t of the random access resource corresponding to the downlink signal, and then determining, at the time t, a frequency position f of the random access resource corresponding to the downlink signal; or first determining, by the terminal within a time of the random access resource in frequency domain based on the indexing mode of the random access resource and a quantity of random access resources at a same time, a frequency position f of the random access resource corresponding to the downlink signal, and then determining, in the frequency position f, a time t of the random access resource corresponding to the downlink signal; or first determining, by the terminal in N slots or subframes in a period of the random access resource based on the indexing mode of the random access resource and a quantity of random access resources at a same time, a time t of the random access resource corresponding to the downlink signal, and then determining, at the time t, a frequency position f of the random access resource corresponding to the downlink signal, where N is an integer greater than 0.

In a possible implementation, the determining, by the terminal, a random access resource based on the random access configuration index includes: determining, by the terminal, a time range of the random access resource based on the random access configuration index and one or more of a subcarrier spacing of the random access preamble, a sequence length of the random access preamble, a maximum quantity of downlink signal blocks, and an actually transmitted downlink signal block.

In a possible implementation, before the transmitting, by the terminal, a random access preamble to the network device based on the random access resource corresponding to the downlink signal, the method further includes: determining, by the terminal, a time of the random access resource in the time range of the random access resource based on preset structure information of a slot or a subframe; or receiving, by the terminal, second indication information transmitted by the network device, where the second indication information includes structure information of a random access slot or subframe; and determining, by the terminal, a time of the random access resource in the time range of the random access resource based on the structure information of the random access slot or subframe.

In a possible implementation, before the transmitting, by the terminal, a random access preamble to the network device based on the random access resource corresponding to the downlink signal, the method further includes: obtaining, by the terminal, a preset indexing mode of the random access resource; or receiving, by the terminal, third indication information transmitted by the network device, where the third indication information is used to indicate the indexing mode of the random access resource.

In a possible implementation, the method further includes: determining, by the terminal, a format and a system frame position of the random access preamble in the time range of the random access resource based on the random access configuration index and one or more of the subcarrier spacing of the random access preamble, the sequence length of the random access preamble, the maximum quantity of downlink signal blocks, and the actually transmitted downlink signal block.

In a possible implementation, the method further includes: receiving, by the terminal, fourth indication information transmitted by the network device, where the fourth indication information is used to indicate the actually transmitted downlink signal block.

A second aspect of this application provides a random access method, including: generating, by a network device, first indication information, where the first indication information is used to indicate a random access configuration index; and transmitting, by the network device, the first indication information to a terminal, where a random access resource of the terminal is determined by the terminal based on the random access configuration index, and a random access resource corresponding to a downlink signal is determined by the terminal based on an association relationship between the random access resource and the downlink signal. That is, the random access configuration index is used to determine the random access resource of the terminal.

In a possible implementation, the association relationship between the random access resource and the downlink signal includes an indexing mode of the random access resource.

In a possible implementation, the indexing mode of the random access resource includes: first determining, at a time of the random access resource based on the indexing mode of the random access resource and a quantity of random access resources at a same time, a time of the random access resource corresponding to the downlink signal, and then determining, at the time t, a frequency position f of the random access resource corresponding to the downlink signal; or first determining, within a time of the random access resource in frequency domain based on the indexing mode of the random access resource and a quantity of random access resources at a same time, a frequency position f of the random access resource corresponding to the downlink signal, and then determining, in the frequency position f, a time t of the random access resource corresponding to the downlink signal; or first determining, in N slots or subframes in a period of the random access resource based on the indexing mode of the random access resource and a quantity of random access resources at a same time, a time t of the random access resource corresponding to the downlink signal, and then determining, at the time t, a frequency position f of the random access resource corresponding to the downlink signal, where N is an integer greater than 0.

In a possible implementation, a time range of the random access resource is determined by the terminal based on the random access configuration index and one or more of a subcarrier spacing of a random access preamble, a sequence length of a random access preamble, a maximum quantity of downlink signal blocks, and an actually transmitted downlink signal block.

In a possible implementation, the method further includes: transmitting, by the network device, second indication information to the terminal, where the second indication information includes structure information of a random access slot or subframe, and a time of the random access resource is determined in the time range of the random access resource based on the structure information of the random access slot or subframe.

In a possible implementation, the method further includes: transmitting, by the network device, third indication information to the terminal, where the third indication information is used to indicate the indexing mode of the random access resource, and the random access resource corresponding to the downlink signal is determined within the time of the random access resource based on the indexing mode of the random access resource.

In a possible implementation, a format and a system frame position of the random access preamble in the time range of the random access resource are determined by the terminal based on the random access configuration index and one or more of the subcarrier spacing of the random access preamble, the sequence length of the random access preamble, the maximum quantity of downlink signal blocks, and the actually transmitted downlink signal block.

In a possible implementation, the method further includes: transmitting, by the network device, fourth indication information to the terminal, where the fourth indication information is used to indicate the actually transmitted downlink signal block.

A third aspect of this application provides a random access method, including: receiving, by a terminal, third indication information transmitted by a network device, where the third indication information is used to indicate an indexing mode of a current random access resource; determining, by the terminal based on a random access configuration index delivered by the network device, a slot in which the random access resource is located; determining, by the terminal based on the indexing mode of the current random access resource, in the slot in which the random access resource is located, a random access resource corresponding to a downlink signal; and transmitting, by the terminal, a random access preamble to the network device based on the random access resource corresponding to the downlink signal.

Optionally, the determining, by the terminal based on a random access configuration index delivered by the network device, a slot in which the random access resource is located includes: determining, by the terminal based on the random access configuration index and one or more of a subcarrier spacing of the random access preamble, a maximum quantity of downlink signal blocks, and an actually transmitted downlink signal block, the slot in which the random access resource is located.

Optionally, the terminal receives first indication information transmitted by the network device, where the first indication information is used to indicate the random access configuration index.

Optionally, the determining, by the terminal based on the indexing mode of the current random access resource, in the slot in which the random access resource is located, a random access resource corresponding to a downlink signal includes: first determining, by the terminal based on the indexing mode of the current random access resource and a quantity of random access resources at a same time, a time t of the random access resource in the slot in which the random access resource is located, and then determining a frequency position f of the random access resource at the time t; or first determining, by the terminal based on the indexing mode of the current random access resource and a quantity of random access resources at a same time, a frequency position f of the random access resource in the slot in which the random access resource is located in frequency domain, and then determining a time t in the frequency position f of the random access resource; or first determining, by the terminal based on the indexing mode of the current random access resource and a quantity of random access resources at a same time, a time t of the random access resource in N slots in a period of the random access resource, and then determining a frequency position f of the random access resource at the time t, where N is an integer greater than 0.

Optionally, the determining, by the terminal based on the indexing mode of the current random access resource, in the slot in which the random access resource is located, a random access resource corresponding to a downlink signal includes: determining, by the terminal based on an association relationship between the downlink signal and the random access resource and the indexing mode of the current random access resource, in the slot in which the random access resource is located, the random access resource corresponding to the downlink signal.

Optionally, the association relationship may include any one of the following: the random access resources at the same time correspond to one downlink signal; or the random access resources at the same time correspond to a plurality of downlink signals; or the random access resources at the same time correspond to all downlink signals.

Optionally, the method further includes: determining, by the terminal, a format and a system frame position of the random access preamble in a random access slot based on the random access configuration index and one or more of a subcarrier spacing of the random access preamble, a maximum quantity of downlink signal blocks, and an actually transmitted downlink signal block.

Optionally, the method further includes: receiving, by the terminal, fourth indication information transmitted by the network device, where the fourth indication information is used to indicate the actually transmitted downlink signal block.

A fourth aspect of this application provides a random access method, including: generating, by a network device, third indication information, where the third indication information is used to indicate an indexing mode of a current random access resource; and transmitting, by the network device, the third indication information to a terminal, so that the terminal determines, based on the indexing mode of the current random access resource, in a slot in which the random access resource is located, a random access resource corresponding to a downlink signal.

Optionally, the slot in which the random access resource is located is determined by the terminal based on a random access configuration index and one or more of a subcarrier spacing of the random access preamble, a maximum quantity of downlink signal blocks, and an actually transmitted downlink signal block.

Optionally, the method further includes: transmitting, by the network device, first indication information to the terminal, where the first indication information includes the random access configuration index.

Optionally, the indexing mode of the current random access resource instructs the terminal to: first determine, based on the indexing mode of the current random access resource and a quantity of random access resources at a same time, a time t of the random access resource in all slots in a random access period, and then determine a frequency position f of the random access resource at the time t; or first determine, based on the indexing mode of the current random access resource and a quantity of random access resources at a same time, a frequency position f of the random access resource in frequency domain, and then determine a time t in the frequency position f of the random access resource; or first determine, based on the indexing mode of the current random access resource and a quantity of random access resources at a same time, a time t of the random access resource in N slots in a period of the random access resource, and then determining a frequency position f of the random access resource at the time t, where N is an integer greater than 0.

Optionally, the random access resource corresponding to the downlink signal is specifically determined by the terminal based on an association relationship between the downlink signal and the random access resource and the indexing mode of the current random access resource, in the slot in which the random access resource is located.

Optionally, the association relationship includes any one of the following: the random access resources at the same time correspond to one downlink signal; or the random access resources at the same time correspond to a plurality of downlink signals; or the random access resources at the same time correspond to all downlink signals.

Optionally, a format and a system frame position of the random access preamble in a random access slot are determined based on the random access configuration index and one or more of a subcarrier spacing of the random access preamble, a maximum quantity of downlink signal blocks, and an actually transmitted downlink signal block.

Optionally, the method further includes: transmitting, by the network device, fourth indication information to the terminal, where the fourth indication information is used to indicate the actually transmitted downlink signal block.

A fifth aspect of this application provides a random access method, including: determining, by a terminal based on an association relationship between a random access resource and a downlink signal, a random access resource corresponding to the downlink signal; and transmitting, by the terminal, a random access preamble to a network device based on the random access resource corresponding to the downlink signal.

Optionally, the association relationship between the random access resource and the downlink signal includes an indexing mode of the random access resource.

Optionally, the determining, by a terminal based on an association relationship between a random access resource and a downlink signal, a random access resource corresponding to the downlink signal includes: first determining, by the terminal based on the indexing mode of the random access resource and a quantity of random access resources at a same time, a time t of the random access resource at a time of the random access resource, and then determining a frequency position f of the random access resource at the time t; or first determining, by the terminal based on the indexing mode of the random access resource and a quantity of random access resources at a same time, a frequency position f of the random access resource within a time of the random access resource in frequency domain, and then determining a time t in the frequency position f of the random access resource; or first determining, by the terminal based on the indexing mode of the random access resource and a quantity of random access resources at a same time, a time t of the random access resource in N slots in a period in which the random access resource is located, and then determining a frequency position f of the random access resource at the time t, where N is an integer greater than 0.

A sixth aspect of this application provides a random access apparatus, where the apparatus includes a module or a means configured to perform the method provided in the first aspect or each implementation of the first aspect.

A seventh aspect of this application provides a random access apparatus, where the apparatus includes a module or a means configured to perform the method provided in the second aspect or each implementation of the second aspect.

An eighth aspect of this application provides a random access apparatus, where the apparatus includes a module or a means configured to perform the method provided in the third aspect or each implementation of the third aspect.

A ninth aspect of this application provides a random access apparatus, where the apparatus includes a module or a means configured to perform the method provided in the fourth aspect or each implementation of the fourth aspect.

A tenth aspect of this application provides a random access apparatus, where the apparatus includes a module or a means configured to perform the method provided in the fifth aspect or each implementation of the fifth aspect.

An eleventh aspect of this application provides a random access apparatus, where the apparatus includes a processor and a memory. The memory is configured to store a program, and the processor invokes the program stored in the memory to perform the method provided in the first aspect of this application.

A twelfth aspect of this application provides a random access apparatus, where the apparatus includes a processor and a memory. The memory is configured to store a program, and the processor invokes the program stored in the memory to perform the method provided in the second aspect of this application.

A thirteenth aspect of this application provides a random access apparatus, where the apparatus includes a processor and a memory. The memory is configured to store a program, and the processor invokes the program stored in the memory to perform the method provided in the third aspect of this application.

A fourteenth aspect of this application provides a random access apparatus, where the apparatus includes a processor and a memory. The memory is configured to store a program, and the processor invokes the program stored in the memory to perform the method provided in the fourth aspect of this application.

A fifteenth aspect of this application provides a random access apparatus, where the apparatus includes a processor and a memory. The memory is configured to store a program, and the processor invokes the program stored in the memory to perform the method provided in the fifth aspect of this application.

A sixteenth aspect of this application provides a random access apparatus, including at least one processing element (or chip) configured to perform the method in the first aspect.

A seventeenth aspect of this application provides a random access apparatus, including at least one processing element (or chip) configured to perform the method in the second aspect.

An eighteenth aspect of this application provides a random access apparatus, including at least one processing element (or chip) configured to perform the method in the third aspect.

A nineteenth aspect of this application provides a random access apparatus, including at least one processing element (or chip) configured to perform the method in the fourth aspect.

A twentieth aspect of this application provides a random access apparatus, including at least one processing element (or chip) configured to perform the method in the fifth aspect.

A twenty-first aspect of this application provides a program, where the program is used to perform the method in the first aspect.

A twenty-second aspect of this application provides a computer storage medium, including the program in the twenty-first aspect.

A twenty-third aspect of this application provides a program, where the program is used to perform the method in the second aspect.

A twenty-fourth aspect of this application provides a computer storage medium, including the program in the twenty-third aspect.

A twenty-fifth aspect of this application provides a program, where the program is used to perform the method in the third aspect.

A twenty-sixth aspect of this application provides a computer storage medium, including the program in the twenty-fifth aspect.

A twenty-seventh aspect of this application provides a program, where the program is used to perform the method in the fourth aspect.

A twenty-eighth aspect of this application provides a computer storage medium, including the program in the twenty-seventh aspect.

A twenty-ninth aspect of this application provides a program, where the program is used to perform the method in the fifth aspect.

A thirtieth aspect of this application provides a computer storage medium, including the program in the twenty-ninth aspect.

According to the random access method and apparatus provided in this application, the network device generates the first indication information, where the first indication information is used to indicate the random access configuration index, and the network device further transmits the first indication information to the terminal; and the terminal determines the random access resource based on the random access configuration index, determines, based on the association relationship between the random access resource and the downlink signal, the random access resource corresponding to the downlink signal, and transmits the random access preamble to the network device based on the random access resource corresponding to the downlink signal. In this way, the random access resource is determined based on the random access configuration index indicated by the network device, and then the random access resource corresponding to the downlink signal is further determined based on the association relationship between the downlink signal and the random access resource. Therefore, a problem that the terminal blindly tries a random access resource when transmitting the random access preamble is avoided, and the network device side can receive the random access preamble on the random access resource corresponding to the downlink signal. This avoids a beam mismatch, and improves efficiency of a random access process.

BRIEF DESCRIPTION OF THE DRAWINGS

FIG. 8A and FIG. 8B are a schematic structural diagram of a random access preamble in a random access method according to another embodiment of this application;

DETAILED DESCRIPTION OF ILLUSTRATIVE EMBODIMENTS

Embodiments of this application may be applied to a wireless communications system. It should be noted that, the wireless communications system mentioned in the embodiments of this application includes but is not limited to a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, and three main application scenarios in a next-generation 5G mobile communications system: enhanced mobile broadband (eMBB), URLLC, and massive machine-type communications (mMTC).

In the embodiments of this application, a terminal (terminal device) includes but is not limited to a mobile station (MS), a mobile terminal, a mobile telephone, a handset, portable equipment, or the like. The terminal may communicate with one or more core networks through a radio access network (RAN). For example, the terminal may be a mobile telephone (or referred to as a "cellular" phone), or a computer having a wireless communication function. Alternatively, the terminal may be a portable, pocket-sized, handheld, computer built-in, or in-vehicle mobile apparatus or device.

Figure 1:
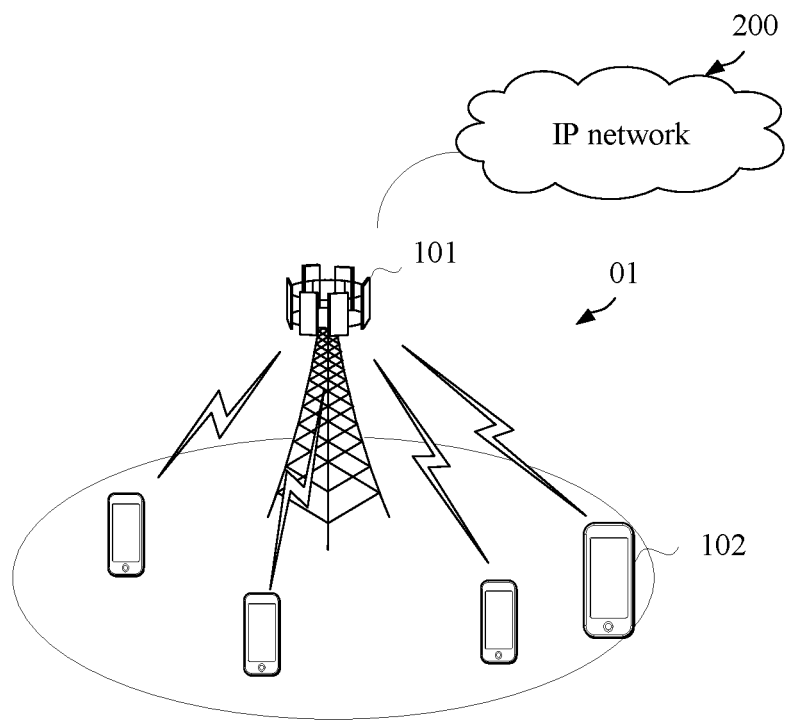
FIG. 1 is a schematic architectural diagram of a communications system according to this application.

FIG. 1 is a schematic architectural diagram of a communications system according to this application.

As shown in FIG. 1, the communications system 01 includes a network device 101 and a terminal 102. When the communications system 01 includes a core network, the network device 101 may be further connected to the core network. The network device 101 may further communicate with an internet protocol (IP) network 200, for example, the Internet, a private IP network, or another data network. The network device provides a service for a terminal within its coverage. For example, referring to FIG. 1, the network device 101 provides wireless access for one or more terminals within the coverage of the network device 101. In addition, network devices may further communicate with each other.

The network device 101 may be a device configured to communicate with the terminal. For example, the network device may be a base transceiver station (BTS) in a GSM system or a CDMA system, or may be a NodeB (NB) in a WCDMA system, or may be an evolved NodeB (Evolved NodeB, eNB or eNodeB) in an LTE system, or a network-side device in a future 5G network. Alternatively, the network device may be a relay station, an access point, an in-vehicle device, or the like. In a device-to-device (Device to Device, D2D) communications system, the network device may be alternatively a terminal having a function of a base station. The terminal may include various handheld devices, in-vehicle devices, wearable devices, and computing devices that have wireless communication functions, or another processing device connected to a wireless modem, and user equipment (UE), mobile stations (MS), and the like in various forms.

This application provides a new random access method. The method may further correspond to a future 5G proposal. For example, the NR PRACH configuration can consider to reduce the candidate subframe numbers at each RACH resource time density and provide more options in time density. For another example, the time slot number and OFDM symbol number should be defined for the PRACH resources, NR should strive to simplify the configuration and overhead. For example, by defining a finite number of candidate PRACH resource time patterns in a subframe, the time slot number and OFDM symbol number for each pattern are predefined.

Figure 2:
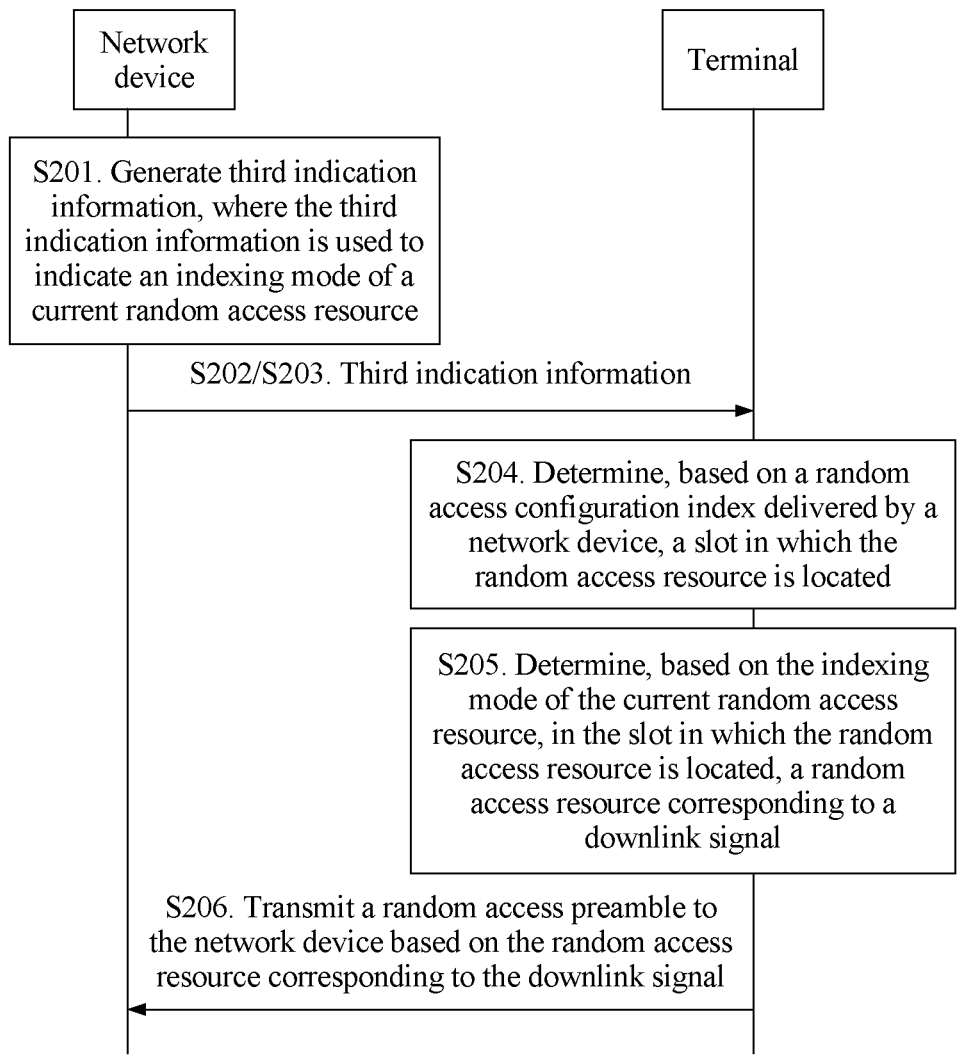
FIG. 2 is a schematic flowchart of a random access method according to an embodiment of this application.

FIG. 2 is a schematic flowchart of a random access method according to an embodiment of this application. As shown in FIG. 2, the method includes the following steps.

S201. A network device generates third indication information, where the third indication information is used to indicate an indexing mode of a current random access resource.

A plurality of indexing modes of random access resources may be preconfigured. After an indexing mode that needs to be used currently is determined, the third indication information is generated. Optionally, the third indication information carries an identifier of the indexing mode of the random access resource.

S202. The network device transmits the third indication information to a terminal.

S203. The terminal receives the third indication information transmitted by the network device.

S204. The terminal determines, based on a random access configuration index delivered by the network device, a slot in which the random access resource is located.

A mapping relationship between the random access configuration index and the slot in which the random access resource is located may be configured for the terminal in advance. After obtaining the random access configuration index, the terminal may determine, based on the configured mapping relationship between the random access configuration index and the slot in which the random access resource is located, the slot in which the random access resource is located.

Optionally, one random access configuration index may correspond to one or more slots.

S205. The terminal determines, based on the indexing mode of the current random access resource, in the slot in which the random access resource is located, a random access resource corresponding to a downlink signal.

After determining the slot in which the random access resource is located, the terminal may determine, based on the indexing mode of the current random access resource that is indicated by the network device, in the slot in which the random access resource is located, the random access resource corresponding to the downlink signal.

S206. The terminal transmits a random access preamble to the network device based on the random access resource corresponding to the downlink signal.

Optionally, in another implementation, the terminal may determine, based on the random access configuration index delivered by the network device, the slot in which the random access resource is located, and the terminal further transmits the random access preamble to the network device in the slot in which the random access resource is located. That is, the network device does not need to indicate the indexing mode, and the random access preamble is transmitted after the slot in which the random access resource is located is determined directly based on the random access configuration index.

In still another implementation, the terminal may receive the third indication information transmitted by the network device, where the third indication information indicates the indexing mode of the current random access resource; and the terminal determines, based on the indexing mode of the current random access resource, the random access resource corresponding to the downlink signal, and further transmits the random access preamble to the network device based on the random access resource corresponding to the downlink signal. That is, the terminal directly determines, based on the indexing mode indicated by the network device, the random access resource corresponding to the downlink signal, where the determining is not limited to the slot in which the random access resource is located, and the determining may be in a random access period or in entire time domain or the like.

In this embodiment, the network device transmits the third indication information to the terminal, where the third indication information indicates the indexing mode of the current random access resource; and the terminal determines, based on the random access configuration index delivered by the network device, the slot in which the random access resource is located, determines, based on the indexing mode of the current random access resource, in the slot in which the random access resource is located, the random access resource corresponding to the downlink signal, and further transmits the random access preamble to the network device based on the random access resource corresponding to the downlink signal. In this way, the network device indicates the indexing mode of the current random access resource, and the terminal can determine, based on the indexing mode of the current random access resource, in the slot in which the random access resource is located, the random access resource corresponding to the downlink signal. Therefore, a problem that the terminal blindly tries a random access resource when transmitting the random access preamble is avoided, and the network device side can receive the random access preamble on the random access resource corresponding to the downlink signal. This avoids a beam mismatch, and improves efficiency of a random access process.

Figure 3:
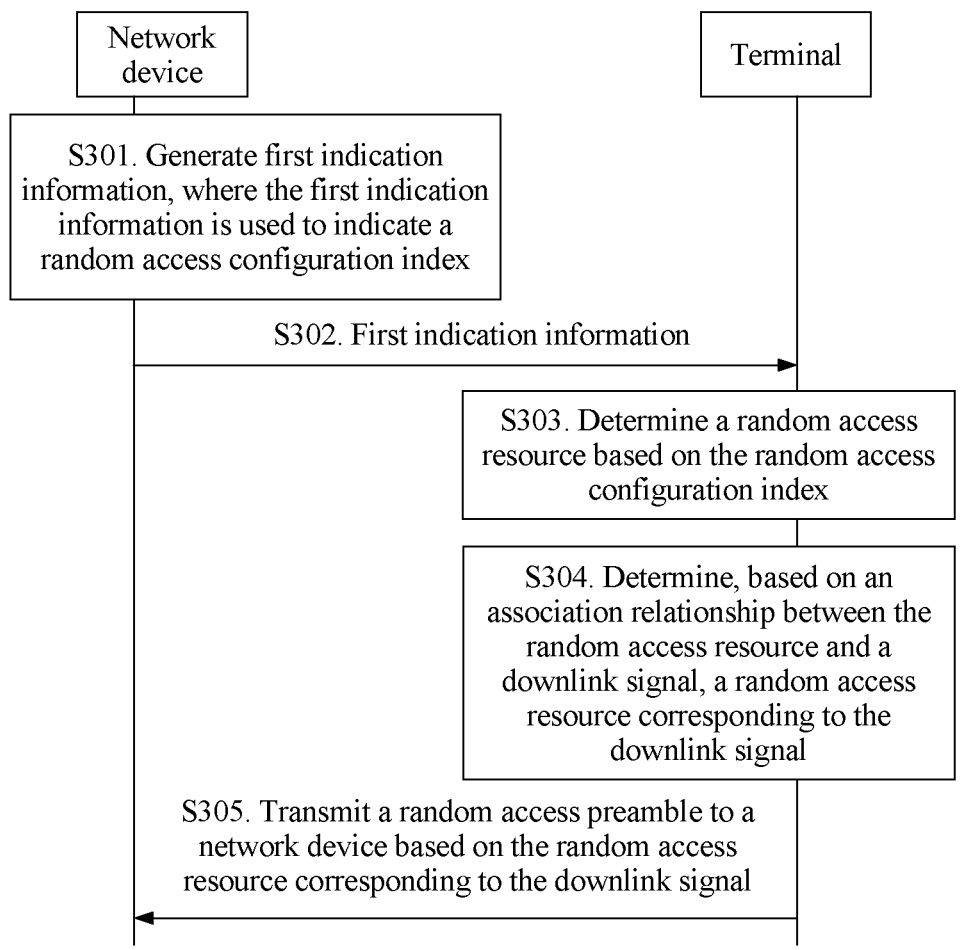
FIG. 3 is a schematic flowchart of a random access method according to another embodiment of this application.

FIG. 3 is a schematic flowchart of a random access method according to another embodiment of this application. As shown in FIG. 3, the method includes the following steps.

S3001. A network device generates first indication information, where the first indication information is used to indicate a random access configuration index.

S302. The network device transmits the first indication information to a terminal.

S303. The terminal determines a random access resource based on the random access configuration index.

The random access configuration index is used by the terminal to determine the random access resource of the terminal. Herein the terminal may first determine a random access resource in a relatively large range, for example, all random access resources in a random access period.

S304. The terminal determines, based on an association relationship between the random access resource and a downlink signal, a random access resource corresponding to the downlink signal.

The terminal receives a plurality of downlink signals transmitted by the network device. Herein a random access resource corresponding to a downlink signal may be determined based on an association relationship between the random access resource and the downlink signal.

S305. The terminal transmits a random access preamble to the network device based on the random access resource corresponding to the downlink signal.

In this embodiment, the network device generates the first indication information, where the first indication information is used to indicate the random access configuration index, and the network device further transmits the first indication information to the terminal; and the terminal determines the random access resource based on the random access configuration index, determines, based on the association relationship between the random access resource and the downlink signal, the random access resource corresponding to the downlink signal, and transmits the random access preamble to the network device based on the random access resource corresponding to the downlink signal. In this way, the random access resource is determined based on the random access configuration index indicated by the network device, and then the random access resource corresponding to the downlink signal is further determined based on the association relationship between the downlink signal and the random access resource. Therefore, a problem that the terminal blindly tries a random access resource when transmitting the random access preamble is avoided, and the network device side can receive the random access preamble on the random access resource corresponding to the downlink signal. This avoids a beam mismatch, and improves efficiency of a random access process.

Optionally, the association relationship between the random access resource and the downlink signal includes an indexing mode of the random access resource.

In the foregoing embodiment, the random access (RACH) resource may include information such as a random access time and a random access frequency. The random access time may be an orthogonal frequency division multiplexing (OFDM) symbol, a mini-slot, a slot, a subframe, or a time period whose duration is H basic time units, and may indicate a time required for transmitting a predefined random access preamble. The random access frequency indicates a bandwidth required for transmitting a predefined random access preamble. H is greater than 0. In an implementation, one random access resource is identified by two dimensions: a random access time and a random access frequency, that is, one random access resource is defined by one random access time and one random access frequency. In another implementation, a plurality of random access resources may be defined by one random access time and one random access frequency. This is not limited. In another implementation, M2 random access resources are defined by M1 random access times and M1 random access frequencies, where M1 is not equal to M2. Optionally, the network device indicates a quantity M2 of random access resources at each random access time.

A random access resource may also be referred to as a random access opportunity (RACH occasion or RACH transmission occasion or RACH opportunity or RACH chance, RO), or a random access preamble of one or more sets on a random access time-frequency resource.

The indexing mode of the random access resource may include the following: (1) first determining, at a time of the random access resource, a time t of the random access resource corresponding to the downlink signal, and then determining, at the time t, a frequency position f of the random access resource corresponding to the downlink signal; (2) first determining, within a time of the random access resource in frequency domain, a frequency position f of the random access resource corresponding to the downlink signal, and then determining, in the frequency position f, a time t of the random access resource corresponding to the downlink signal; or (3) first determining, in N slots or subframes in a period of the random access resource, a time t of the random access resource corresponding to the downlink signal, and then determining, at the time t, a frequency position f of the random access resource corresponding to the downlink signal, where N is an integer greater than 0; and then determining, in next N slots or subframes, a time t of a random access resource corresponding to a downlink signal, and then determining, at the time t, a frequency position f of the random access resource corresponding to the downlink signal, and so on, where N is an integer greater than 0. Optionally, N is configured by the network device, or is a predefined or prestored value, or is obtained by pre-defining or prestoring. The next N slots and the first N slots may be consecutive, or may be separated by one or more slots. This is not limited herein.

An indexing mode of a current random access resource may be one of the foregoing indexing modes, and is specifically indicated by the network device.

The network device transmits a plurality of downlink signals to the terminal. After determining a downlink signal, the terminal determines, based on the indexing mode of the current random access resource, in a slot in which the random access resource is located, a random access resource corresponding to the downlink signal.

Assuming that one downlink signal is associated with F random access resources, if a fixed association relationship between a downlink signal and a random access resource is used, an index of a random access resource associated with a downlink signal whose index is k may be expressed as (k−1)*F+(0:F−1), where "0:F−1" indicates all integers from 0 to F−1, and k and F are integers greater than 0.

A specific example is as follows:

(1) That the terminal determines, based on an association relationship between the random access resource and a downlink signal, a random access resource corresponding to the downlink signal may be as follows: The terminal first determines, at the time of the random access resource based on the indexing mode of the current random access resource and a quantity of random access resources at a same time, the time t of the random access resource corresponding to the downlink signal, and then determines, at the time t, the frequency position f of the random access resource corresponding to the downlink signal.

Figure 4:
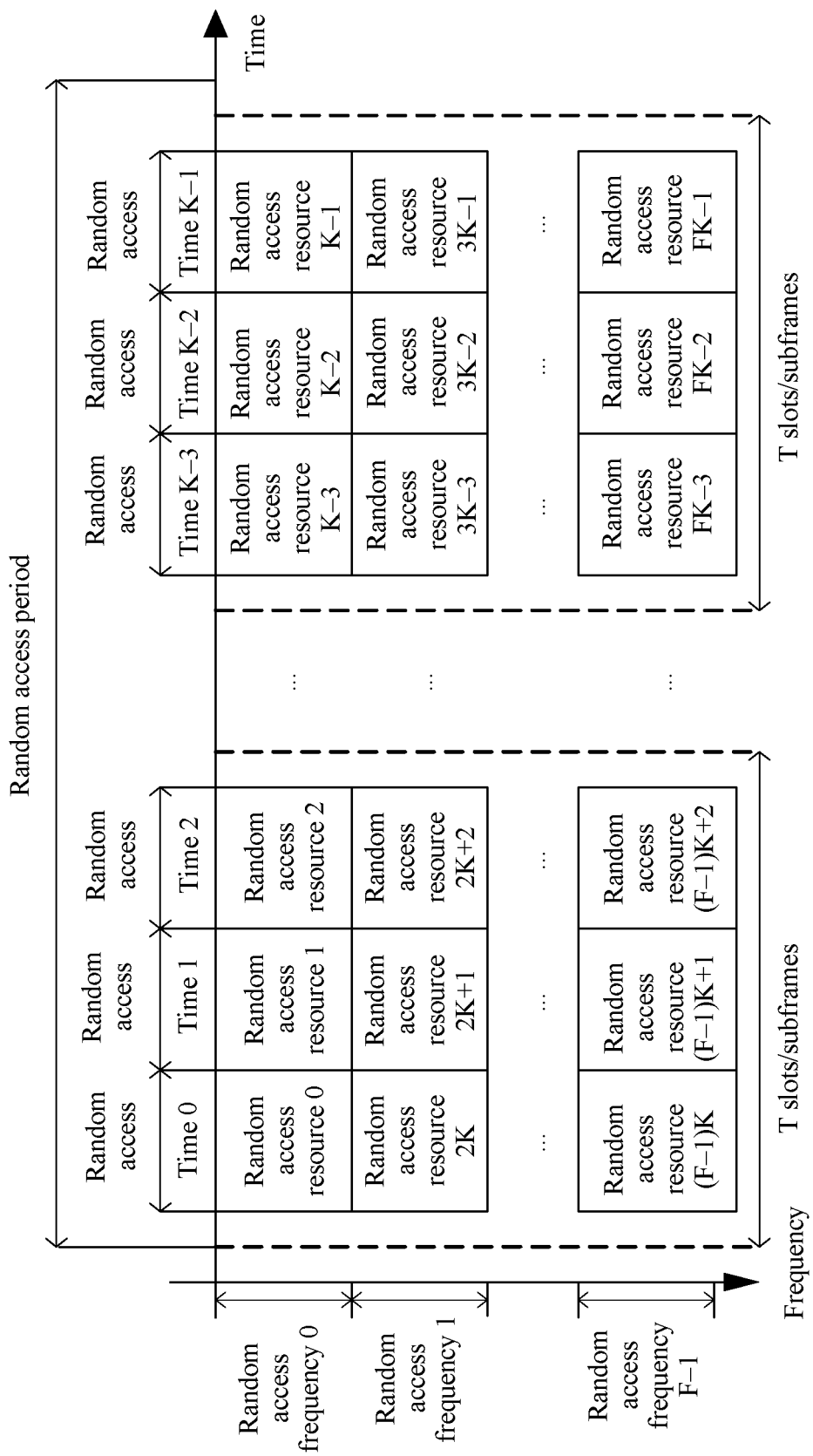
FIG. 4 is a schematic diagram of a random access resource index in a random access method according to an embodiment of this application.

FIG. 4 is a schematic diagram of a random access resource index in a random access method according to an embodiment of this application.

By default, an association relationship between a downlink signal and a random access resource is a fixed relationship. It is assumed that there are a plurality of slots in which random access resources in one random access period are located, and that there are a plurality of random access times in one slot, and that there are also a plurality of random access resources in frequency domain at one random access time.

As shown in FIG. 4, there are F*K random access resources in an entire random access period, and correspondingly, there are K downlink signals, where K is an integer greater than 0. First, in slots in which the random access resources are located at a first frequency having random access resources, times t of the random access resources in the slots may be determined sequentially based on the indexing mode in (1). Specifically, first, a time of a random access resource is determined in a first slot in which a random access resource is located at the first frequency having random access resources, and then a time of a random access resource is determined in a second slot in which a random access resource is located at the first frequency having random access resources, and so on. After all random access resources at the first frequency having random access resources are determined, a same operation is performed on a second frequency having random access resources, until all random access resources in the random access period are determined.

In this application, the random access resource is a time and a frequency at which a random access preamble may be transmitted. Alternatively, the random access resource may be one or more sets including random access preambles at a random access time and a random access frequency. The time may be at least one of a subframe, a slot, a mini-slot, and an OFDM symbol. When the time is a slot, a mini-slot, or an OFDM symbol, the time may be determined based on a subcarrier of uplink or downlink data in the subframe/slot/mini-slot, or may be determined based on a subcarrier of a random access preamble. For example, when a subcarrier spacing of the random access preamble is 15 kHz, a corresponding slot is 1 ms; or when a subcarrier spacing of the random access preamble is $15 \times 2^u$ kHz, a corresponding slot is $2^{-u}$ ms, where u is an index of the subcarrier spacing.

In this application, the downlink signal may be at least one of a synchronization signal block (SS block) and a channel state information reference signal (CSI-RS). The SS block may correspond to one or more OFDM symbols. The SS block includes at least one of the following: a primary synchronization signal (PSS), a secondary synchronization signal (SSS), a physical broadcast channel (PBCH), and a demodulation reference signal (DMRS). The SS block may also be referred to as a synchronization signal/physical broadcast channel (SS/PBCH) block.

In this application, the random access period is also referred to as a random access resource period, and may be a random access resource time period defined in a standard, or a time period in which a random access resource appears, or a minimum period in which random access resources associated with a same downlink signal appear.

(2) That the terminal determines, based on an association relationship between the random access resource and a downlink signal, a random access resource corresponding to the downlink signal may be as follows: The terminal first determines, within the time of the random access resource in a frequency domain based on the indexing mode of the random access resource and a quantity of random access resources at a same time, the frequency position f of the random access resource corresponding to the downlink signal, and then determines, in the frequency position f, the time t of the random access resource corresponding to the downlink signal.

Figure 5:
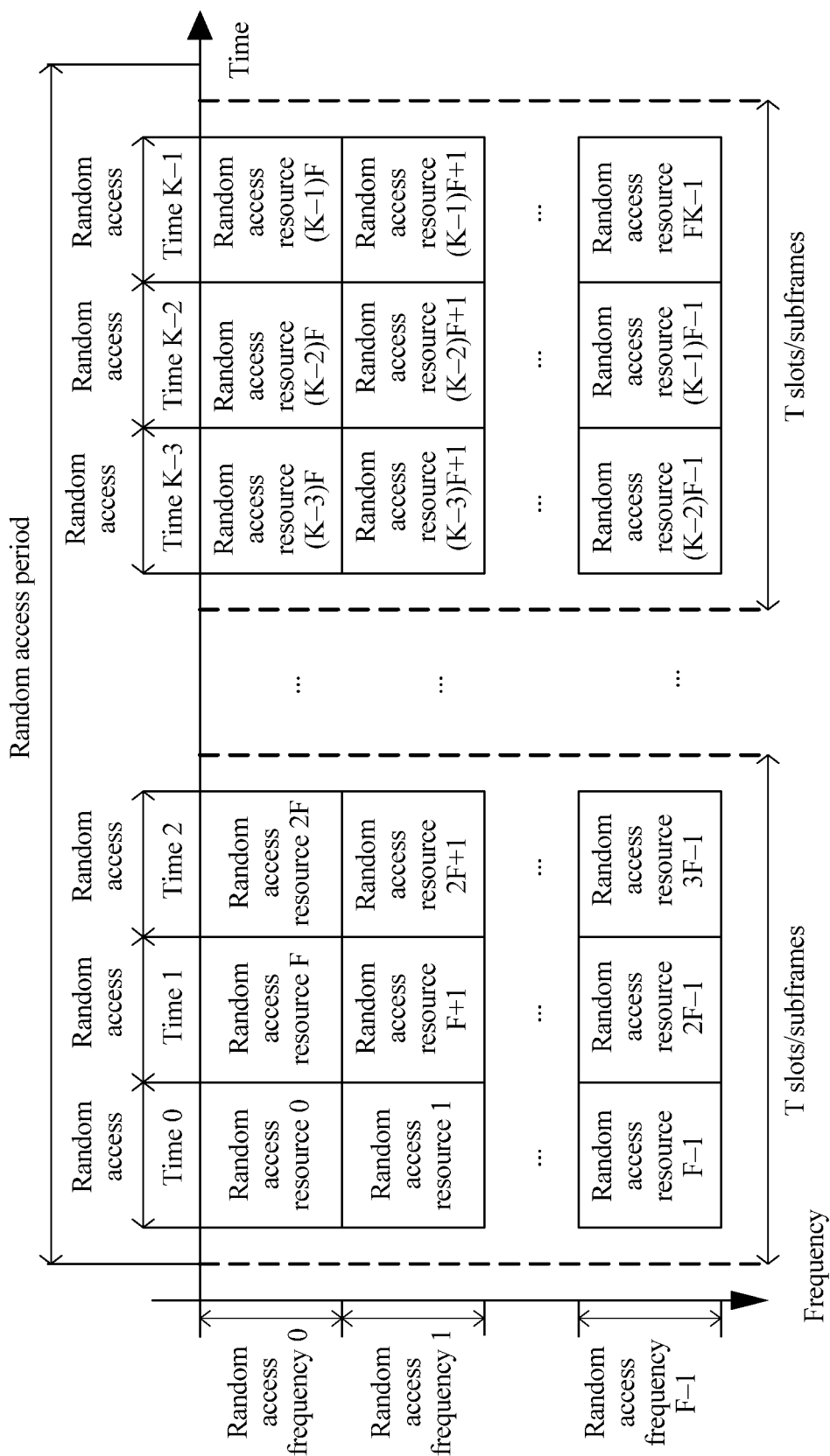
FIG. 5 is a schematic diagram of a random access resource index in a random access method according to another embodiment of this application.

FIG. 5 is a schematic diagram of a random access resource index in a random access method according to another embodiment of this application.

By default, an association relationship between a downlink signal and a random access resource is a fixed relationship. It is assumed that there are a plurality of slots in which random access resources in one random access period are located, and that there are a plurality of random access times in one slot, and that there are also a plurality of random access resources in frequency domain at one random access time.

As shown in FIG. 5, there are F*K random access resources in an entire random access period, and correspondingly, there are K downlink signals, where K is an integer greater than 0. Based on the indexing mode in (2), first, a frequency position of a random access resource may be determined at a first random access time in a first slot having random access resources, and then a frequency position of a random access resource is determined at a second random access time, until all random access resources in the first slot having random access resources are determined; and then a same step is performed in a second slot having random access resources, and so on, until all random access resources in the random access period are determined.

(3) That the terminal determines, based on an association relationship between the random access resource and a downlink signal, a random access resource corresponding to the downlink signal may be as follows: The terminal first determines, in the N slots or subframes in the period of the random access resource based on the indexing mode of the current random access resource and a quantity of random access resources at a same time, the time t of the random access resource corresponding to the downlink signal, and then determines, at the time t, the frequency position f of the random access resource corresponding to the downlink signal, where N is an integer greater than 0. Herein the period is a random access period.

Figure 6:
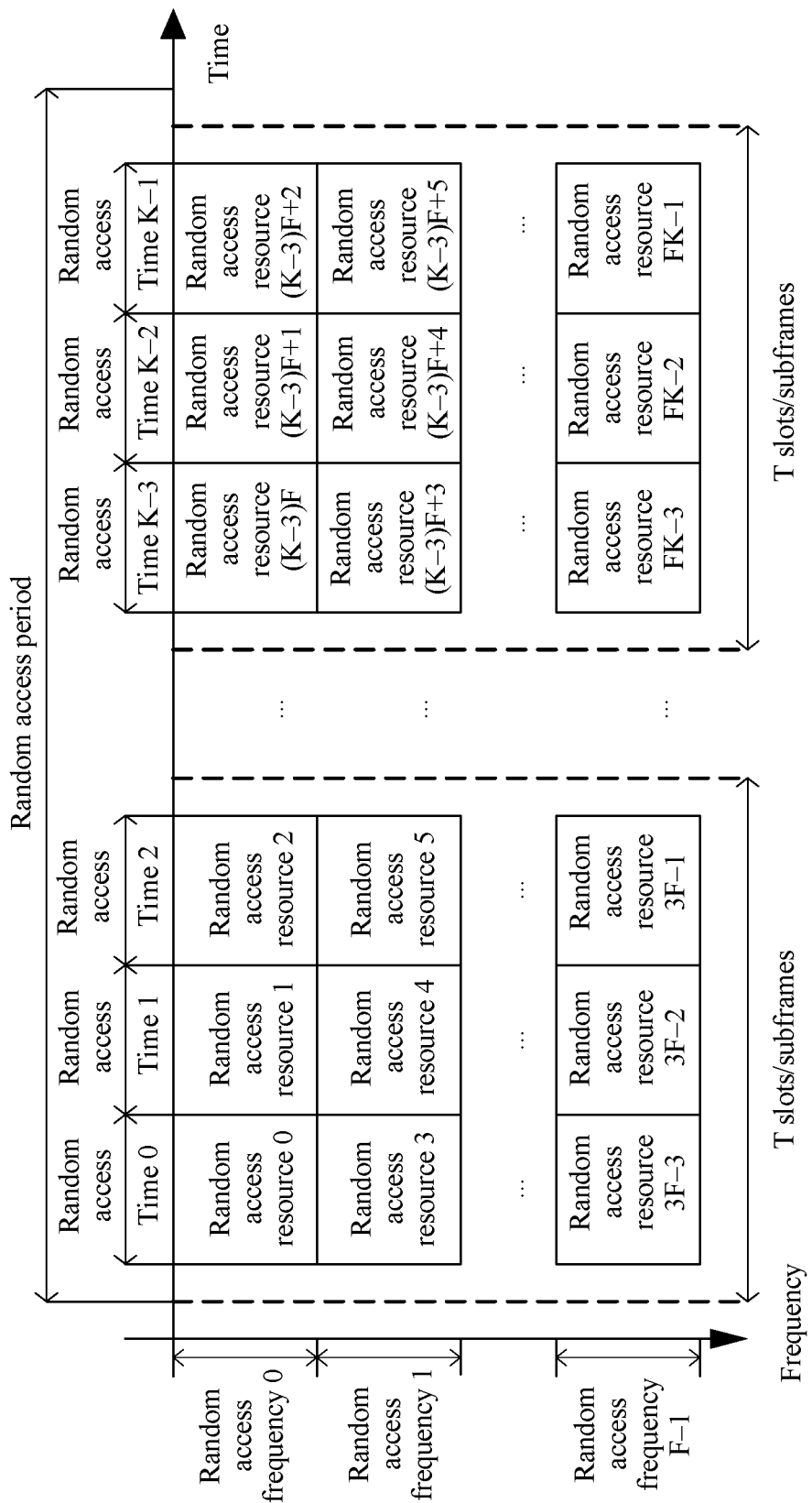
FIG. 6 is a schematic diagram of a random access resource index in a random access method according to another embodiment of this application.

FIG. 6 is a schematic diagram of a random access resource index in a random access method according to another embodiment of this application.

By default, an association relationship between a downlink signal and a random access resource is a fixed relationship. It is assumed that there are a plurality of slots in which random access resources in one random access period are located, and that there are a plurality of random access times in one slot, and that there are also a plurality of random access resources in frequency domain at one random access time.

In another implementation, there are F random access resources in frequency domain at a random access time, where F is a preset value or a value configured by the network device. In another implementation, F is determined based on at least one of a sequence length of a random access preamble, a subcarrier spacing of a random access preamble, a random access preamble format, a serving cell identity of a random access resource, carrier frequency information of a random access resource, a carrier frequency range, a service type, a maximum quantity of downlink signals, information about an actually transmitted downlink signal, a quantity of random access resources associated with a downlink signal, a random access resource period, an association relationship between a downlink signal and a random access resource, a random access configuration index, and indication information of a random access structure.

As shown in FIG. 6, there are F*K random access resources in an entire random access period, and correspondingly, there are K downlink signals, where K is an integer greater than 0. Based on the indexing mode in (3), in the random access period, first, the time t of the random access resource is determined in the N slots or subframes, and then the frequency position f of the random access resource is determined at the time t; and then the time t of the random access resource is determined in the next N slots or subframes, and then the frequency position f of the random access resource is determined at the time t, until random access resources in all slots in the random access period are determined.

It should be noted that, the random access resources at the same time mean that all the random access resources are at the same time t, and that there is one or more random access resources (random access opportunities) at the same time. However, this is not limited, and quantities of random access resources at different times may be different.

Optionally, the association relationship between a downlink signal and a random access resource may be alternatively not fixed in this application, and the random access resource corresponding to the downlink signal may be determined flexibly based on the association relationship in combination with the indexing mode of the current random access resource.

The association relationship may also be referred to as a correspondence, a mapping rule, or a mapping manner (mapping rule/mapping method/map or mapping association method/association rule), all of which indicate a correspondence between a downlink signal and a random access resource. To be specific, a random access resource (or an index of the random access resource) corresponding to a downlink signal may be obtained based on an index k of the downlink signal, or the downlink signal corresponding to the random access resource may be obtained based on the random access resource.

Specifically, the association relationship may also be any one of the following:

(1) random access resources at a same time correspond to one downlink signal; to be specific, the random access resources at the same time are associated with one downlink signal or one type of downlink signals (for example, a plurality of quasi-colocated (Quasi-colocation) downlink signals); and random access resources associated with different downlink signals are at different times; or (2) random access resources at a same time correspond to a plurality of downlink signals; to be specific, the random access resources at the same time are associated with the plurality of downlink signals; and the random access resources associated with the plurality of downlink signals may be at the same time; or (3) random access resources at a same time correspond to all downlink signals; to be specific, the random access resources associated with all the downlink signals may be at the same time, where the association relationship requires sufficient resources in frequency domain.

Requirements of the foregoing three association relationships (1) to (3) on a processing capability and/or a hardware capability of the network device increase sequentially, and correspondingly, time resource efficiency is also improved sequentially. In a specific implementation process, the association relationship may be used flexibly based on the processing capability and/or the hardware capability of the network device. For example, when the processing capability or the hardware capability of the network device is relatively low (lower than a first preset threshold), the network device configures the association relationship (1), and this can further reduce implementation complexity. When the processing capability or the hardware capability of the network device is moderate (between the first preset threshold and a second preset threshold), the network device configures the association relationship (2). When the processing capability or the hardware capability of the network device is relatively high (higher than the second preset threshold), the network device configures the association relationship (3). Time overheads can also be reduced when the network device configures (2) and (3).

In addition, when the association relationship (1) is configured, the terminal may be configured to use the indexing mode of the random access resource in (1) shown in FIG. 4. When the association relationship (2) is configured, the terminal may be configured to use the indexing mode of the random access resource in (2) shown in FIG. 5. When the association relationship (3) is configured, the terminal may be configured to use the indexing mode of the random access resource in (3) shown in FIG. 6.

In the foregoing embodiment, the frequency position of the random access resource at the random access time is determined based on at least one of the frequency position of the random access resource, a bandwidth of a random access frequency band, a quantity M2 of random access resources at the random access time, and a correspondence between a random access frequency and a random access time. The foregoing parameters may be predefined or prestored or configured by the network device by using signaling.

In another possible implementation, the terminal receives association relationship indication information transmitted by the network device, where the association relationship indication information carries an identifier of the association relationship. For example, two bits may be used to identify the association relationship, where "00" identifies the association relationship (1), "01" identifies the association relationship (2), and "10" identifies the association relationship (3). However, this is not limited. The terminal determines, based on the association relationship indicated by the network device and a fixed indexing mode of the random access resource, the random access resource corresponding to the downlink signal.

For example, it is assumed that the fixed indexing mode of the random access resource is: first determining the time t of the random access resource in the slot in which the random access resource is located, and then determining the frequency position f of the random access resource at the time t. A mapping relationship between an index k of a downlink signal and an index i of a random access resource may be preconfigured, for example:

$$k = \mod(i, K), \text{ where } i = 0, 1, \ldots, FK - 1; \text{ or}$$

$$k = \text{floor}\left(\frac{i}{F}\right), \text{ where } i = 0, 1, \ldots, FK - 1.$$

However, the two mapping relationships constitute no limitation.

The index i of the random access resource may be indicated equivalently based on a slot in which the random access resource is located, a random access time, and a random access frequency. By using the foregoing mapping relationship, the downlink signal may be directly associated with a specific time and frequency of the random access resource. For example, a random access resource 0 in FIG. 4 may be indicated by a slot in which the resource is located, a random access time 0 in the slot, and a random access frequency 0; and a random access resource F+1 in FIG. 4 may be indicated by a slot in which the resource is located, a random access time 1 in the slot, and a random access frequency 1.

For another indexing mode, refer to the foregoing mapping relationship. Details are not described again.

The foregoing indexing mode may be preset, or may be configured by the network device. In a specific implementation, before the terminal transmits the random access preamble to the network device based on the random access resource corresponding to the downlink signal, the terminal obtains a preset indexing mode of the random access resource, or receives third indication information transmitted by the network device, where the third indication information is used to indicate the indexing mode of the random access resource.

Further, a plurality of random access preambles may exist on a same random access resource. The random access preambles may be further grouped into a plurality of preamble sets, and the plurality of preamble sets on the random access resource may be associated with different downlink signals. Correspondingly, the indexing mode of the random access resource may be: first determining an index of a random access preamble set, and then further performing indexing in a time dimension and a frequency dimension. Optionally, a size of the random access preamble set (or a quantity of random access preambles in the set) is configured and indicated by the network device. Optionally, the size of the random access preamble set is predefined or prestored. In addition, a sequence of forming a preamble set may be: forming a plurality of random access preambles based on a cyclic shift of a random access preamble sequence, and then generating other random access preambles sequentially based on a root sequence, until all root sequences are traversed, or a quantity of traversed root sequences reaches a predefined or prestored quantity or a quantity configured by the network device, or a total quantity of generated random access preambles reaches a predefined or prestored quantity or a quantity configured by the network device, or a total quantity of generated random access preambles in a random access preamble set reaches a predefined or prestored quantity or a quantity configured by the network device.

Optionally, the network device may directly indicate the time of the random access resource or a time structure of the random access resource in a slot to the terminal by using indication information. Then the frequency of the random access resource is further determined, and the random access resource can be determined.

Optionally, that the terminal determines a random access resource based on the random access configuration index delivered by the network device may be as follows: The terminal determines a time range of the random access resource based on the random access configuration index and one or more of a subcarrier spacing of the random access preamble, a sequence length of the random access preamble, a maximum quantity of downlink signal blocks, and an actually transmitted downlink signal block.

Specifically, a mapping relationship between the random access configuration index and the time range of the random access resource may be determined based on one or more of the subcarrier spacing of the random access preamble, the sequence length of the random access preamble, the maximum quantity of downlink signal blocks, and the actually transmitted downlink signal block, and the time range of the random access resource may be further determined based on the random access configuration index indicated by the network device and the mapping relationship between the random access configuration index and the slot in which the random access resource is located.

Herein the time range may be a time period, or a set of a plurality of time periods, or a set of a plurality of slots/subframes, or the like. This is not limited in this application.

Further, if the time range is a set of a plurality of slots/subframes, for different slot structures or different subframe structures, it is determined that times of random access resources are also different.

Before the terminal transmits the random access preamble to the network device based on the random access resource corresponding to the downlink signal, the terminal may further determine the time of the random access resource in the time range of the random access resource based on preset structure information of a slot or a subframe. Alternatively, the terminal receives second indication information transmitted by the network device, where the second indication information includes structure information of a random access slot or subframe. Correspondingly, the terminal determines the time of the random access resource in the time range of the random access resource based on the structure information of the random access slot or subframe.

Determining the time of the random access resource in the time range of the random access resource may be determining a specific time position of the random access resource in the time range of the random access resource, for example, an OFDM symbol of the random access resource.

It can be learned that, when one or more of the subcarrier spacing of the random access preamble, the sequence length of the random access preamble, the maximum quantity of downlink signal blocks, and the actually transmitted downlink signal block changes, the mapping relationship between the random access configuration index and the slot in which the random access resource is located may be different.

Optionally, the terminal may further determine information such as a format and a system frame position of the random access preamble based on the random access configuration index and one or more of the subcarrier spacing of the random access preamble, the sequence length of the random access preamble, the maximum quantity of downlink signal blocks, and the actually transmitted downlink signal block.

A system frame is also referred to as a frame or a radio frame. Duration of the system frame is 10 ms. The system frame includes 10 subframes, and duration of each subframe is 1 ms. One subframe includes one or more slots. Specifically, a quantity of slots in a subframe is related to a subcarrier spacing. For example, when the subcarrier spacing is 15 kHz (a corresponding subcarrier spacing index is u=0), one subframe includes only one slot. For another example, when the subcarrier spacing is $15*2^u$ kHz (a corresponding subcarrier spacing index is u=1 to 4), one subframe includes $2^u$ slots. One slot may include 14 OFDM symbols. The system frame position may be indicated by a system frame number (SFN). In this application, $\kappa=64$, and a corresponding basic time unit is $1/(480000*4096)$.

The format of the random access preamble may be one or more of formats in the following Table 1 in the existing standard: A0, A1, A2, A3, B0, B1, B2, B3, B4, C0, and C2; or one or more of formats in Table 2: 0, 1, 2, and 3. Actually, formats A0 to C2 and formats 0 to 3 may alternatively have other names. This is not limited herein.

Specifically, Table 1 shows preamble formats when the sequence length L is equal to 127 or 139.

TABLE 1

| Preamble format | Quantity of OFDM symbols | L | $\Delta f^{RA}$ | $N_u$ | $N_{CP}^{RA}$ | $N_{GT}^{RA}$ |
|---|---|---|---|---|---|---|
| A0 | 1 | [127 or 139] | $15 \cdot 2^\mu$ kHz | $2048 \kappa \cdot 2^{-\mu}$ | $144 \kappa \cdot 2^{-\mu}$ | 0 |
| A1 | 2 | [127 or 139] | $15 \cdot 2^\mu$ kHz | $2 \cdot 2048 \kappa \cdot 2^{-\mu}$ | $288 \kappa \cdot 2^{-\mu}$ | 0 |
| A2 | 4 | [127 or 139] | $15 \cdot 2^\mu$ kHz | $4 \cdot 2048 \kappa \cdot 2^{-\mu}$ | $576 \kappa \cdot 2^{-\mu}$ | 0 |
| A3 | 6 | [127 or 139] | $15 \cdot 2^\mu$ kHz | $6 \cdot 2048 \kappa \cdot 2^{-\mu}$ | $864 \kappa \cdot 2^{-\mu}$ | 0 |
| B1 | 2 | [127 or 139] | $15 \cdot 2^\mu$ kHz | $2 \cdot 2048 \kappa \cdot 2^{-\mu}$ | $216 \kappa \cdot 2^{-\mu}$ | $72 \kappa \cdot 2^\mu$ |
| B2 | 4 | [127 or 139] | $15 \cdot 2^\mu$ kHz | $4 \cdot 2048 \kappa \cdot 2^{-\mu}$ | $360 \kappa \cdot 2^{-\mu}$ | $72 \kappa \cdot 2^\mu$ |
| B3 | 6 | [127 or 139] | $15 \cdot 2^\mu$ kHz | $6 \cdot 2048 \kappa \cdot 2^{-\mu}$ | $504 \kappa \cdot 2^{-\mu}$ | $360 \kappa \cdot 2^\mu$ |
| B4 | 12 | [127 or 139] | $15 \cdot 2^\mu$ kHz | $12 \cdot 2048 \kappa \cdot 2^{-\mu}$ | $936 \kappa \cdot 2^{-\mu}$ | $792 \kappa \cdot 2^\mu$ |
| C0 | 1 | [127 or 139] | $15 \cdot 2^\mu$ kHz | $2048 \kappa \cdot 2^{-\mu}$ | $1240 \kappa \cdot 2^{-\mu}$ | $1096 \kappa \cdot 2^\mu$ |
| C2 | 4 | [127 or 139] | $15 \cdot 2^\mu$ kHz | $4 \cdot 2048 \kappa \cdot 2^{-\mu}$ | $2048 \kappa \cdot 2^{-\mu}$ | $2916 \kappa \cdot 2^\mu$ |

Table 2 shows preamble formats when the sequence length L is equal to 839.

TABLE 2

| Preamble format | L | $\Delta f^{RA}$ | $N_u$ | $N_{CP}^{RA}$ | $N_{GT}^{RA}$ |
|---|---|---|---|---|---|
| 0 | 839 | 1.25 kHz | 2457 κ | 3168 κ | 2976 κ · $2^u$ |
| 1 | 839 | 1.25 kHz | 2.24576 κ | 21024 κ | 21904 κ · $2^u$ |
| 2 | 839 | 1.25 kHz | 4.24576 κ | 4688 κ | 4528 κ · $2^u$ |
| 3 | 839 | 5 kHz | 2457 κ | 3168 κ | 2796 κ · $2^u$ |

In an implementation, a mapping relationship between the random access configuration index and the combination [the slot in which the random access resource is located, the format of the random access preamble (that is, a time position of the random access preamble in a slot, also referred to as a random access time), the system frame position] based on one or more of the subcarrier spacing of the random access preamble, the sequence length of the random access preamble, the maximum quantity of downlink signal blocks, and the actually transmitted downlink signal block. However, this is not limited. Mapping relationships between the random access configuration index and the slot in which the random access resource is located, the format of the random access preamble, and the system frame position may be obtained separately.

For example, Table 3 and Table 4 show a mapping relationship between the random access configuration index and the combination [the slot in which the random access resource is located, the format of the random access preamble, the system frame position] when the subcarrier spacing is 15 kilohertz (kHz) and the maximum quantity of downlink signal blocks is 4.

In Table 3, slots in which random access resources are located are consecutive slots.

TABLE 3

| Random access configuration index | Format of the random access preamble | System frame position | Slot in which the random access resource is located |
|---|---|---|---|
| 0 | A0 | Mod(SFN, 4) = 0 | 2 |
| 1 | A0 | Mod(SFN, 4) = 0 | 6 |
| 2 | A0 | Mod(SFN, 2) = 0 | 2 |
| 3 | A0 | Mod(SFN, 2) = 0 | 6 |
| 4 | A0 | All system frames | 2 |
| 5 | A0 | All system frames | 6 |
| 6 | A0 | All system frames | 2, 3 |
| 7 | A0 | All system frames | 6, 7 |
| 8 | A0 | All system frames | 2, 3, 4, 5 |
| 9 | A0 | All system frames | 6, 7, 8, 9 |
| 10 | C0 | Mod(SFN, 4) = 0 | 2 |
| 11 | C0 | Mod(SFN, 4) = 0 | 6 |
| 12 | C0 | Mod(SFN, 2) = 0 | 2 |
| 13 | C0 | Mod(SFN, 2) = 0 | 6 |
| 14 | C0 | All system frames | 2 |
| 15 | C0 | All system frames | 6 |
| 16 | C0 | All system frames | 2, 3 |
| 17 | C0 | All system frames | 6, 7 |
| 18 | C0 | All system frames | 2, 3, 4, 5 |
| 19 | C0 | All system frames | 6, 7, 8, 9 |
| 20 | A1/B1 | Mod(SFN, 4) = 0 | 2 |
| 21 | A1/B1 | Mod(SFN, 4) = 0 | 6 |
| 22 | A1/B1 | Mod(SFN, 2) = 0 | 2 |
| 23 | A1/B1 | Mod(SFN, 2) = 0 | 6 |
| 24 | A1/B1 | All system frames | 2 |
| 25 | A1/B1 | All system frames | 6 |
| 26 | A1/B1 | All system frames | 2, 3 |
| 27 | A1/B1 | All system frames | 6, 7 |
| 28 | A1/B1 | All system frames | 2, 3, 4, 5 |
| 29 | A1/B1 | All system frames | 6, 7, 8, 9 |
| 30 | A2/B2 | Mod(SFN, 8) = 0 | 2, 3 |
| 31 | A2/B2 | Mod(SFN, 8) = 0 | 6, 7 |
| 32 | A2/B2 | Mod(SFN, 4) = 0 | 2, 3 |
| 33 | A2/B2 | Mod(SFN, 4) = 0 | 6, 7 |
| 34 | A2/B2 | Mod(SFN, 2) = 0 | 2, 3 |
| 35 | A2/B2 | Mod(SFN, 2) = 0 | 6, 7 |
| 36 | A2/B2 | All system frames | 2, 3 |
| 37 | A2/B2 | All system frames | 6, 7 |
| 38 | A2/B2 | All system frames | 2, 3, 4, 5 |
| 39 | A2/B2 | All system frames | 6, 7, 8, 9 |
| 40 | C2 | Mod(SFN, 8) = 0 | 2, 3 |
| 41 | C2 | Mod(SFN, 8) = 0 | 6, 7 |
| 42 | C2 | Mod(SFN, 4) = 0 | 2, 3 |
| 43 | C2 | Mod(SFN, 4) = 0 | 6, 7 |
| 44 | C2 | Mod(SFN, 2) = 0 | 2, 3 |
| 45 | C2 | Mod(SFN, 2) = 0 | 6, 7 |
| 46 | C2 | All system frames | 2, 3 |
| 47 | C2 | All system frames | 6, 7 |
| 48 | C2 | All system frames | 2, 3, 4, 5 |
| 49 | C2 | All system frames | 6, 7, 8, 9 |
| 50 | A3/B3 | Mod(SFN, 8) = 0 | 2, 3 |
| 51 | A3/B3 | Mod(SFN, 8) = 0 | 6, 7 |
| 52 | A3/B3 | Mod(SFN, 4) = 0 | 2, 3 |

TABLE 3-continued

| Random access configuration index | Format of the random access preamble | System frame position | Slot in which the random access resource is located |
|---|---|---|---|
| 53 | A3/B3 | Mod(SFN, 4) = 0 | 6, 7 |
| 54 | A3/B3 | Mod(SFN, 2) = 0 | 2, 3 |
| 55 | A3/B3 | Mod(SFN, 2) = 0 | 6, 7 |
| 56 | A3/B3 | All system frames | 2, 3 |
| 57 | A3/B3 | All system frames | 6, 7 |
| 58 | A3/B3 | All system frames | 2, 3, 4, 5 |
| 59 | A3/B3 | All system frames | 6, 7, 8, 9 |
| 60 | B4 | Mod(SFN, 8) = 0 | 2, 3, 4, 5 |
| 61 | B4 | Mod(SFN, 4) = 0 | 2, 3, 4, 5 |
| 62 | B4 | Mod(SFN, 2) = 0 | 2, 3, 4, 5 |
| 63 | B4 | All system frames | 2, 3, 4, 5 |

In Table 4, slots in which random access resources are located are inconsecutive slots.

TABLE 4

| Random access configuration index | Format of the random access preamble | System frame position | Slot in which the random access resource is located |
|---|---|---|---|
| 0 | A0 | Mod(SFN, 4) = 0 | 2 |
| 1 | A0 | Mod(SFN, 4) = 0 | 6 |
| 2 | A0 | Mod(SFN, 2) = 0 | 2 |
| 3 | A0 | Mod(SFN, 2) = 0 | 6 |
| 4 | A0 | All system frames | 2 |
| 5 | A0 | All system frames | 6 |
| 6 | A0 | All system frames | 2, 6 |
| 7 | A0 | All system frames | 3, 7 |
| 8 | A0 | All system frames | 2, 3, 4, 5 |
| 9 | A0 | All system frames | 6, 7, 8, 9 |
| 10 | C0 | Mod(SFN, 4) = 0 | 2 |
| 11 | C0 | Mod(SFN, 4) = 0 | 6 |
| 12 | C0 | Mod(SFN, 2) = 0 | 2 |
| 13 | C0 | Mod(SFN, 2) = 0 | 6 |
| 14 | C0 | All system frames | 2 |
| 15 | C0 | All system frames | 6 |
| 16 | C0 | All system frames | 2, 6 |
| 17 | C0 | All system frames | 3, 7 |
| 18 | C0 | All system frames | 2, 3, 4, 5 |
| 19 | C0 | All system frames | 6, 7, 8, 9 |
| 20 | A1/B1 | Mod(SFN, 4) = 0 | 2 |
| 21 | A1/B1 | Mod(SFN, 4) = 0 | 6 |
| 22 | A1/B1 | Mod(SFN, 2) = 0 | 2 |
| 23 | A1/B1 | Mod(SFN, 2) = 0 | 6 |
| 24 | A1/B1 | All system frames | 2 |
| 25 | A1/B1 | All system frames | 6 |
| 26 | A1/B1 | All system frames | 2, 6 |
| 27 | A1/B1 | All system frames | 3, 7 |
| 28 | A1/B1 | All system frames | 2, 3, 4, 5 |
| 29 | A1/B1 | All system frames | 6, 7, 8, 9 |
| 30 | A2/B2 | Mod(SFN, 8) = 0 | 2, 6 |
| 31 | A2/B2 | Mod(SFN, 8) = 0 | 3, 7 |
| 32 | A2/B2 | Mod(SFN, 4) = 0 | 2, 6 |
| 33 | A2/B2 | Mod(SFN, 4) = 0 | 3, 7 |
| 34 | A2/B2 | Mod(SFN, 2) = 0 | 2, 6 |
| 35 | A2/B2 | Mod(SFN, 2) = 0 | 3, 7 |
| 36 | A2/B2 | All system frames | 2, 6 |
| 37 | A2/B2 | All system frames | 3, 7 |
| 38 | A2/B2 | All system frames | 2, 3, 4, 5 |
| 39 | A2/B2 | All system frames | 6, 7, 8, 9 |
| 40 | C2 | Mod(SFN, 8) = 0 | 2, 6 |
| 41 | C2 | Mod(SFN, 8) = 0 | 3, 7 |
| 42 | C2 | Mod(SFN, 4) = 0 | 2, 6 |
| 43 | C2 | Mod(SFN, 4) = 0 | 3, 7 |
| 44 | C2 | Mod(SFN, 2) = 0 | 2, 6 |
| 45 | C2 | Mod(SFN, 2) = 0 | 3, 7 |
| 46 | C2 | All system frames | 2, 6 |
| 47 | C2 | All system frames | 3, 7 |
| 48 | C2 | All system frames | 2, 3, 4, 5 |
| 49 | C2 | All system frames | 6, 7, 8, 9 |
| 50 | A3/B3 | Mod(SFN, 8) = 0 | 2, 6 |
| 51 | A3/B3 | Mod(SFN, 8) = 0 | 3, 7 |
| 52 | A3/B3 | Mod(SFN, 4) = 0 | 2, 6 |
| 53 | A3/B3 | Mod(SFN, 4) = 0 | 3, 7 |
| 54 | A3/B3 | Mod(SFN, 2) = 0 | 2, 6 |
| 55 | A3/B3 | Mod(SFN, 2) = 0 | 3, 7 |
| 56 | A3/B3 | All system frames | 2, 6 |
| 57 | A3/B3 | All system frames | 3, 7 |
| 58 | A3/B3 | All system frames | 2, 3, 4, 5 |
| 59 | A3/B3 | All system frames | 6, 7, 8, 9 |
| 60 | B4 | Mod(SFN, 8) = 0 | 2, 3, 4, 5 |
| 61 | B4 | Mod(SFN, 4) = 0 | 2, 3, 4, 5 |
| 62 | B4 | Mod(SFN, 2) = 0 | 2, 3, 4, 5 |
| 63 | B4 | All system frames | 2, 3, 4, 5 |

In this case, a downlink signal block needs to occupy 2 milliseconds (ms), and the random access resource cannot be placed at a time of the downlink signal block in the system frame. For example, if the downlink signal block is located in slots numbered 0 and 1, the random access resource is located in one or more of slots numbered 2 to 9. For another example, if the downlink signal block is located in slots numbered 2 and 3, the random access resource is located in one or more of slots numbered 0, 1, and 4 to 9. This is not specifically limited herein.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 3 and Table 4, random access resource time densities are the same (that is, one slot appears in every eight system frames), system frame positions are the same, but slot positions are different. Similar cases also exist in the following embodiment, and details are not described again.

The mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 80 ms and/or the downlink signal is located in slots numbered 0 and 1, the mapping relationship between the random access configuration index and the combination [the slot in which the random access resource is located, the format of the random access preamble, the system frame position] is shown in Table 3 or Table 4. When the slot in which the downlink signal is located is another slot, the slot in which the random access resource is located may also change, provided that the slot in which the random access resource is located does not overlap the slot in which the downlink signal is located.

All the slots and system frames in the foregoing table are examples; however, slots and system frames are not limited to those in the table. For example, Mod(SFN, 8)=0 in the foregoing Table 3 and Table 4 indicates system frame numbers exactly divided by 8, and may be replaced with any one of Mod(SFN, 8)=1, Mod(SFN, 8)=2, Mod(SFN, 8)=3, Mod(SFN, 8)=4, Mod(SFN, 8)=5, Mod(SFN, 8)=6, and Mod(SFN, 8)=7. For another example, in the foregoing Table 3 and Table 4, Mod(SFN, 4)=0 may be replaced with any one of Mod(SFN, 4)=1, Mod(SFN, 4)=2, and Mod(SFN, 4)=3. For another example, in the foregoing Table 3 and Table 4, Mod(SFN, 2)=0 may be replaced with Mod(SFN, 2)=1.

Similarly, the slot in which the random access resource is located is not limited to those in Table 3 and Table 4 either. For example, when the random access configuration index in Table 4 is "6", the corresponding slot in which the random access resource is located is "2, 6", but in a scenario in which the downlink signal is located in slots numbered 0 and 1, the slot in which the random access resource is located may be any one or more of slots 2 to 9. For example, in addition to "2, 6", any two different values (x1, x2) of slots numbered 3 to 9 may be used.

For another example, when the random access configuration index in Table 4 is "8", the corresponding slot in which the random access resource is located is "2, 3, 4, 5". Actually, any four different values x1, x2, x3, and x4 of 2 to 9 may be used, or any pairwise combination of slots thereof such as (x1, x2) and (x3, x4) may be used.

If random access configuration indexes are different, corresponding slots are different. For example, slots corresponding to a first random access configuration index are indicated by (x1, x2, x3, x4), and slots corresponding to a second random access configuration index are indicated by (y1, y2, y3, y4), where (x1, x2, x3, x4) and (y1, y2, y3, y4) include any four different numeric values of 3 to 9, and in the two groups of numbers (x1, x2, x3, x4) and (y1, y2, y3, y4), up to three numbers are the same. In another implementation, x1 and x2, x3 and x4, and/or x2 and x3 are distributed at equal intervals. For example, x2=x1+a, x4=x3+a, and/or x3=x2+a, where a may be any integer of 1 to 4. Similarly, y1 and y2, y3 and y4, and/or y2 and y3 are distributed at equal intervals. For example, y2=y1+b, y4=y3+b, and/or y3=y2+b.

In another implementation, if different frequencies (or frequency bands) are used for uplink and downlink communication, that is, a frequency division mode is used for uplink and downlink communication, x1 to x4 and y1 to y4 may be any values of 0 to 9. A specific setting method is the same as the foregoing method. Details are not described herein again.

For example, Table 5 and Table 6 show a mapping relationship between the random access configuration index and the combination [the slot in which the random access resource is located, the format of the random access preamble, the system frame position] when the subcarrier spacing is 15 kilohertz (kHz) and the maximum quantity of downlink signal blocks is 8.

In Table 5, slots in which random access resources are located are consecutive slots.

TABLE 5

| Random access configuration index | Format of the random access preamble | System frame position | Slot in which the random access resource is located |
|---|---|---|---|
| 0 | A0 | Mod(SFN, 4) = 0 | 4 |
| 1 | A0 | Mod(SFN, 4) = 0 | 7 |
| 2 | A0 | Mod(SFN, 2) = 0 | 4 |
| 3 | A0 | Mod(SFN, 2) = 0 | 7 |
| 4 | A0 | All system frames | 4 |
| 5 | A0 | All system frames | 7 |
| 6 | A0 | All system frames | 4, 5 |
| 7 | A0 | All system frames | 6, 7 |
| 8 | A0 | All system frames | 4, 5, 6, 7 |
| 9 | A0 | N/A | N/A |
| 10 | C0 | Mod(SFN, 4) = 0 | 4 |
| 11 | C0 | Mod(SFN, 4) = 0 | 7 |
| 12 | C0 | Mod(SFN, 2) = 0 | 4 |
| 13 | C0 | Mod(SFN, 2) = 0 | 7 |
| 14 | C0 | All system frames | 4 |
| 15 | C0 | All system frames | 7 |
| 16 | C0 | All system frames | 4, 5 |
| 17 | C0 | All system frames | 6, 7 |
| 18 | C0 | All system frames | 4, 5, 6, 7 |
| 19 | C0 | N/A | N/A |
| 20 | A1/B1 | Mod(SFN, 4) = 0 | 4, 5 |
| 21 | A1/B1 | Mod(SFN, 4) = 0 | 6, 7 |
| 22 | A1/B1 | Mod(SFN, 2) = 0 | 4, 5 |
| 23 | A1/B1 | Mod(SFN, 2) = 0 | 6, 7 |
| 24 | A1/B1 | All system frames | 4, 5 |
| 25 | A1/B1 | All system frames | 6, 7 |
| 26 | A1/B1 | All system frames | 4, 5 |
| 27 | A1/B1 | All system frames | 6, 7 |
| 28 | A1/B1 | All system frames | 4, 5, 6, 7 |

TABLE 5-continued

| Random access configuration index | Format of the random access preamble | System frame position | Slot in which the random access resource is located |
|---|---|---|---|
| 29 | A1/B1 | N/A | N/A |
| 30 | A2/B2 | Mod(SFN, 8) = 0 | 4, 5, 6, 7 |
| 31 | A2/B2 | Mod(SFN, 8) = 1 | 4, 5, 6, 7 |
| 32 | A2/B2 | Mod(SFN, 4) = 0 | 4, 5, 6, 7 |
| 33 | A2/B2 | Mod(SFN, 4) = 1 | 4, 5, 6, 7 |
| 34 | A2/B2 | Mod(SFN, 2) = 0 | 4, 5, 6, 7 |
| 35 | A2/B2 | Mod(SFN, 2) = 0 | N/A |
| 36 | A2/B2 | All system frames | 4, 5, 6, 7 |
| 37 | A2/B2 | N/A | N/A |
| 38 | A2/B2 | N/A | N/A |
| 39 | A2/B2 | N/A | N/A |
| 40 | C2 | Mod(SFN, 8) = 0 | 4, 5, 6, 7 |
| 41 | C2 | Mod(SFN, 8) = 1 | 4, 5, 6, 7 |
| 42 | C2 | Mod(SFN, 4) = 0 | 4, 5, 6, 7 |
| 43 | C2 | Mod(SFN, 4) = 1 | 4, 5, 6, 7 |
| 44 | C2 | Mod(SFN, 2) = 0 | 4, 5, 6, 7 |
| 45 | C2 | Mod(SFN, 2) = 0 | N/A |
| 46 | C2 | All system frames | 4, 5, 6, 7 |
| 47 | C2 | N/A | N/A |
| 48 | C2 | N/A | N/A |
| 49 | C2 | N/A | N/A |
| 50 | A3/B3 | Mod(SFN, 8) = 0 | 4, 5, 6, 7 |
| 51 | A3/B3 | Mod(SFN, 8) = 1 | 4, 5, 6, 7 |
| 52 | A3/B3 | Mod(SFN, 4) = 0 | 4, 5, 6, 7 |
| 53 | A3/B3 | Mod(SFN, 4) = 1 | 4, 5, 6, 7 |
| 54 | A3/B3 | Mod(SFN, 2) = 0 | 4, 5, 6, 7 |
| 55 | A3/B3 | Mod(SFN, 2) = 1 | 4, 5, 6, 7 |
| 56 | A3/B3 | All system frames | 4, 5, 6, 7 |
| 57 | A3/B3 | N/A | N/A |
| 58 | B4 | Mod(SFN, 8) = 0<br>Mod(SFN, 8) = 1 | 4, 5, 6, 7<br>6, 7, 8, 9 |
| 59 | B4 | Mod(SFN, 8) = 0<br>Mod(SFN, 8) = 1 | 6, 7, 8, 9<br>4, 5, 6, 7 |
| 60 | B4 | Mod(SFN, 4) = 0<br>Mod(SFN, 4) = 1 | 4, 5, 6, 7<br>6, 7, 8, 9 |
| 61 | B4 | Mod(SFN, 4) = 0<br>Mod(SFN, 4) = 1 | 6, 7, 8, 9<br>4, 5, 6, 7 |
| 62 | B4 | Mod(SFN, 2) = 0<br>Mod(SFN, 2) = 1 | 4, 5, 6, 7<br>6, 7, 8, 9 |
| 63 | B4 | Mod(SFN, 2) = 0<br>Mod(SFN, 2) = 1 | 6, 7, 8, 9<br>4, 5, 6, 7 |

In Table 6, slots in which random access resources are located are inconsecutive slots.

TABLE 6

| Random access configuration index | Format of the random access preamble | System frame position | Slot in which the random access resource is located |
|---|---|---|---|
| 0 | A0 | Mod(SFN, 4) = 0 | 4 |
| 1 | A0 | Mod(SFN, 4) = 0 | 7 |
| 2 | A0 | Mod(SFN, 2) = 0 | 4 |
| 3 | A0 | Mod(SFN, 2) = 0 | 7 |
| 4 | A0 | All system frames | 4 |
| 5 | A0 | All system frames | 7 |
| 6 | A0 | All system frames | 4, 7 |
| 7 | A0 | All system frames | 5, 8 |
| 8 | A0 | All system frames | 4, 5, 8, 9 |
| 9 | A0 | N/A | N/A |
| 10 | C0 | Mod(SFN, 4) = 0 | 4 |
| 11 | C0 | Mod(SFN, 4) = 0 | 7 |
| 12 | C0 | Mod(SFN, 2) = 0 | 4 |
| 13 | C0 | Mod(SFN, 2) = 0 | 7 |
| 14 | C0 | All system frames | 4 |
| 15 | C0 | All system frames | 7 |
| 16 | C0 | All system frames | 4, 7 |
| 17 | C0 | All system frames | 5, 8 |
| 18 | C0 | All system frames | 4, 5, 8, 9 |
| 19 | C0 | N/A | N/A |
| 20 | A1/B1 | Mod(SFN, 4) = 0 | 4, 7 |
| 21 | A1/B1 | Mod(SFN, 4) = 0 | 5, 8 |
| 22 | A1/B1 | Mod(SFN, 2) = 0 | 4, 7 |
| 23 | A1/B1 | Mod(SFN, 2) = 0 | 5, 8 |
| 24 | A1/B1 | All system frames | 4, 7 |
| 25 | A1/B1 | All system frames | 5, 8 |
| 26 | A1/B1 | All system frames | 4, 7 |
| 27 | A1/B1 | All system frames | 5, 8 |
| 28 | A1/B1 | All system frames | 4, 5, 8, 9 |
| 29 | A1/B1 | N/A | N/A |
| 30 | A2/B2 | Mod(SFN, 8) = 0 | 4, 5, 8, 9 |
| 31 | A2/B2 | Mod(SFN, 8) = 1 | 4, 5, 8, 9 |
| 32 | A2/B2 | Mod(SFN, 4) = 0 | 4, 5, 8, 9 |
| 33 | A2/B2 | Mod(SFN, 4) = 1 | 4, 5, 8, 9 |
| 34 | A2/B2 | Mod(SFN, 2) = 0 | 4, 5, 8, 9 |
| 35 | A2/B2 | Mod(SFN, 2) = 1 | 4, 5, 8, 9 |
| 36 | A2/132 | All system frames | 4, 5, 8, 9 |

TABLE 6-continued

| Random access configuration index | Format of the random access preamble | System frame position | Slot in which the random access resource is located |
|---|---|---|---|
| 37 | A2/132 | N/A | N/A |
| 38 | A2/132 | N/A | N/A |
| 39 | A2/132 | N/A | N/A |
| 40 | C2 | Mod(SFN, 8) = 0 | 4, 5, 8, 9 |
| 41 | C2 | Mod(SFN, 8) = 1 | 4, 5, 8, 9 |
| 42 | C2 | Mod(SFN, 4) = 0 | 4, 5, 8, 9 |
| 43 | C2 | Mod(SFN, 4) = 1 | 4, 5, 8, 9 |
| 44 | C2 | Mod(SFN, 2) = 0 | 4, 5, 8, 9 |
| 45 | C2 | Mod(SFN, 2) = 1 | 4, 5, 8, 9 |
| 46 | C2 | All system frames | 4, 5, 8, 9 |
| 47 | C2 | N/A | N/A |
| 48 | C2 | N/A | N/A |
| 49 | C2 | N/A | N/A |
| 50 | A3/B3 | Mod(SFN, 8) = 0 | 4, 5, 8, 9 |
| 51 | A3/B3 | Mod(SFN, 8) = 1 | 4, 5, 8, 9 |
| 52 | A3/B3 | Mod(SFN, 4) = 0 | 4, 5, 8, 9 |
| 53 | A3/B3 | Mod(SFN, 4) = 1 | 4, 5, 8, 9 |
| 54 | A3/B3 | Mod(SFN, 2) = 0 | 4, 5, 8, 9 |
| 55 | A3/B3 | Mod(SFN, 2) = 1 | 4, 5, 8, 9 |
| 56 | A3/B3 | All system frames | 4, 5, 8, 9 |
| 57 | A3/B3 | N/A | N/A |
| 58 | B4 | Mod(SFN, 8) = 0 Mod(SFN, 8) = 1 | 4, 5, 6, 7 6, 7, 8, 9 |
| 59 | B4 | Mod(SFN, 8) = 0 Mod(SFN, 8) = 1 | 6, 7, 8, 9 4, 5, 6, 7 |
| 60 | B4 | Mod(SFN, 4) = 0 Mod(SFN, 4) = 1 | 4, 5, 6, 7 6, 7, 8, 9 |
| 61 | B4 | Mod(SFN, 4) = 0 Mod(SFN, 4) = 1 | 6, 7, 8, 9 4, 5, 6, 7 |
| 62 | B4 | Mod(SFN, 2) = 0 Mod(SFN, 2) = 1 | 4, 5, 6, 7 6, 7, 8, 9 |
| 63 | B4 | Mod(SFN, 2) = 0 Mod(SFN, 2) = 1 | 6, 7, 8, 9 4, 5, 6, 7 |

In this case, a downlink signal block needs to occupy 4 milliseconds (ms), and the random access resource cannot be placed at a time of the downlink signal block in the system frame. For example, if the downlink signal block is located in slots numbered 0 to 3, the random access resource is located in one or more of slots numbered 4 to 9.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 5 and Table 6, random access resource time densities are the same (that is, one slot appears in every eight system frames), system frame positions are the same, but slot positions are different.

The mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 80 ms and/or the downlink signal is located in slots numbered 0 to 3, the mapping relationship between the random access configuration index and the combination [the slot in which the random access resource is located, the format of the random access preamble, the system frame position] is shown in Table 5 or Table 6. When the slot in which the downlink signal is located is another slot, the slot in which the random access resource is located may also change, provided that the slot in which the random access resource is located does not overlap the slot in which the downlink signal is located.

All the slots and system frames in the foregoing table are examples; however, slots and system frames are not limited to those in the table. For specific replacements thereof, refer to the descriptions about Table 3 and Table 4. Details are not described herein again.

Similarly, the slot in which the random access resource is located is not limited to those in Table 5 and Table 6 either. For specific replacements thereof, also refer to the descriptions about Table 3 and Table 4. Details are not described herein again.

In another embodiment, slot indexes corresponding to random access configuration indexes 58 to 63 may be other values. For example, when the random access configuration index is 58, and the system frame position Mod(SFN, 8)=1, the slot positions are the same as those when Mod(SFN, 8)=0, and are 4, 5, 6, and 7; or when the random access configuration index is 59, and the system frame position Mod(SFN, 8)=1, the slot positions are the same as those when Mod(SFN, 8)=0, and are 6, 7, 8, and 9. Similarly, when the random access configuration index is 60, 61, 62, or 63, similar operations may also exist.

Slot positions in Table 3, Table 4, Table 5, and Table 6 are based on a subcarrier spacing of 15 kHz. In another embodiment, a subcarrier spacing of uplink or downlink data is different from a subcarrier spacing of a random access preamble; therefore, slot duration corresponding to the subcarrier spacing of the uplink or downlink data is different from slot duration corresponding to the subcarrier spacing of the random access preamble. When the subcarrier spacing of the uplink or downlink data is different from the subcarrier spacing of the random access preamble, slots in the tables may be based on the subcarrier spacing of the random access preamble or may be based on the subcarrier spacing of the uplink or downlink data. Alternatively, the network device configures indication information Flag, where when Flag=0, it corresponds to the former manner; or when Flag=1, it corresponds to the latter manner. When slots in the random access resource configuration table are based on the subcarrier spacing of the uplink or downlink data, and the subcarrier spacing of the uplink or downlink data is different from the subcarrier spacing of the random access preamble, at least one of the time position indexes, the quantity of consecutive slots, and structures of random access preambles in the slots in Table 3, Table 4, Table 5, and Table 6 may be further adjusted, so that time alignment is accomplished for the random access resource and the uplink or downlink data on the network device and the terminal side.

For example, when the subcarrier spacing of the uplink or downlink data is 30 kHz, any slot index in Table 3, Table 4, Table 5, and Table 6 may correspond to two consecutive 30 kHz slots, and corresponding slot indexes and/or the quantity of consecutive slots are/is scaled. To be specific, if an index of a 15 kHz slot in which the random access preamble is located is k, the slot is adjusted to 30 kHz slots whose slot indexes are 2k and 2k+1. That is, an absolute time of the random access resource remains unchanged. In this case, a structure of the random access preamble in the slot may be further adjusted. For example, a structure of a random access preamble in one 15 kHz slot may be based on two consecutive 30 kHz slots k and k+1. For another example, two new 30 kHz slots k and k+1 each correspond to a half of a 15 kHz slot (that is, seven 15 kHz OFDM symbols, equivalent to any structure with sufficient random access resources after a configuration in which a quantity of symbols occupied by the downlink signal is less than seven 15 kHz OFDM symbols is excluded in Table 16, Table 17, Table 18, Table 19, Table 20, and Table 21). The foregoing adjustment manner and method may be predefined or prestored, or indicated by the network device (for example, when Flag=0, it corresponds to the former manner; or when Flag=1, it corresponds to the latter adjustment manner).

Similarly, there is a corresponding adjustment when the subcarrier spacing of the uplink or downlink data is 60 kHz. Details are not described herein again.

For example, Table 7 and Table 8 show a mapping relationship between the random access configuration index and the combination [the slot in which the random access resource is located, the format of the random access preamble, the system frame position] when the subcarrier spacing is 30 kHz and the maximum quantity of downlink signal blocks is 4.

In Table 7, slots in which random access resources are located are consecutive slots.

TABLE 7

| Random access configuration index | Format of the random access preamble | System frame position | Slot in which the random access resource is located |
|---|---|---|---|
| 0 | A0 | Mod(SFN, 4) = 0 | 4 |
| 1 | A0 | Mod(SFN, 4) = 0 | 12 |
| 2 | A0 | Mod(SFN, 2) = 0 | 4 |

TABLE 7-continued

| Random access configuration index | Format of the random access preamble | System frame position | Slot in which the random access resource is located |
|---|---|---|---|
| 3 | A0 | Mod(SFN, 2) = 0 | 12 |
| 4 | A0 | All system frames | 4 |
| 5 | A0 | All system frames | 12 |
| 6 | A0 | All system frames | 4, 5 |
| 7 | A0 | All system frames | 12, 13 |
| 8 | A0 | All system frames | 4, 5, 6, 7 |
| 9 | A0 | All system frames | 12, 13, 14, 15 |
| 10 | C0 | Mod(SFN, 4) = 0 | 4 |
| 11 | C0 | Mod(SFN, 4) = 0 | 12 |
| 12 | C0 | Mod(SFN, 2) = 0 | 4 |
| 13 | C0 | Mod(SFN, 2) = 0 | 12 |
| 14 | C0 | All system frames | 4 |
| 15 | C0 | All system frames | 12 |
| 16 | C0 | All system frames | 4, 5 |
| 17 | C0 | All system frames | 12, 13 |
| 18 | C0 | All system frames | 4, 5, 6, 7 |
| 19 | C0 | All system frames | 12, 13, 14, 15 |
| 20 | A1/B1 | Mod(SFN, 4) = 0 | 4 |
| 21 | A1/B1 | Mod(SFN, 4) = 0 | 12 |
| 22 | A1/B1 | Mod(SFN, 2) = 0 | 4 |
| 23 | A1/B1 | Mod(SFN, 2) = 0 | 12 |
| 24 | A1/B1 | All system frames | 4 |
| 25 | A1/B1 | All system frames | 12 |
| 26 | A1/B1 | All system frames | 4, 5 |
| 27 | A1/B1 | All system frames | 12, 13 |
| 28 | A1/B1 | All system frames | 4, 5, 6, 7 |
| 29 | A1/B1 | All system frames | 12, 13, 14, 15 |
| 30 | A2/B2 | Mod(SFN, 8) = 0 | 4, 5 |
| 31 | A2/B2 | Mod(SFN, 8) = 0 | 12, 13 |
| 32 | A2/B2 | Mod(SFN, 4) = 0 | 4, 5 |
| 33 | A2/B2 | Mod(SFN, 4) = 0 | 12, 13 |
| 34 | A2/B2 | Mod(SFN, 2) = 0 | 4, 5 |
| 35 | A2/B2 | Mod(SFN, 2) = 0 | 12, 13 |
| 36 | A2/B2 | All system frames | 4, 5 |
| 37 | A2/B2 | All system frames | 12, 13 |
| 38 | A2/B2 | All system frames | 4, 5, 6, 7 |
| 39 | A2/B2 | All system frames | 12, 13, 14, 15 |
| 40 | C2 | Mod(SFN, 8) = 0 | 4, 5 |
| 41 | C2 | Mod(SFN, 8) = 0 | 12, 13 |
| 42 | C2 | Mod(SFN, 4) = 0 | 4, 5 |
| 43 | C2 | Mod(SFN, 4) = 0 | 12, 13 |
| 44 | C2 | Mod(SFN, 2) = 0 | 4, 5 |
| 45 | C2 | Mod(SFN, 2) = 0 | 12, 13 |
| 46 | C2 | All system frames | 4, 5 |
| 47 | C2 | All system frames | 12, 13 |
| 48 | C2 | All system frames | 4, 5, 6, 7 |
| 49 | C2 | All system frames | 12, 13, 14, 15 |
| 50 | A3/B3 | Mod(SFN, 8) = 0 | 4, 5 |
| 51 | A3/B3 | Mod(SFN, 8) = 0 | 12, 13 |
| 52 | A3/B3 | Mod(SFN, 4) = 0 | 4, 5 |
| 53 | A3/B3 | Mod(SFN, 4) = 0 | 12, 13 |
| 54 | A3/B3 | Mod(SFN, 2) = 0 | 4, 5 |
| 55 | A3/B3 | Mod(SFN, 2) = 0 | 12, 13 |
| 56 | A3/B3 | All system frames | 4, 5 |
| 57 | A3/B3 | All system frames | 12, 13 |
| 58 | A3/B3 | All system frames | 4, 5, 6, 7 |
| 59 | A3/B3 | All system frames | 12, 13, 14, 15 |
| 60 | B4 | Mod(SFN, 8) = 0 | 4, 5, 6, 7 |
| 61 | B4 | Mod(SFN, 4) = 0 | 4, 5, 6, 7 |
| 62 | B4 | Mod(SFN, 2) = 0 | 4, 5, 6, 7 |
| 63 | B4 | All system frames | 4, 5, 6, 7 |

In Table 8, slots in which random access resources are located are inconsecutive slots.

TABLE 8

| Random access configuration index | Format of the random access preamble | System frame position | Slot in which the random access resource is located |
|---|---|---|---|
| 0 | A0 | Mod(SFN, 4) = 0 | 4 |
| 1 | A0 | Mod(SFN, 4) = 0 | 12 |
| 2 | A0 | Mod(SFN, 2) = 0 | 4 |

TABLE 8-continued

| Random access configuration index | Format of the random access preamble | System frame position | Slot in which the random access resource is located |
|---|---|---|---|
| 3 | A0 | Mod(SFN, 2) = 0 | 12 |
| 4 | A0 | All system frames | 4 |
| 5 | A0 | All system frames | 12 |
| 6 | A0 | All system frames | 4, 12 |
| 7 | A0 | All system frames | 5, 13 |
| 8 | A0 | All system frames | 4, 8, 12, 16 |
| 9 | A0 | All system frames | 6, 10, 14, 18 |
| 10 | C0 | Mod(SFN, 4) = 0 | 4 |
| 11 | C0 | Mod(SFN, 4) = 0 | 12 |
| 12 | C0 | Mod(SFN, 2) = 0 | 4 |
| 13 | C0 | Mod(SFN, 2) = 0 | 12 |
| 14 | C0 | All system frames | 4 |
| 15 | C0 | All system frames | 12 |
| 16 | C0 | All system frames | 4, 12 |
| 17 | C0 | All system frames | 5, 13 |
| 18 | C0 | All system frames | 4, 8, 12, 16 |
| 19 | C0 | All system frames | 6, 10, 14, 18 |
| 20 | A1/B1 | Mod(SFN, 4) = 0 | 4 |
| 21 | A1/B1 | Mod(SFN, 4) = 0 | 12 |
| 22 | A1/B1 | Mod(SFN, 2) = 0 | 4 |
| 23 | A1/B1 | Mod(SFN, 2) = 0 | 12 |
| 24 | A1/B1 | All system frames | 4 |
| 25 | A1/B1 | All system frames | 12 |
| 26 | A1/B1 | All system frames | 4, 12 |
| 27 | A1/B1 | All system frames | 5, 13 |
| 28 | A1/B1 | All system frames | 4, 8, 12, 16 |
| 29 | A1/B1 | All system frames | 6, 10, 14, 18 |
| 30 | A2/B2 | Mod(SFN, 8) = 0 | 4, 12 |
| 31 | A2/B2 | Mod(SFN, 8) = 0 | 5, 13 |
| 32 | A2/B2 | Mod(SFN, 4) = 0 | 4.12 |
| 33 | A2/B2 | Mod(SFN, 4) = 0 | 5, 13 |
| 34 | A2/B2 | Mod(SFN, 2) = 0 | 4, 12 |
| 35 | A2/B2 | Mod(SFN, 2) = 0 | 5, 13 |
| 36 | A2/B2 | All system frames | 4, 12 |
| 37 | A2/B2 | All system frames | 5, 13 |
| 38 | A2/B2 | All system frames | 4, 8, 12, 16 |
| 39 | A2/B2 | All system frames | 6, 10, 14, 18 |
| 40 | C2 | Mod(SFN, 8) = 0 | 4, 12 |
| 41 | C2 | Mod(SFN, 8) = 0 | 5, 13 |
| 42 | C2 | Mod(SFN, 4) = 0 | 4, 12 |
| 43 | C2 | Mod(SFN, 4) = 0 | 5, 13 |
| 44 | C2 | Mod(SFN, 2) = 0 | 4, 12 |
| 45 | C2 | Mod(SFN, 2) = 0 | 5, 13 |
| 46 | C2 | All system frames | 4, 12 |
| 47 | C2 | All system frames | 5, 13 |
| 48 | C2 | All system frames | 4, 8, 12, 16 |
| 49 | C2 | All system frames | 6, 10, 14, 18 |
| 50 | A3/B3 | Mod(SFN, 8) = 0 | 4, 12 |
| 51 | A3/B3 | Mod(SFN, 8) = 0 | 5, 13 |
| 52 | A3/B3 | Mod(SFN, 4) = 0 | 4, 12 |
| 53 | A3/B3 | Mod(SFN, 4) = 0 | 5, 13 |
| 54 | A3/B3 | Mod(SFN, 2) = 0 | 4, 12 |
| 55 | A3/B3 | Mod(SFN, 2) = 0 | 5, 13 |
| 56 | A3/B3 | All system frames | 4, 12 |
| 57 | A3/B3 | All system frames | 5, 13 |
| 58 | A3/B3 | All system frames | 4, 8, 12, 16 |
| 59 | A3/B3 | All system frames | 6, 10, 14, 18 |
| 60 | B4 | Mod(SFN, 8) = 0 | 4, 8, 12, 16 |
| 61 | B4 | Mod(SFN, 4) = 0 | 4, 8, 12, 16 |
| 62 | B4 | Mod(SFN, 2) = 0 | 4, 8, 12, 16 |
| 63 | B4 | All system frames | 4, 8, 12, 16 |

In this case, a downlink signal block needs to occupy 4 milliseconds (ms), and the random access resource cannot be placed at a time of the downlink signal block in the system frame. In addition, for a scenario in which a subcarrier spacing is 30 kHz, considering coexistence with a scenario in which a subcarrier spacing is 15 kHz, duration without a random access resource is 2 ms. For example, if the downlink signal block is located in slots numbered 0 and 1, the random access resource is located in one or more of slots numbered 5 to 19. For another example, if the downlink signal block is located in slots numbered 2 and 3, the random access resource is located in one or more of slots numbered 0, 1, and 6 to 19.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 7 and Table 8, random access resource time densities are the same (that is, one slot appears in every eight system frames), system frame positions are the same, but slot positions are different.

The mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 80 ms and/or the downlink signal is located in slots numbered 0 and 1, the mapping relationship between the random access configuration index and the combination [the slot in which the random access resource is located, the format of the random access preamble, the system frame position] is shown in Table 7 or Table 8. When the slot in which the downlink signal is located is another slot, the slot in which the random access resource is located may also change, provided that the slot in which the random access resource is located does not overlap the slot in which the downlink signal is located.

All the slots and system frames in the foregoing table are examples; however, slots and system frames are not limited to those in the table. For specific replacements thereof, refer to the descriptions about Table 3 and Table 4. Details are not described herein again.

Similarly, the slot in which the random access resource is located is not limited to those in Table 7 and Table 8 either. For specific replacements thereof, also refer to the descriptions about Table 3 and Table 4. Details are not described herein again.

In another embodiment, slot indexes corresponding to random access configuration indexes 58 to 63 may be other values. For example, when the random access configuration index is 58, and the system frame position Mod(SFN, 8)=1, the slot positions are the same as those when Mod(SFN, 8)=0, and are 8, 9, 10, and 11; or when the random access configuration index is 59, and the system frame position Mod(SFN, 8)=1, the slot positions are the same as those when Mod(SFN, 8)=0, and are 14, 15, 16, and 17. Similarly, when the random access configuration index is 60, 61, 62, or 63, similar operations may also exist.

Slot positions in Table 7, Table 8, Table 9, and Table 10 are based on a subcarrier spacing of 30 kHz. In another embodiment, a subcarrier spacing of uplink or downlink data is different from a subcarrier spacing of a random access preamble; therefore, slot duration corresponding to the subcarrier spacing of the uplink or downlink data is different from slot duration corresponding to the subcarrier spacing of the random access preamble. When the subcarrier spacing of the uplink or downlink data is different from the subcarrier spacing of the random access preamble, slots in the random access resource configuration table may be based on the subcarrier spacing of the random access preamble or may be based on the subcarrier spacing of the uplink or downlink data. Alternatively, the network device configures indication information Flag, where when Flag=0, it corresponds to the former manner; or when Flag=1, it corresponds to the latter manner. When slots in the random access resource configuration table are based on the subcarrier spacing of the uplink or downlink data, and the subcarrier spacing of the uplink or downlink data is different from the subcarrier spacing of the random access preamble, at least one of the time position indexes, the quantity of consecutive slots, and a structure of random access preambles in the slots in Table 7, Table 8, Table 9, and Table 10 may be further adjusted, so that time alignment is accomplished for the random access resource and the uplink or downlink data on the network device and the terminal side.

For example, when the subcarrier spacing of the uplink or downlink data is 60 kHz, any slot index in Table 7, Table 8, Table 9, and Table 10 may correspond to two consecutive 60 kHz slots, and corresponding slot indexes and/or the quantity of consecutive slots are/is scaled. To be specific, if an index of a 30 kHz slot in which the random access preamble is located is k, the slot is adjusted to 60 kHz slots whose slot indexes are 2k and 2k+1. That is, an absolute time of the random access resource remains unchanged. In this case, a structure of the random access preamble in the slot may be further adjusted. For example, a structure of a random access preamble in one 30 kHz slot may be based on two consecutive 60 kHz slots k and k+1. For another example, two new 60 kHz slots k and k+1 each correspond to a half of a 30 kHz slot (that is, seven 30 kHz OFDM symbols, equivalent to any structure with sufficient random access resources after a configuration in which a quantity of symbols occupied by the downlink signal is less than seven 30 kHz OFDM symbols is excluded in Table 16, Table 17, Table 18, Table 19, Table 20, and Table 21). The foregoing adjustment manner and method may be predefined or prestored, or indicated by the network device (for example, when Flag=0, it corresponds to the former manner; or when Flag=1, it corresponds to the latter adjustment manner).

For example, when the subcarrier spacing of the uplink or downlink data is 15 kHz, any slot index in Table 7, Table 8, Table 9, and Table 10 may correspond to a half of a 15 kHz slot, and corresponding slot indexes and/or the quantity of consecutive slots are/is scaled. To be specific, if an index of a 30 kHz slot in which the random access preamble is located is k, the slot is adjusted to a half of a 15 kHz slot; or if the random access preamble is located in two consecutive 30 kHz slots whose indexes are k and k+1, the slot is adjusted to one 15 kHz slot. That is, an absolute time of the random access resource remains unchanged. In this case, the structure of the random access preamble in the slot may be further adjusted. For example, a structure of a random access preamble in one 15 kHz slot may be based on two consecutive 30 kHz slots k and k+1. For another example, a half of a 15 kHz slot corresponds to one 30 kHz slot. The foregoing adjustment manner and method may be predefined or prestored, or indicated by the network device (for example, when Flag=0, it corresponds to the former manner; or when Flag=1, it corresponds to the latter adjustment manner).

For example, Table 9 and Table 10 show a mapping relationship between the random access configuration index and the combination [the slot in which the random access resource is located, the format of the random access preamble, the system frame position] when the subcarrier spacing is 30 kHz and the maximum quantity of downlink signal blocks is 8.

In Table 9, slots in which random access resources are located are consecutive slots.

TABLE 9

| Random access configuration index | Format of the random access preamble | System frame position | Slot in which the random access resource is located |
|---|---|---|---|
| 0 | A0 | Mod(SFN, 4) = 0 | 8 |
| 1 | A0 | Mod(SFN, 4) = 0 | 14 |
| 2 | A0 | Mod(SFN, 2) = 0 | 8 |
| 3 | A0 | Mod(SFN, 2) = 0 | 14 |
| 4 | A0 | All system frames | 8 |
| 5 | A0 | All system frames | 14 |
| 6 | A0 | All system frames | 8, 9 |
| 7 | A0 | All system frames | 14, 15 |
| 8 | A0 | All system frames | 8, 9, 10, 11 |
| 9 | A0 | All system frames | 14, 15, 16, 17 |
| 10 | C0 | Mod(SFN, 4) = 0 | 8 |
| 11 | C0 | Mod(SFN, 4) = 0 | 14 |
| 12 | C0 | Mod(SFN, 2) = 0 | 8 |
| 13 | C0 | Mod(SFN, 2) = 0 | 14 |
| 14 | C0 | All system frames | 8 |
| 15 | C0 | All system frames | 14 |
| 16 | C0 | All system frames | 8, 9 |
| 17 | C0 | All system frames | 14, 15 |
| 18 | C0 | All system frames | 8, 9, 10, 11 |
| 19 | C0 | All system frames | 14, 15, 16, 17 |
| 20 | A1/B1 | Mod(SFN, 4) = 0 | 8, 9 |
| 21 | A1/B1 | Mod(SFN, 4) = 0 | 14, 15 |
| 22 | A1/B1 | Mod(SFN, 2) = 0 | 8, 9 |
| 23 | A1/B1 | Mod(SFN, 2) = 0 | 14, 15 |
| 24 | A1/B1 | All system frames | 8, 9 |
| 25 | A1/B1 | All system frames | 14, 15 |
| 26 | A1/B1 | All system frames | 8, 9 |
| 27 | A1/B1 | All system frames | 14, 15 |
| 28 | A1/B1 | All system frames | 8, 9, 10, 11 |
| 29 | A1/B1 | All system frames | 14, 15, 16, 17 |
| 30 | A2/B2 | Mod(SFN, 8) = 0 | 8, 9, 10, 11 |
| 31 | A2/B2 | Mod(SFN, 8) = 0 | 14, 15, 16, 17 |
| 32 | A2/B2 | Mod(SFN, 4) = 0 | 8, 9, 10, 11 |
| 33 | A2/B2 | Mod(SFN, 4) = 0 | 14, 15, 16, 17 |
| 34 | A2/B2 | Mod(SFN, 2) = 0 | 8, 9, 10, 11 |
| 35 | A2/B2 | Mod(SFN, 2) = 0 | 14, 15, 16, 17 |
| 36 | A2/B2 | All system frames | 8, 9, 10, 11 |
| 37 | A2/B2 | All system frames | 14, 15, 16, 17 |
| 38 | A2/B2 | All system frames | 8, 9, 10, 11 |
| 39 | A2/B2 | All system frames | 14, 15, 16, 17 |
| 40 | C2 | Mod(SFN, 8) = 0 | 8, 9, 10, 11 |
| 41 | C2 | Mod(SFN, 8) = 0 | 14, 15, 16, 17 |
| 42 | C2 | Mod(SFN, 4) = 0 | 8, 9, 10, 11 |
| 43 | C2 | Mod(SFN, 4) = 0 | 14, 15, 16, 17 |
| 44 | C2 | Mod(SFN, 2) = 0 | 8, 9, 10, 11 |
| 45 | C2 | Mod(SFN, 2) = 0 | 14, 15, 16, 17 |
| 46 | C2 | All system frames | 8, 9, 10, 11 |
| 47 | C2 | All system frames | 14, 15, 16, 17 |
| 48 | C2 | All system frames | 8, 9, 10, 11 |
| 49 | C2 | All system frames | 14, 15, 16, 17 |

TABLE 9-continued

| Random access configuration index | Format of the random access preamble | System frame position | Slot in which the random access resource is located |
|---|---|---|---|
| 50 | A3/B3 | Mod(SFN, 8) = 0 | 8, 9, 10, 11 |
| 51 | A3/B3 | Mod(SFN, 8) = 0 | 14, 15, 16, 17 |
| 52 | A3/B3 | Mod(SFN, 4) = 0 | 8, 9, 10, 11 |
| 53 | A3/B3 | Mod(SFN, 4) = 0 | 14, 15, 16, 17 |
| 54 | A3/B3 | Mod(SFN, 2) = 0 | 8, 9, 10, 11 |
| 55 | A3/B3 | Mod(SFN, 2) = 0 | 14, 15, 16, 17 |
| 56 | A3/B3 | All system frames | 8, 9, 10, 11 |
| 57 | A3/B3 | All system frames | 14, 15, 16, 17 |
| 58 | B4 | Mod(SFN, 8) = 0 | 8, 9, 10, 11 |
|  |  | Mod(SFN, 8) = 1 | 14, 15, 16, 17 |
| 59 | B4 | Mod(SFN, 8) = 0 | 14, 15, 16, 17 |
|  |  | Mod(SFN, 8) = 1 | 8, 9, 10, 11 |
| 60 | B4 | Mod(SFN, 4) = 0 | 8, 9, 10, 11 |
|  |  | Mod(SFN, 4) = 1 | 14, 15, 16, 17 |
| 61 | B4 | Mod(SFN, 4) = 0 | 14, 15, 16, 17 |
|  |  | Mod(SFN, 4) = 1 | 8, 9, 10, 11 |
| 62 | B4 | Mod(SFN, 2) = 0 | 8, 9, 10, 11 |
|  |  | Mod(SFN, 2) = 1 | 14, 15, 16, 17 |
| 63 | B4 | Mod(SFN, 2) = 0 | 14, 15, 16, 17 |
|  |  | Mod(SFN, 2) = 1 | 8, 9, 10, 11 |

In Table 10, slots in which random access resources are located are inconsecutive slots.

TABLE 10

| Random access configuration index | Format of the random access preamble | System frame position | Slot in which the random access resource is located |
|---|---|---|---|
| 0 | A0 | Mod(SFN, 4) = 0 | 8 |
| 1 | A0 | Mod(SFN, 4) = 0 | 14 |
| 2 | A0 | Mod(SFN, 2) = 0 | 8 |
| 3 | A0 | Mod(SFN, 2) = 0 | 14 |
| 4 | A0 | All system frames | 8 |
| 5 | A0 | All system frames | 14 |
| 6 | A0 | All system frames | 8, 14 |
| 7 | A0 | All system frames | 9, 15 |
| 8 | A0 | All system frames | 8, 9, 14, 15 |
| 9 | A0 | All system frames | 10, 11, 16, 17 |
| 10 | C0 | Mod(SFN, 4) = 0 | 8 |
| 11 | C0 | Mod(SFN, 4) = 0 | 14 |
| 12 | C0 | Mod(SFN, 2) = 0 | 8 |
| 13 | C0 | Mod(SFN, 2) = 0 | 14 |
| 14 | C0 | All system frames | 8 |
| 15 | C0 | All system frames | 14 |
| 16 | C0 | All system frames | 8, 14 |
| 17 | C0 | All system frames | 9, 15 |
| 18 | C0 | All system frames | 8, 9, 14, 15 |
| 19 | C0 | All system frames | 10, 11, 16, 17 |
| 20 | A1/B1 | Mod(SFN, 4) = 0 | 8, 14 |
| 21 | A1/B1 | Mod(SFN, 4) = 0 | 9, 15 |
| 22 | A1/B1 | Mod(SFN, 2) = 0 | 8, 14 |
| 23 | A1/B1 | Mod(SFN, 2) = 0 | 9, 15 |
| 24 | A1/B1 | All system frames | 8, 14 |
| 25 | A1/B1 | All system frames | 9, 15 |
| 26 | A1/B1 | All system frames | 8, 14 |
| 27 | A1/B1 | All system frames | 9, 15 |
| 28 | A1/B1 | All system frames | 8, 9, 14, 15 |
| 29 | A1/B1 | All system frames | 10, 11, 16, 17 |
| 30 | A2/B2 | Mod(SFN, 8) = 0 | 8, 9, 14, 15 |
| 31 | A2/B2 | Mod(SFN, 8) = 0 | 10, 11, 16, 17 |
| 32 | A2/B2 | Mod(SFN, 4) = 0 | 8, 9, 14, 15 |
| 33 | A2/B2 | Mod(SFN, 4) = 0 | 10, 11, 16, 17 |
| 34 | A2/B2 | Mod(SFN, 2) = 0 | 8, 9, 14, 15 |
| 35 | A2/B2 | Mod(SFN, 2) = 0 | 10, 11, 16, 17 |
| 36 | A2/B2 | All system frames | 8, 9, 14, 15 |
| 37 | A2/B2 | All system frames | 10, 11, 16, 17 |
| 38 | A2/B2 | All system frames | 8, 9, 14, 15 |
| 39 | A2/B2 | All system frames | 10, 11, 16, 17 |
| 40 | C2 | Mod(SFN, 8) = 0 | 8, 9, 14, 15 |
| 41 | C2 | Mod(SFN, 8) = 0 | 10, 11, 16, 17 |
| 42 | C2 | Mod(SFN, 4) = 0 | 8, 9, 14, 15 |
| 43 | C2 | Mod(SFN, 4) = 0 | 10, 11, 16, 17 |
| 44 | C2 | Mod(SFN, 2) = 0 | 8, 9, 14, 15 |
| 45 | C2 | Mod(SFN, 2) = 0 | 10, 11, 16, 17 |
| 46 | C2 | All system frames | 8, 9, 14, 15 |
| 47 | C2 | All system frames | 10, 11, 16, 17 |
| 48 | C2 | All system frames | 8, 9, 14, 15 |
| 49 | C2 | All system frames | 10, 11, 16, 17 |
| 50 | A3/B3 | Mod(SFN, 8) = 0 | 8, 9, 14, 15 |
| 51 | A3/B3 | Mod(SFN, 8) = 0 | 10, 11, 16, 17 |
| 52 | A3/B3 | Mod(SFN, 4) = 0 | 8, 9, 14, 15 |
| 53 | A3/B3 | Mod(SFN, 4) = 0 | 10, 11, 16, 17 |
| 54 | A3/B3 | Mod(SFN, 2) = 0 | 8, 9, 14, 15 |
| 55 | A3/B3 | Mod(SFN, 2) = 0 | 10, 11, 16, 17 |
| 56 | A3/B3 | All system frames | 8, 9, 14, 15 |
| 57 | A3/B3 | All system frames | 10, 11, 16, 17 |
| 58 | B4 | Mod(SFN, 8) = 0 | 8, 9, 14, 15 |
|  |  | Mod(SFN, 8) = 1 | 10, 11, 16, 17 |
| 59 | B4 | Mod(SFN, 8) = 0 | 10, 11, 16, 17 |
|  |  | Mod(SFN, 8) = 1 | 8, 9, 14, 15 |
| 60 | B4 | Mod(SFN, 4) = 0 | 8, 9, 14, 15 |
|  |  | Mod(SFN, 4) = 1 | 10, 11, 16, 17 |
| 61 | B4 | Mod(SFN, 4) = 0 | 10, 11, 16, 17 |
|  |  | Mod(SFN, 4) = 1 | 8, 9, 14, 15 |
| 62 | B4 | Mod(SFN, 2) = 0 | 8, 9, 14, 15 |
|  |  | Mod(SFN, 2) = 1 | 10, 11, 16, 17 |
| 63 | B4 | Mod(SFN, 2) = 0 | 10, 11, 16, 17 |
|  |  | Mod(SFN, 2) = 1 | 8, 9, 14, 15 |

In this case, a downlink signal block needs to occupy 2 milliseconds (ms), and the random access resource cannot be placed at a time of the downlink signal block in the system frame. In addition, for a scenario in which a subcarrier spacing is 30 kHz, considering coexistence with a scenario in which a subcarrier spacing is 15 kHz, duration without a random access resource is 2 ms. For example, if the downlink signal block is located in slots numbered 0 to 3, the random access resource is located in one or more of slots numbered 8 to 19. For another example, if the downlink signal block is located in slots numbered 4 to 7, the random access resource is located in one or more of slots numbered 0, 1, 2, 3, and 12 to 19.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 9 and Table 10, random access resource time densities are the same (that is, one slot appears in every eight system frames), system frame positions are the same, but slot positions are different.

The mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 80 ms and/or the downlink signal is located in slots numbered 0 to 3, the mapping relationship between the random access configuration index and the combination [the slot in which the random access resource is located, the format of the random access preamble, the system frame position] is shown in Table 9 or Table 10. When the slot in which the downlink signal is located is another slot, the slot in which the random access resource is located may also change, provided that the slot in which the random access resource is located does not overlap the slot in which the downlink signal is located.

All the slots and system frames in the foregoing table are examples; however, slots and system frames are not limited to those in the table. For specific replacements thereof, refer to the descriptions about Table 3 and Table 4. Details are not described herein again.

Similarly, the slot in which the random access resource is located is not limited to those in Table 9 and Table 10 either. For specific replacements thereof, also refer to the descriptions about Table 3 and Table 4. Details are not described herein again.

In another embodiment, slot indexes corresponding to random access configuration indexes 58 to 63 may be other values. For example, when the random access configuration index in Table 9 is 58, and the system frame position Mod(SFN, 16)=1, the slot positions are different from those when Mod(SFN, 16)=0, and are 24 to 39; or when the random access configuration index is 59, and the system frame position Mod(SFN, 16)=0, the slot positions are different from those when Mod(SFN, 16)=1, and are 24 to 39. Similarly, for any plurality of Mod(SFN, 16)=0, Mod (SFN, 16)=1, Mod(SFN, 16)=2, and Mod(SFN, 16)=3, similar adjustments may be performed. Details are not described herein again.

For another example, when the random access configuration index in Table 10 is 58, and the system frame position Mod(SFN, 16)=1, the slot positions are different from those when Mod(SFN, 16)=0, and are 8 to 39; or when the random access configuration index is 59, and the system frame position Mod(SFN, 16)=0, the slot positions are different from those when Mod(SFN, 16)=1, and are 8 to 39. Similarly, when the random access configuration index is 60, 61, 62, or 63, similar operations may also exist.

Slot positions in Table 9 and Table 10 are based on a subcarrier spacing of 60 kHz. In another embodiment, a subcarrier spacing of uplink or downlink data is different from a subcarrier spacing of a random access preamble; therefore, slot duration corresponding to the subcarrier spacing of the uplink or downlink data is different from slot duration corresponding to the subcarrier spacing of the random access preamble. When the subcarrier spacing of the uplink or downlink data is different from the subcarrier spacing of the random access preamble, slots in the random access resource configuration table may be based on the subcarrier spacing of the random access preamble or may be based on the subcarrier spacing of the uplink or downlink data. Alternatively, the network device configures indication information Flag, where when Flag=0, it corresponds to the former manner; or when Flag=1, it corresponds to the latter manner. When slots in the random access resource configuration table are based on the subcarrier spacing of the uplink or downlink data, and the subcarrier spacing of the uplink or downlink data is different from the subcarrier spacing of the random access preamble, at least one of the time position indexes, the quantity of consecutive slots, and structures of random access preambles in the slots in Table 9 and Table 10 may be further adjusted, so that time alignment is accomplished for the random access resource and the uplink or downlink data on the network device and the terminal side.

For example, when the subcarrier spacing of the uplink or downlink data is 120 kHz, any slot index in Table 9 and Table 10 may correspond to two consecutive 120 kHz slots, and corresponding slot indexes and/or the quantity of consecutive slots are/is scaled. To be specific, if an index of a 60 kHz slot in which the random access preamble is located is k, the slot is adjusted to 120 kHz slots whose slot indexes are 2k and 2k+1. That is, an absolute time of the random access resource remains unchanged. In this case, a structure of the random access preamble in the slot may be further adjusted. For example, a structure of a random access preamble in one 60 kHz slot may be duration of two consecutive 120 kHz slots k and k+1. For another example, two new 120 kHz slots k and k+1 each correspond to a half of a 60 kHz slot (that is, seven 60 kHz OFDM symbols, equivalent to any structure with sufficient random access resources after a configuration in which a quantity of symbols occupied by the downlink signal is less than seven 60 kHz OFDM symbols is excluded in Table 16, Table 17, Table 18, Table 19, Table 20, and Table 21). The foregoing adjustment manner and method may be predefined or prestored, or indicated by the network device (for example, when Flag=0, it corresponds to the former manner; or when Flag=1, it corresponds to the latter adjustment manner).

For example, when the subcarrier spacing of the uplink or downlink data is 30 kHz, any slot index in Table 9 and Table 10 may correspond to a half of a 30 kHz slot, and corresponding slot indexes and/or the quantity of consecutive slots are/is scaled. To be specific, if an index of a 60 kHz slot in which the random access preamble is located is k, the slot is adjusted to a half of a 30 kHz slot; or if the random access preamble is located in two consecutive 60 kHz slots whose indexes are 2k and 2k+1, the slot is adjusted to one 30 kHz slot. That is, an absolute time of the random access resource remains unchanged. In this case, the structure of the random access preamble in the slot may be further adjusted. For example, a structure of a random access preamble in one 30 kHz slot may be based on two consecutive 60 kHz slots k and k+1. For another example, a half of a 30 kHz slot corresponds to one 60 kHz slot. The foregoing adjustment manner and method may be predefined or prestored, or indicated by the network device (for example, when Flag=0, it corresponds to the former manner; or when Flag=1, it corresponds to the latter adjustment manner).

For example, when the subcarrier spacing of the uplink or downlink data is 15 kHz, any slot index in Table 9 and Table 10 may correspond to ¼ of one 15 kHz slot (for example, two to four 15 kHz OFDM symbols), and corresponding slot indexes and/or the quantity of consecutive slots are/is scaled. To be specific, if an index of a 60 kHz slot in which the random access preamble is located is k, the slot is adjusted to ¼ of one 15 kHz slot; or if the random access preamble is located in two consecutive 60 kHz slots whose indexes are k and k+1, the slot is adjusted to a half of one 15 kHz slot; or if the random access preamble is located in four consecutive 60 kHz slots whose indexes are k to k+3, the slot is adjusted to one 15 kHz slot. That is, an absolute time of the random access resource remains unchanged. In this case, the structure of the random access preamble in the slot may be further adjusted. For example, a structure of a random access preamble in one 15 kHz slot may be based on four consecutive 60 kHz slots k to k+3. For another example, a structure of a random access preamble in a half of a 15 kHz slot may be based on two consecutive 60 kHz slots k and k+1. For another example, ¼ of one 15 kHz slot corresponds to one 60 kHz slot. The foregoing adjustment manner and method may be predefined or prestored, or indicated by the network device (for example, when Flag=0, it corresponds to the first manner; when Flag=1, it corresponds to the second adjustment manner; or when Flag=2, it corresponds to the third adjustment manner).

For example, Table 11 and Table 12 show a mapping relationship between the random access configuration index and the combination [the slot in which the random access resource is located, the format of the random access preamble, the system frame position] when the subcarrier spacing is 60 kHz and the maximum quantity of downlink signal blocks is 64.

In Table 11, the random access resource is placed in one or more of slots numbered 20 to 29.

TABLE 11

| Random access configuration index | Format of the random access preamble | System frame position | Slot in which the random access resource is located |
|---|---|---|---|
| 0 | A0 | Mod(SFN, 8) = 0 | 20 to 27 |
| 1 | A0 | Mod(SFN, 8) = 0 | 32 to 39 |
| 2 | A0 | Mod(SFN, 4) = 0 | 20 to 27 |
| 3 | A0 | Mod(SFN, 4) = 0 | 32 to 39 |
| 4 | A0 | Mod(SFN, 2) = 0 | 20 to 27 |
| 5 | A0 | Mod(SFN, 2) = 0 | 32 to 39 |
| 6 | A0 | All system frames | 20 to 27 |
| 7 | A0 | All system frames | 32 to 39 |
| 8 | A0 | N/A | N/A |
| 9 | A0 | N/A | N/A |
| 10 | C0 | Mod(SFN, 8) = 0 | 20 to 27 |
| 11 | C0 | Mod(SFN, 8) = 0 | 32 to 39 |
| 12 | C0 | Mod(SFN, 4) = 0 | 20 to 27 |
| 13 | C0 | Mod(SFN, 4) = 0 | 32 to 39 |
| 14 | C0 | Mod(SFN, 2) = 0 | 20 to 27 |
| 15 | C0 | Mod(SFN, 2) = 0 | 32 to 39 |
| 16 | C0 | All system frames | 20 to 27 |
| 17 | C0 | All system frames | 32 to 39 |
| 18 | C0 | N/A | N/A |
| 19 | C0 | N/A | N/A |
| 20 | A1/B1 | Mod(SFN, 8) = 0 | 20 to 27 |
|  |  | Mod(SFN, 8) = 1 | 20 to 27 |
| 21 | A1/B1 | Mod(SFN, 8) = 0 | 32 to 39 |
|  |  | Mod(SFN, 8) = 1 | 32 to 39 |
| 22 | A1/B1 | Mod(SFN, 4) = 0 | 20 to 27 |
|  |  | Mod(SFN, 4) = 1 | 20 to 27 |
| 23 | A1/B1 | Mod(SFN, 4) = 0 | 32 to 39 |
|  |  | Mod(SFN, 4) = 1 | 32 to 39 |
| 24 | A1/B1 | Mod(SFN, 2) = 0 | 20 to 27 |
|  |  | Mod(SFN, 2) = 1 | 20 to 27 |
| 25 | A1/B1 | Mod(SFN, 2) = 0 | 32 to 39 |
|  |  | Mod(SFN, 2) = 1 | 32 to 39 |
| 26 | A1/B1 | N/A | N/A |
| 27 | A1/B1 | N/A | N/A |
| 28 | A1/B1 | N/A | N/A |
| 29 | A1/B1 | N/A | N/A |
| 30 | A2/B2 | Mod(SFN, 8) = 0 | 20 to 35 |
|  |  | Mod(SFN, 8) = 1 | 20 to 35 |
| 31 | A2/B2 | Mod(SFN, 8) = 2 | 20 to 35 |
|  |  | Mod(SFN, 8) = 3 | 20 to 35 |
| 32 | A2/B2 | Mod(SFN, 4) = 0 | 20 to 35 |
|  |  | Mod(SFN, 4) = 1 | 20 to 35 |
| 33 | A2/B2 | Mod(SFN, 4) = 2 | 20 to 35 |
|  |  | Mod(SFN, 4) = 3 | 20 to 35 |
| 34 | A2/B2 | N/A | N/A |
| 35 | A2/B2 | N/A | N/A |
| 36 | A2/B2 | N/A | N/A |
| 37 | A2/B2 | N/A | N/A |
| 38 | A2/B2 | N/A | N/A |
| 39 | A2/B2 | N/A | N/A |
| 40 | C2 | Mod(SFN, 8) = 0 | 20 to 35 |
|  |  | Mod(SFN, 8) = 1 | 20 to 35 |
| 41 | C2 | Mod(SFN, 8) = 2 | 20 to 35 |
|  |  | Mod(SFN, 8) = 3 | 20 to 35 |
| 42 | C2 | Mod(SFN, 4) = 0 | 20 to 35 |
|  |  | Mod(SFN, 4) = 1 | 20 to 35 |
| 43 | C2 | Mod(SFN, 4) = 2 | 20 to 35 |
|  |  | Mod(SFN, 4) = 3 | 20 to 35 |
| 44 | C2 | N/A | N/A |
| 45 | C2 | N/A | N/A |
| 46 | C2 | N/A | N/A |
| 47 | C2 | N/A | N/A |
| 48 | C2 | N/A | N/A |
| 49 | C2 | N/A | N/A |
| 50 | A3/B3 | Mod(SFN, 8) = 0 | 20 to 35 |
|  |  | Mod(SFN, 8) = 1 | 20 to 35 |
| 51 | A3/B3 | Mod(SFN, 8) = 2 | 20 to 35 |
|  |  | Mod(SFN, 8) = 3 | 20 to 35 |
| 52 | A3/B3 | Mod(SFN, 4) = 0 | 20 to 35 |
|  |  | Mod(SFN, 4) = 1 | 20 to 35 |
| 53 | A3/B3 | Mod(SFN, 4) = 2 | 20 to 35 |
|  |  | Mod(SFN, 4) = 3 | 20 to 35 |
| 54 | A3/B3 | N/A | N/A |
| 55 | A3/B3 | N/A | N/A |
| 56 | A3/B3 | N/A | N/A |
| 57 | A3/B3 | N/A | N/A |
| 58 | B4 | Mod(SFN, 16) = 0 | 20 to 35 |
|  |  | Mod(SFN, 16) = 1 | 20 to 35 |
|  |  | Mod(SFN, 16) = 2 | 20 to 35 |
|  |  | Mod(SFN, 16) = 3 | 20 to 35 |
| 59 | B4 | Mod(SFN, 8) = 0 | 20 to 35 |
|  |  | Mod(SFN, 8) = 1 | 20 to 35 |
|  |  | Mod(SFN, 8) = 2 | 20 to 35 |
|  |  | Mod(SFN, 8) = 3 | 20 to 35 |
| 60 | B4 | N/A | N/A |
| 61 | B4 | N/A | N/A |
| 62 | B4 | N/A | N/A |
| 63 | B4 | N/A | N/A |

In Table 12, random access resources may be placed in all positions in the system frame.

TABLE 12

| Random access configuration index | Format of the random access preamble | System frame position | Slot in which the random access resource is located |
|---|---|---|---|
| 0 | A0 | Mod(SFN, 8) = 0 | 0, 2, 4, 6, 8, 10, 12, 14 |
| 1 | A0 | Mod(SFN, 8) = 0 | 1, 3, 5, 7, 9, 11, 13, 15 |
| 2 | A0 | Mod(SFN, 4) = 0 | 0, 2, 4, 6, 8, 10, 12, 14 |
| 3 | A0 | Mod(SFN, 4) = 0 | 1, 3, 7, 9, 11, 13, 15 |
| 4 | A0 | Mod(SFN, 2) = 0 | 0, 2, 4, 6, 8, 10, 12, 14 |
| 5 | A0 | Mod(SFN, 2) = 0 | 1, 3, 7, 9, 11, 13, 15 |
| 6 | A0 | All system frames | 0, 2, 4, 8, 10, 12, 14 |

TABLE 12-continued

| Random access configuration index | Format of the random access preamble | System frame position | Slot in which the random access resource is located |
|---|---|---|---|
| 7 | A0 | All system frames | 1, 3, 7, 9, 11, 13, 15 |
| 8 | A0 | N/A | N/A |
| 9 | A0 | N/A | N/A |
| 10 | C0 | Mod(SFN, 8) = 0 | 0, 2, 4, 6, 8, 10, 12, 14 |
| 11 | C0 | Mod(SFN, 8) = 0 | 1, 3, 7, 9, 11, 13, 15 |
| 12 | C0 | Mod(SFN, 4) = 0 | 0, 2, 4, 6, 8, 10, 12, 14 |
| 13 | C0 | Mod(SFN, 4) = 0 | 1, 3, 5, 7, 9, 11, 13, 15 |
| 14 | C0 | Mod(SFN, 2) = 0 | 0, 2, 4, 6, 8, 10, 12, 14 |
| 15 | C0 | Mod(SFN, 2) = 0 | 1, 3, 5, 7, 9, 11, 13, 15 |
| 16 | C0 | All system frames | 0, 2, 4, 6, 8, 10, 12, 14 |
| 17 | C0 | All system frames | 1, 3, 5, 7, 9, 11, 13, 15 |
| 18 | C0 | N/A | N/A |
| 19 | C0 | N/A | N/A |
| 20 | A1/B1 | Mod(SFN, 8) = 0 | 0:2:30 |
| 21 | A1/B1 | Mod(SFN, 8) = 0 | 1:2:31 |
| 22 | A1/B1 | Mod(SFN, 4) = 0 | 0:2:30 |
| 23 | A1/B1 | Mod(SFN, 4) = 0 | 1:2:31 |
| 24 | A1/B1 | Mod(SFN, 2) = 0 | 0:2:30 |
| 25 | A1/B1 | Mod(SFN, 2) = 0 | 1:2:31 |
| 26 | A1/B1 | All system frames | 0:2:30 |
| 27 | A1/B1 | All system frames | 1:2:31 |
| 28 | A1/B1 | N/A | N/A |
| 29 | A1/B1 | N/A | N/A |
| 30 | A2/B2 | Mod(SFN, 8) = 0 | 0 to 31 |
| 31 | A2/B2 | Mod(SFN, 8) = 1 | 0 to 31 |
| 32 | A2/B2 | Mod(SFN, 4) = 0 | 0 to 31 |
| 33 | A2/B2 | Mod(SFN, 4) = 1 | 0 to 31 |
| 34 | A2/B2 | Mod(SFN, 2) = 0 | 0 to 31 |
| 35 | A2/B2 | Mod(SFN, 2) = 1 | 0 to 31 |
| 36 | A2/B2 | N/A | N/A |
| 37 | A2/B2 | N/A | N/A |
| 38 | A2/B2 | N/A | N/A |
| 39 | A2/B2 | N/A | N/A |
| 40 | C2 | Mod(SFN, 8) = 0 | 0 to 31 |
| 41 | C2 | Mod(SFN, 8) = 1 | 0 to 31 |
| 42 | C2 | Mod(SFN, 4) = 0 | 0 to 31 |
| 43 | C2 | Mod(SFN, 4) = 1 | 0 to 31 |
| 44 | C2 | Mod(SFN, 2) = 0 | 0 to 31 |
| 45 | C2 | Mod(SFN, 2) = 1 | 0 to 31 |
| 46 | C2 | N/A | N/A |
| 47 | C2 | N/A | N/A |
| 48 | C2 | N/A | N/A |
| 49 | C2 | N/A | N/A |
| 50 | A3/B3 | Mod(SFN, 8) = 0 | 0 to 31 |
| 51 | A3/B3 | Mod(SFN, 8) = 1 | 0 to 31 |
| 52 | A3/B3 | Mod(SFN, 4) = 0 | 0 to 31 |
| 53 | A3/B3 | Mod(SFN, 4) = 1 | 0 to 31 |
| 54 | A3/B3 | Mod(SFN, 2) = 0 | 0 to 31 |
| 55 | A3/B3 | Mod(SFN, 2) = 1 | 0 to 31 |
| 56 | A3/B3 | N/A | N/A |
| 57 | A3/B3 | N/A | N/A |
| 58 | B4 | Mod(SFN, 16) = 0 | 0 to 31 |
|  |  | Mod(SFN, 16) = 1 | 0 to 31 |
| 59 | B4 | Mod(SFN, 16) = 2 | 0 to 31 |
|  |  | Mod(SFN, 16) = 3 | 0 to 31 |
| 60 | B4 | Mod(SFN, 8) = 0 | 0 to 31 |
|  |  | Mod(SFN, 8) = 1 | 0 to 31 |
| 61 | B4 | Mod(SFN, 8) = 2 | 0 to 31 |
|  |  | Mod(SFN, 8) = 3 | 0 to 31 |
| 62 | B4 | Mod(SFN, 4) = 0 | 0 to 31 |
|  |  | Mod(SFN, 4) = 1 | 0 to 31 |
| 63 | B4 | Mod(SFN, 4) = 2 | 0 to 31 |
|  |  | Mod(SFN, 4) = 3 | 0 to 31 |

When the subcarrier spacing is 60 kHz and the maximum quantity of downlink signal blocks is 64, a corresponding downlink signal block needs to occupy 5 ms.

In an implementation, a time division mode is used for uplink and downlink communication in a same frequency band, and the random access resource cannot be placed at a time of the downlink signal block in the system frame. For example, when the downlink signal block is located in slots numbered 0 to 19, the random access resource is located in one or more of slots numbered 20 to 39. For another example, when the downlink signal block is located in slots numbered 20 to 39, the random access resource is located in one or more of slots numbered 0 to 19.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different.

The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 11 and Table 12, random access resource time densities are the same (that is, one slot appears in every eight system frames), system frame positions are the same, but slot positions are different.

In another implementation, different frequency bands are used for uplink and downlink communication. Because different frequency bands are used for uplink and downlink communication, random access resources may be placed in all time positions in the system frame.

Optionally, the mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 160 ms, and the downlink signal is located in slots numbered 0 to 19, if the time division mode is used for uplink and downlink communication in the same frequency band, the mapping relationship between the random access configuration index and the combination [the slot in which the random access resource is located, the format of the random access preamble, the system frame position] is shown in Table 11. If different frequency bands are used in uplink and downlink, the mapping relationship between the random access configuration index and the combination [the slot in which the random access resource is located, the format of the random access preamble, the system frame position] is shown in Table 12.

All the slots and system frames in the foregoing table are examples; however, slots and system frames are not limited to those in the table. For example, in the foregoing Table 11 and Table 12, Mod(SFN, 16)=0 may be replaced with any one of Mod(SFN, 16)=1 to Mod(SFN, 16)=15. For another example, in the foregoing Table 11 and Table 12, Mod(SFN, 8)=0 may be replaced with any one of Mod(SFN, 8)=1 to Mod(SFN, 8)=7. Other cases are similar. To be specific, in the foregoing embodiment, Mod(SFN, Q)=0 may be replaced with any one of Mod(SFN, Q)=1 to Mod(SFN, Q)=(Q−1), where Q is an integer greater than 0. Details are not described again.

Similarly, the slot in which the random access resource is located is not limited to Table 11 and Table 12 either. For example, in Table 11, when the random access configuration index is "6", the corresponding slot in which the random access resource is located is "20 to 27 (indicating all integers from 20 to 27)"; however, in a scenario in which the time division mode is used in uplink and downlink in the same frequency band and the downlink signal is located in slots numbered 0 to 19, the slot in which the random access resource is located may be any one or more of slots numbered 20 to 39, for example, may be any two different values (x1, x2) of slots numbered 20 to 39. Herein, refer to the descriptions about the foregoing tables. Details are not described herein again.

When the time division mode is used in uplink and downlink in the same frequency band, if the downlink signal block is mapped to another slot number, the case is similar to the foregoing embodiment. When the slot in which the downlink signal is located is another slot, the slot in which the random access resource is located may also change, provided that the slot in which the random access resource is located does not overlap the slot in which the downlink signal is located; or a slot in the system frame and a slot before a downlink signal block in a next system frame are mapped together, and corresponding slot numbers are correspondingly shifted.

For example, Table 13 shows a mapping relationship between the random access configuration index and the combination [the slot in which the random access resource is located, the format of the random access preamble, the system frame position] when the subcarrier spacing is 120 kHz and the maximum quantity of downlink signal blocks is 64.

In Table 13, the random access resource is placed in one or more of slots numbered 40 to 79.

TABLE 13

| Random access configuration index | Format of the random access preamble | System frame position | Slot in which the random access resource is located |
|---|---|---|---|
| 0 | A0 | Mod(SFN, 8) = 0 | 40 to 47 |
| 1 | A0 | Mod(SFN, 8) = 0 | 56 to 63 |
| 2 | A0 | Mod(SFN, 4) = 0 | 40 to 47 |
| 3 | A0 | Mod(SFN, 4) = 0 | 56 to 63 |
| 4 | A0 | Mod(SFN, 2) = 0 | 40 to 47 |
| 5 | A0 | Mod(SFN, 2) = 0 | 56 to 63 |
| 6 | A0 | All system frames | 40 to 47 |
| 7 | A0 | All system frames | 56 to 63 |
| 8 | A0 | All system frames | 40 to 55 |
| 9 | A0 | All system frames | 64 to 79 |
| 10 | C0 | Mod(SFN, 8) = 0 | 40 to 47 |
| 11 | C0 | Mod(SFN, 8) = 0 | 56 to 63 |
| 12 | C0 | Mod(SFN, 4) = 0 | 40 to 47 |
| 13 | C0 | Mod(SFN, 4) = 0 | 56 to 63 |
| 14 | C0 | Mod(SFN, 2) = 0 | 40 to 47 |
| 15 | C0 | Mod(SFN, 2) = 0 | 56 to 63 |
| 16 | C0 | All system frames | 40 to 47 |
| 17 | C0 | All system frames | 56 to 63 |
| 18 | C0 | All system frames | 40 to 55 |
| 19 | C0 | All system frames | 64 to 79 |
| 20 | A1/B1 | Mod(SFN, 8) = 0 | 40 to 55 |
| 21 | A1/B1 | Mod(SFN, 8) = 0 | 64 to 79 |
| 22 | A1/B1 | Mod(SFN, 4) = 0 | 40 to 55 |

TABLE 13-continued

| Random access configuration index | Format of the random access preamble | System frame position | Slot in which the random access resource is located |
|---|---|---|---|
| 23 | A1/B1 | Mod(SFN, 4) = 0 | 64 to 79 |
| 24 | A1/B1 | Mod(SFN, 2) = 0 | 40 to 55 |
| 25 | A1/B1 | Mod(SFN, 2) = 0 | 64 to 79 |
| 26 | A1/B1 | All system frames | 40 to 55 |
| 27 | A1/B1 | All system frames | 64 to 79 |
| 28 | A1/B1 | N/A | N/A |
| 29 | A1/B1 | N/A | N/A |
| 30 | A2/B2 | Mod(SFN, 8) = 0 | 40 to 71 |
| 31 | A2/B2 | Mod(SFN, 8) = 1 | 40 to 71 |
| 32 | A2/B2 | Mod(SFN, 4) = 0 | 40 to 71 |
| 33 | A2/B2 | Mod(SFN, 4) = 1 | 40 to 71 |
| 34 | A2/B2 | Mod(SFN, 2) = 0 | 40 to 71 |
| 35 | A2/B2 | Mod(SFN, 2) = 1 | 40 to 71 |
| 36 | A2/B2 | All system frames | 40 to 71 |
| 37 | A2/B2 | All system frames | 40 to 71 |
| 38 | A2/B2 | N/A | N/A |
| 39 | A2/B2 | N/A | N/A |
| 40 | C2 | Mod(SFN, 8) = 0 | 40 to 71 |
| 41 | C2 | Mod(SFN, 8) = 1 | 40 to 71 |
| 42 | C2 | Mod(SFN, 4) = 0 | 40 to 71 |
| 43 | C2 | Mod(SFN, 4) = 1 | 40 to 71 |
| 44 | C2 | Mod(SFN, 2) = 0 | 40 to 71 |
| 45 | C2 | Mod(SFN, 2) = 1 | 40 to 71 |
| 46 | C2 | All system frames | 40 to 71 |
| 47 | C2 | All system frames | 40 to 71 |
| 48 | C2 | N/A | N/A |
| 49 | C2 | N/A | N/A |
| 50 | A3/B3 | Mod(SFN, 8) = 0 | 40 to 71 |
| 51 | A3/B3 | Mod(SFN, 8) = 1 | 40 to 71 |
| 52 | A3/B3 | Mod(SFN, 4) = 0 | 40 to 71 |
| 53 | A3/B3 | Mod(SFN, 4) = 1 | 40 to 71 |
| 54 | A3/B3 | Mod(SFN, 2) = 0 | 40 to 71 |
| 55 | A3/B3 | Mod(SFN, 2) = 1 | 40 to 71 |
| 56 | A3/B3 | N/A | N/A |
| 57 | A3/B3 | N/A | N/A |
| 58 | B4 | Mod(SFN, 16) = 0 | 40 to 71 |
|  |  | Mod(SFN, 16) = 1 | 40 to 71 |
| 59 | B4 | Mod(SFN, 16) = 2 | 40 to 71 |
|  |  | Mod(SFN, 16) = 3 | 40 to 71 |
| 60 | B4 | Mod(SFN, 8) = 0 | 40 to 71 |
|  |  | Mod(SFN, 8) = 1 | 40 to 71 |
| 61 | B4 | Mod(SFN, 8) = 2 | 40 to 71 |
|  |  | Mod(SFN, 8) = 3 | 40 to 71 |
| 62 | B4 | Mod(SFN, 4) = 0 | 40 to 71 |
|  |  | Mod(SFN, 4) = 1 | 40 to 71 |
| 63 | B4 | Mod(SFN, 4) = 2 | 40 to 71 |
|  |  | Mod(SFN, 4) = 3 | 40 to 71 |

When the subcarrier spacing is 120 kHz and the maximum quantity of downlink signal blocks is 64, a corresponding downlink signal block needs to occupy 5 ms.

In an implementation, a time division mode is used in uplink and downlink in a same frequency band, and the random access resource cannot be placed at a time of the downlink signal block in the system frame. For example, when the downlink signal block is located in slots numbered 0 to 39, the random access resource is located in one or more of slots numbered 40 to 79. For another example, when the downlink signal block is located in slots numbered 40 to 79, the random access resource is located in one or more of slots numbered 0 to 39.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 13, random access resource time densities are the same (that is, one slot appears in every eight system frames), system frame positions are the same, but slot positions are different. In another implementation, different frequency bands are used in uplink and downlink. Because different frequency bands are used for uplink and downlink communication, random access resources may be placed in all time positions in the system frame.

Optionally, the mapping relationship between the random access configuration index and the combination [the slot in which the random access resource is located, the format of the random access preamble, the system frame position] may be further related to a maximum time period of the random access resource and a slot in which the downlink signal is located in addition to "one or more of the subcarrier spacing of the random access preamble, the maximum quantity of downlink signal blocks, and the actually transmitted downlink signal block". The maximum time period of the random access resource may be any one of the following: 5 ms, 10 ms, 20 ms, 40 ms, 80 ms, 160 ms, 320 ms, and 640 ms. When the maximum time period of the random access resource is 160 ms and the downlink signal is located in slots numbered 0 to 39, if the time division mode is used in uplink and downlink in the same frequency band, the mapping relationship between the random access configuration index and the combination [the slot in which the random access resource is located, the format of the random access preamble, the system frame position] is shown in Table 13.

All the slots and system frames in the foregoing table are examples; however, slots and system frames are not limited to those in the table. For example, in the foregoing Table 13, Mod(SFN, 16)=0 may be replaced with any one of Mod(SFN, 16)=1 to Mod(SFN, 16)=15. For another example, in the foregoing Table 13, Mod(SFN, 8)=0 may be replaced with any one of Mod(SFN, 8)=1 to Mod(SFN, 8)=7. Other cases are similar. To be specific, in the foregoing embodiment, Mod(SFN, Q)=0 may be replaced with any one of Mod(SFN, Q)=1 to Mod(SFN, Q)=(Q−1), where Q is an integer greater than 0. Details are not described again.

In another embodiment, slot positions in Table 13 may be other values, for example, two values configured when preamble formats and system frame positions are the same in the table. If the slot positions are respectively 40 to 47 and 56 to 63 (a to b indicate all integers from a to b; for example, 20 to 27 indicate 20, 21, 22, 23, 24, 25, 26, and 27), the slot positions may be other values, for example, any 16 different values x1 to x8 and y1 to y8 of 40 to 79. If the slot positions are 40 to 55, the slot positions may be other values, for example, any 16 different values x1 to x16 of 40 to 79. If the slot positions are 40 to 71, the slot positions may be other values, for example, any 32 different values x1 to x32 of 40 to 79. In another implementation, x1 to x8 and y1 to y8, x1 to x16 and y1 to y16, and x1 to x32 are distributed at equal intervals. To be specific, x(i+1)=xi+k1, where i=1, 2, . . . , 16; y(i+1)=yi+k2, where i=1, 2, . . . , 8; and/or yi=xi+k3, where k1 and k2 may be any integer from 1 to 16, and k3 may be any integer. When k1=k2=1, two slots are adjacent.

It should be noted that, when the time division mode is used in uplink and downlink in the same frequency band, if a downlink synchronization signal block is mapped to another slot number, a similar method may be used to perform a similar operation on the another slot number in the system frame; or the system frame is mapped together with a slot before a downlink synchronization signal block in a next system frame, and a corresponding slot number is correspondingly shifted. For example, in another implementation, if the downlink synchronization signal block is located in slots numbered 40 to 79, the random access resource is placed in slots numbered 0 to 39. An adjustment manner is similar to that in the foregoing embodiment, and details are not described herein again.

In another embodiment, if different frequency bands are used in uplink and downlink, x1 to x32 and y1 to y16 may be any different integers from 0 to 79.

Further, in another implementation, the mapping relationship between the random access configuration index and the slot in which the random access resource is located may be determined based on the sequence length of the random access preamble.

Optionally, the mapping relationship between the random access configuration index and the combination [the slot in which the random access resource is located, the format of the random access preamble, the system frame position] is determined based on the sequence length of the random access preamble.

A plurality of slot positions in a same system frame period may be distributed in more system frames. For example, when the configuration index is 0, the slot in which the random access resource is located may be: slot indexes i1 to j1 in the system frame position Mod(SFN, 8)=x1, slot indexes i2 to j2 in the system frame position Mod(SFN, 8)=x2, . . . , slot indexes iK to jK in the system frame position Mod(SFN, 8)=xK, that is, eight slots are distributed in K system frames, and each system frame includes several slots. When the configuration index is 1, the slot in which the random access resource is located may be: slot indexes l1 to m1 in the system frame position Mod(SFN, 8)=y1, indexes l2 to m2 in the system frame position Mod(SFN, 8)=y2, . . . , slot indexes lK to mK in the system frame position Mod(SFN, 8)=yK, that is, eight slots are distributed in K system frames, and each system frame includes several slots. Optionally, x1 to xK are different from y1 to yK. In this case, for any k, an intersection set may or may not exist between ik to jk and lk to mk. Optionally, xk=yk, and k=1 to K. In this case, for any k, ik to jk and lk to mk cannot be completely the same. K indicates a quantity of system frames in which random access resources are distributed in a system frame period. For example, when the configuration index is 0 and 1 in Table 13, K is 1; or when the configuration index is 58 to 63, K is 2. In another embodiment, K may be another value. For example, K is equal to any value of 1 to 64, and K is less than the system frame period Pi in which the corresponding random access resource in the configuration index i is located, that is, when the system frame position corresponding to the configuration index is mod(SFN, Pi)=x, K≤Pi. It should be noted that, the method is applicable to all embodiments of random access resource configurations in the specification, and details are not described again in other embodiments of random access resource configurations.

In another embodiment, slot indexes corresponding to random access configuration indexes 58 to 63 may be other values. For example, when the random access configuration index in Table 11 is 58, and the system frame position Mod(SFN, 16)=1, the slot positions are different from those when Mod(SFN, 16)=0, and are 24 to 39; or when the random access configuration index is 59, and the system frame position Mod(SFN, 16)=0, the slot positions are different from those when Mod(SFN, 16)=1, and are 24 to 39. Similarly, for any plurality of Mod(SFN, 16)=0, Mod(SFN, 16)=1, Mod(SFN, 16)=2, and Mod(SFN, 16)=3, similar adjustments may be performed. Details are not described herein again.

For another example, when the random access configuration index in Table 12 is 58, and the system frame position Mod(SFN, 16)=1, the slot positions are different from those when Mod(SFN, 16)=0, and are 8 to 39; or when the random access configuration index is 59, and the system frame position Mod(SFN, 16)=0, the slot positions are different from those when Mod(SFN, 16)=1, and are 8 to 39. Similarly, when the random access configuration index is 60, 61, 62, or 63, similar operations may also exist.

Slot positions in Table 11 and Table 12 are based on a subcarrier spacing of 6o kHz. In another embodiment, a subcarrier spacing of uplink or downlink data is different from a subcarrier spacing of a random access preamble; therefore, slot duration corresponding to the subcarrier spacing of the uplink or downlink data is different from slot duration corresponding to the subcarrier spacing of the random access preamble. When the subcarrier spacing of the uplink or downlink data is different from the subcarrier spacing of the random access preamble, slots in the random access resource configuration table may be based on the subcarrier spacing of the random access preamble or may be based on the subcarrier spacing of the uplink or downlink data. Alternatively, the network device configures indication information Flag, where when Flag=0, it corresponds to the former manner; or when Flag=1, it corresponds to the latter manner. When slots in the random access resource configuration table are based on the subcarrier spacing of the uplink or downlink data, and the subcarrier spacing of the uplink or downlink data is different from the subcarrier spacing of the random access preamble, at least one of the time position indexes, the quantity of consecutive slots, and structures of random access preambles in the slots in Table 11 and Table 12 may be further adjusted, so that time alignment is accomplished for the random access resource and the uplink or downlink data on the network device and the terminal side.

For example, when the subcarrier spacing of the uplink or downlink data is 120 kHz, any slot index in Table 11 and Table 12 may correspond to two consecutive 120 kHz slots, and corresponding slot indexes and/or the quantity of consecutive slots are/is scaled. To be specific, if an index of a 60 kHz slot in which the random access preamble is located is k, the slot is adjusted to 120 kHz slots whose slot indexes are 2k and 2k+1. That is, an absolute time of the random access resource remains unchanged. In this case, a structure of the random access preamble in the slot may be further adjusted. For example, a structure of a random access preamble in one 60 kHz slot may be duration of two consecutive 120 kHz slots k and k+1. For another example, two new 120 kHz slots k and k+1 each correspond to a half of a 60 kHz slot (that is, seven 60 kHz OFDM symbols, equivalent to any structure with sufficient random access resources after a configuration in which a quantity of symbols occupied by the downlink signal is less than seven 60 kHz OFDM symbols is excluded in Table 16, Table 17, Table 18, Table 19, Table 20, and Table 21). The foregoing adjustment manner and method may be predefined or prestored, or indicated by the network device (for example, when Flag=0, it corresponds to the former manner; or when Flag=1, it corresponds to the latter adjustment manner).

For example, when the subcarrier spacing of the uplink or downlink data is 30 kHz, any slot index in Table 11 and Table 12 may correspond to a half of a 30 kHz slot, and corresponding slot indexes and/or the quantity of consecutive slots are/is scaled. To be specific, if an index of a 60 kHz slot in which the random access preamble is located is k, the slot is adjusted to a half of a 30 kHz slot; or if the random access preamble is located in two consecutive 60 kHz slots whose indexes are 2k and 2k+1, the slot is adjusted to one 30 kHz slot. That is, an absolute time of the random access resource remains unchanged. In this case, the structure of the random access preamble in the slot may be further adjusted. For example, a structure of a random access preamble in one 30 kHz slot may be based on two consecutive 60 kHz slots k and k+1. For another example, a half of a 30 kHz slot corresponds to one 60 kHz slot. The foregoing adjustment manner and method may be predefined or prestored, or indicated by the network device (for example, when Flag=0, it corresponds to the former manner; or when Flag=1, it corresponds to the latter adjustment manner).

For example, when the subcarrier spacing of the uplink or downlink data is 15 kHz, any slot index in Table 11 and Table 12 may correspond to ¼ of one 15 kHz slot (for example, two to four 15 kHz OFDM symbols), and corresponding slot indexes and/or the quantity of consecutive slots are/is scaled. To be specific, if an index of a 60 kHz slot in which the random access preamble is located is k, the slot is adjusted to ¼ of one 15 kHz slot; or if the random access preamble is located in two consecutive 60 kHz slots whose indexes are k and k+1, the slot is adjusted to a half of one 15 kHz slot; or if the random access preamble is located in four consecutive 60 kHz slots whose indexes are k to k+3, the slot is adjusted to one 15 kHz slot. That is, an absolute time of the random access resource remains unchanged. In this case, the composition of the random access preamble in the slot may be further adjusted. For example, a structure of a random access preamble in one 15 kHz slot may be based on four consecutive 60 kHz slots k to k+3. For another example, a structure of a random access preamble in a half of a 15 kHz slot may be based on two consecutive 60 kHz slots k and k+1. For another example, ¼ of one 15 kHz slot corresponds to one 60 kHz slot. The foregoing adjustment manner and method may be predefined or prestored, or indicated by the network device (for example, when Flag=0, it corresponds to the first manner; when Flag=1, it corresponds to the second adjustment manner; or when Flag=2, it corresponds to the third adjustment manner).

For example, Table 14 shows a mapping relationship between the random access configuration index and the combination [the slot in which the random access resource is located, the format of the random access preamble, the system frame position] when the sequence length of the random access preamble is 839.

TABLE 14

| Random access configuration index | Format of the random access preamble | System frame position | Subframe in which the random access resource is located |
|---|---|---|---|
| 0 | 0 | Mod(SFN, 8) = 0 | 1 |
| 1 | 0 | Mod(SFN, 8) = 0 | 6 |
| 2 | 0 | Mod(SFN, 4) = 0 | 1 |
| 3 | 0 | Mod(SFN, 4) = 0 | 6 |
| 4 | 0 | Mod(SFN, 2) = 0 | 1 |
| 5 | 0 | Mod(SFN, 2) = 0 | 6 |
| 6 | 0 | All system frames | 1 |
| 7 | 0 | All system frames | 6 |
| 8 | 0 | All system frames | 1, 6 |
| 9 | 0 | All system frames | 2, 7 |
| 10 | 0 | All system frames | 1, 4, 7 |
| 11 | 0 | All system frames | 2, 5, 8 |
| 12 | 0 | All system frames | 0:2:8 |
| 13 | 0 | All system frames | 1:2:9 |
| 14 | 0 | All system frames | 0 to 9 |
| 15 | 0 | Mod(SFN, 2) = 0 | 9 |
| 16 | 1 | Mod(SFN, 8) = 0 | 1 |

TABLE 14-continued

| Random access configuration index | Format of the random access preamble | System frame position | Subframe in which the random access resource is located |
|---|---|---|---|
| 17 | 1 | Mod(SFN, 8) = 0 | 6 |
| 18 | 1 | Mod(SFN, 4) = 0 | 1 |
| 19 | 1 | Mod(SFN, 4) = 0 | 6 |
| 20 | 1 | Mod(SFN, 2) = 0 | 1 |
| 21 | 1 | Mod(SFN, 2) = 0 | 6 |
| 22 | 1 | All system frames | 1 |
| 23 | 1 | All system frames | 6 |
| 24 | 1 | All system frames | 1, 6 |
| 25 | 1 | All system frames | 2, 7 |
| 26 | 1 | All system frames | 1, 4, 7 |
| 27 | 1 | All system frames | 2, 5, 8 |
| 28 | 1 | N/A | N/A |
| 29 | 1 | N/A | N/A |
| 30 | 1 | N/A | N/A |
| 31 | 1 | Mod(SFN, 2) = 0 | 9 |
| 32 | 2 | Mod(SFN, 8) = 0 | 1 |
| 33 | 2 | Mod(SFN, 8) = 0 | 6 |
| 34 | 2 | Mod(SFN, 4) = 0 | 1 |
| 35 | 2 | Mod(SFN, 4) = 0 | 6 |
| 36 | 2 | Mod(SFN, 2) = 0 | 1 |
| 37 | 2 | Mod(SFN, 2) = 0 | 6 |
| 38 | 2 | All system frames | 1 |
| 39 | 2 | All system frames | 6 |
| 40 | 2 | All system frames | 1, 6 |
| 41 | 2 | All system frames | 2, 7 |
| 42 | 2 | N/A | N/A |
| 43 | 2 | N/A | N/A |
| 44 | 2 | N/A | N/A |
| 45 | 2 | N/A | N/A |
| 46 | 2 | N/A | N/A |
| 47 | 2 | Mod(SFN, 2) = 0 | 9 |
| 48 | 3 | Mod(SFN, 8) = 0 | 1 |
| 49 | 3 | Mod(SFN, 8) = 0 | 6 |
| 50 | 3 | Mod(SFN, 4) = 0 | 1 |
| 51 | 3 | Mod(SFN, 4) = 0 | 6 |
| 52 | 3 | Mod(SFN, 2) = 0 | 1 |
| 53 | 3 | Mod(SFN, 2) = 0 | 6 |
| 54 | 3 | All system frames | 1 |
| 55 | 3 | All system frames | 6 |
| 56 | 3 | All system frames | 1, 6 |
| 57 | 3 | All system frames | 2, 7 |
| 58 | 3 | All system frames | 1, 4, 7 |
| 59 | 3 | All system frames | 2, 5, 8 |
| 60 | 3 | All system frames | 0:2:8 |
| 61 | 3 | All system frames | 1:2:9 |
| 62 | 3 | All system frames | 0 to 9 |
| 63 | 3 | Mod(SFN, 2) = 0 | 9 |

In an implementation, uplink communication and downlink communication are performed on same frequency bands separately, and need to be performed at a time different from that of a downlink signal transmitted by another network device, to avoid interference. Therefore, the random access resource cannot be placed at a time of a downlink signal block in the system frame. For example, if the downlink signal block is located in slots numbered 0 and 5, the random access resource is located in one or more of slots numbered 1 to 4 and 6 to 9.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 14, random access resource time densities are the same (that is, one slot appears in every eight system frames), system frame positions are the same, but slot positions are different.

In another implementation, a time division mode is used in uplink and downlink in a same frequency band, and the random access resource cannot be placed at the time of the downlink signal block in the system frame.

Optionally, the mapping relationship between the random access configuration index and the combination [the slot in which the random access resource is located, the format of the random access preamble, the system frame position] may be further related to a maximum time period of the random access resource and a slot in which the downlink signal is located. The maximum time period of the random access resource may be any one of the following: 5 ms, 10 ms, 20 ms, 40 ms, 80 ms, 160 ms, 320 ms, and 640 ms.

When the maximum time period of the random access resource is 160 ms, and the downlink signal is located in slots numbered 0 and 5, the mapping relationship between the random access configuration index and the combination [the slot in which the random access resource is located, the format of the random access preamble, the system frame position] is shown in Table 14.

All the slots and system frames in the foregoing table are examples; however, slots and system frames are not limited to those in the table. For example, in the foregoing Table 14, Mod(SFN, 16)=0 may be replaced with any one of Mod(SFN, 16)=1 to Mod(SFN, 16)=15. For another example, in the foregoing Table 14, Mod(SFN, 8)=0 may be replaced with any one of Mod(SFN, 8)=1 to Mod(SFN, 8)=7. Other cases are similar. To be specific, in the foregoing embodiment, Mod(SFN, Q)=0 may be replaced with any one of Mod(SFN, Q)=1 to Mod(SFN, Q)=(Q−1), where Q is an integer greater than 0. Details are not described again.

Similarly, the slot in which the random access resource is located is not limited to Table 14 either. For details, refer to the foregoing embodiment. Details are not described herein again.

When the time division mode is used in uplink and downlink in the same frequency band, if the downlink signal block is mapped to another slot number, the case is similar to the foregoing embodiment. When the slot in which the downlink signal is located is another slot, the slot in which the random access resource is located may also change, provided that the slot in which the random access resource is located does not overlap the slot in which the downlink signal is located; or a slot in the system frame and a slot before a downlink signal block in a next system frame are mapped together, and corresponding slot numbers are correspondingly shifted.

For example, Table 15 shows a mapping relationship between the random access configuration index and the combination [the slot in which the random access resource is located, the format of the random access preamble, the system frame position] when the sequence length of the random access preamble is 127 or 139.

TABLE 15

| Random access configuration index | Format of the access random preamble | System frame position | Subframe in which the random access resource is located |
|---|---|---|---|
| 0 | A0 | Mod(SFN, 8) = 0 | 5 |
| 1 | A0 | Mod(SFN, 8) = 0 | 7 |
| 2 | A0 | Mod(SFN, 4) = 0 | 5 |
| 3 | A0 | Mod(SFN, 4) = 0 | 7 |
| 4 | A0 | Mod(SFN, 2) = 0 | 5 |
| 5 | A0 | Mod(SFN, 2) = 0 | 7 |
| 6 | A0 | All system frames | 5 |
| 7 | A0 | All system frames | 7 |
| 8 | A0 | All system frames | 5, 6 |
| 9 | A0 | All system frames | 7, 8 |
| 10 | C0 | Mod(SFN, 8) = 0 | 5 |
| 11 | C0 | Mod(SFN, 8) = 0 | 7 |
| 12 | C0 | Mod(SFN, 4) = 0 | 5 |
| 13 | C0 | Mod(SFN, 4) = 0 | 7 |
| 14 | C0 | Mod(SFN, 2) = 0 | 5 |
| 15 | C0 | Mod(SFN, 2) = 0 | 7 |
| 16 | C0 | All system frames | 5 |
| 17 | C0 | All system frames | 7 |
| 18 | C0 | All system frames | 5, 6 |
| 19 | C0 | All system frames | 7, 8 |
| 20 | A1/B1 | Mod(SFN, 8) = 0 | 5, 6 |
| 21 | A1/B1 | Mod(SFN, 8) = 0 | 7, 8 |
| 22 | A1/B1 | Mod(SFN, 4) = 0 | 5, 6 |
| 23 | A1/B1 | Mod(SFN, 4) = 0 | 7, 8 |
| 24 | A1/B1 | Mod(SFN, 2) = 0 | 5, 6 |
| 25 | A1/B1 | Mod(SFN, 2) = 0 | 7, 8 |
| 26 | A1/B1 | All system frames | 5, 6 |
| 27 | A1/B1 | All system frames | 7, 8 |
| 28 | A1/B1 | N/A | N/A |
| 29 | A1/B1 | N/A | N/A |
| 30 | A2/B2 | Mod(SFN, 16) = 0 | 5, 6, 7, 8 |
| 31 | A2/B2 | Mod(SFN, 16) = 1 | 5, 6, 7, 8 |
| 32 | A2/B2 | Mod(SFN, 8) = 0 | 5, 6, 7, 8 |
| 33 | A2/B2 | Mod(SFN, 8) = 1 | 5, 6, 7, 8 |
| 34 | A2/B2 | Mod(SFN, 4) = 0 | 5, 6, 7, 8 |
| 35 | A2/B2 | Mod(SFN, 4) = 1 | 5, 6, 7, 8 |
| 36 | A2/B2 | Mod(SFN, 2) = 0 | 5, 6, 7, 8 |
| 37 | A2/B2 | Mod(SFN, 2) = 1 | 5, 6, 7, 8 |
| 38 | A2/B2 | N/A | N/A |
| 39 | A2/B2 | N/A | N/A |
| 40 | C2 | Mod(SFN, 16) = 0 | 5, 6, 7, 8 |
| 41 | C2 | Mod(SFN, 16) = 1 | 5, 6, 7, 8 |
| 42 | C2 | Mod(SFN, 8) = 0 | 5, 6, 7, 8 |
| 43 | C2 | Mod(SFN, 8) = 1 | 5, 6, 7, 8 |
| 44 | C2 | Mod(SFN, 4) = 0 | 5, 6, 7, 8 |
| 45 | C2 | Mod(SFN, 4) = 1 | 5, 6, 7, 8 |
| 46 | C2 | Mod(SFN, 2) = 0 | 5, 6, 7, 8 |
| 47 | C2 | Mod(SFN, 2) = 1 | 5, 6, 7, 8 |
| 48 | C2 | N/A | N/A |
| 49 | C2 | N/A | N/A |
| 50 | A3/B3 | Mod(SFN, 16) = 0 | 5, 6, 7, 8 |

TABLE 15-continued

| Random access configuration index | Format of the access random preamble | System frame position | Subframe in which the random access resource is located |
|---|---|---|---|
| 51 | A3/B3 | Mod(SFN, 16) = 1 | 5, 6, 7, 8 |
| 52 | A3/B3 | Mod(SFN, 8) = 0 | 5, 6, 7, 8 |
| 53 | A3/B3 | Mod(SFN, 8) = 1 | 5, 6, 7, 8 |
| 54 | A3/B3 | Mod(SFN, 4) = 0 | 5, 6, 7, 8 |
| 55 | A3/B3 | Mod(SFN, 4) = 1 | 5, 6, 7, 8 |
| 56 | A3/B3 | Mod(SFN, 2) = 0 | 5, 6, 7, 8 |
| 57 | A3/B3 | Mod(SFN, 2) = 1 | 5, 6, 7, 8 |
| 58 | B4 | Mod(SFN, 16) = 0 | 5, 6, 7, 8 |
|  |  | Mod(SFN, 16) = 1 | 5, 6, 7, 8 |
| 59 | B4 | Mod(SFN, 16) = 2 | 5, 6, 7, 8 |
|  |  | Mod(SFN, 16) = 3 | 5, 6, 7, 8 |
| 60 | B4 | Mod(SFN, 8) = 0 | 5, 6, 7, 8 |
|  |  | Mod(SFN, 8) = 1 | 5, 6, 7, 8 |
| 61 | B4 | Mod(SFN, 8) = 2 | 5, 6, 7, 8 |
|  |  | Mod(SFN, 8) = 3 | 5, 6, 7, 8 |
| 62 | B4 | Mod(SFN, 4) = 0 | 5, 6, 7, 8 |
|  |  | Mod(SFN, 4) = 1 | 5, 6, 7, 8 |
| 63 | B4 | Mod(SFN, 4) = 2 | 5, 6, 7, 8 |
|  |  | Mod(8FN, 4) = 3 | 5, 6, 7, 8 |

The mapping relationship shown in Table 15 is applicable to different subcarrier spacings and different maximum quantities of downlink signal blocks.

In an implementation, different frequency bands are used in uplink and downlink. Because different frequency bands are used for uplink and downlink communication, random access resources may be placed in all time positions in the system frame.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms. For example, for the random access configuration index 0 and the random access configuration index 1 in Table 15, random access resource time densities are the same (that is, one slot appears in every eight system frames), system frame positions are the same, but slot positions are different.

In another implementation, a time division mode is used in uplink and downlink in a same frequency band, a corresponding downlink signal block needs to occupy 5 ms, and the random access resource cannot be placed at a time of the downlink signal block in the system frame. For example, when the downlink signal block is located in slots numbered 0 to 4, the random access resource is located in one or more of slots numbered 5 to 9. For another example, when the downlink signal block is located in slots numbered 5 to 9, the random access resource is located in one or more of slots numbered 0 to 4.

Optionally, the mapping relationship between the random access configuration index and the combination [the slot in which the random access resource is located, the format of the random access preamble, the system frame position] may be further related to a maximum time period of the random access resource and a slot in which the downlink signal is located. The maximum time period of the random access resource may be any one of the following: 5 ms, 10 ms, 20 ms, 40 ms, 80 ms, 160 ms, 320 ms, and 640 ms. When the maximum time period of the random access resource is 160 ms, and the downlink signal is located in slots numbered 0 to 4, the mapping relationship between the random access configuration index and the combination [the slot in which the random access resource is located, the format of the random access preamble, the system frame position] is shown in Table 15.

All the slots and system frames in the foregoing table are examples; however, slots and system frames are not limited to those in the table. For example, in the foregoing Table 15, Mod(SFN, 16)=0 may be replaced with any one of Mod(SFN, 16)=1 to Mod(SFN, 16)=15. For another example, in the foregoing Table 15, Mod(SFN, 8)=0 may be replaced with any one of Mod(SFN, 8)=1 to Mod(SFN, 8)=7. Other cases are similar. To be specific, in the foregoing embodiment, Mod(SFN, Q)=0 may be replaced with any one of Mod(SFN, Q)=1 to Mod(SFN, Q)=(Q−1), where Q is an integer greater than 0. Details are not described again.

Similarly, the slot in which the random access resource is located is not limited to Table 15 either. For details, refer to the foregoing embodiment. Details are not described herein again.

When the time division mode is used in uplink and downlink in the same frequency band, if the downlink signal block is mapped to another slot number, the case is similar to the foregoing embodiment. When the slot in which the downlink signal is located is another slot, the slot in which the random access resource is located may also change, provided that the slot in which the random access resource is located does not overlap the slot in which the downlink signal is located; or a slot in the system frame and a slot before a downlink signal block in a next system frame are mapped together, and corresponding slot numbers are correspondingly shifted.

It should be noted that, Mod(x, y) in the foregoing formula indicates a modulo operation, and may also be expressed as x % y, or may be expressed as x Mod y.

In the foregoing Table 3 to Table 15, the slot in which the random access resource is located indicates a slot number of the system frame, and the system frame position in the tables may also be considered as a random access resource period.

In the embodiments corresponding to Table 3 to Table 13, a slot corresponding to each random access configuration index may be associated with a plurality of slot structures of random access preambles.

Figure 7A:
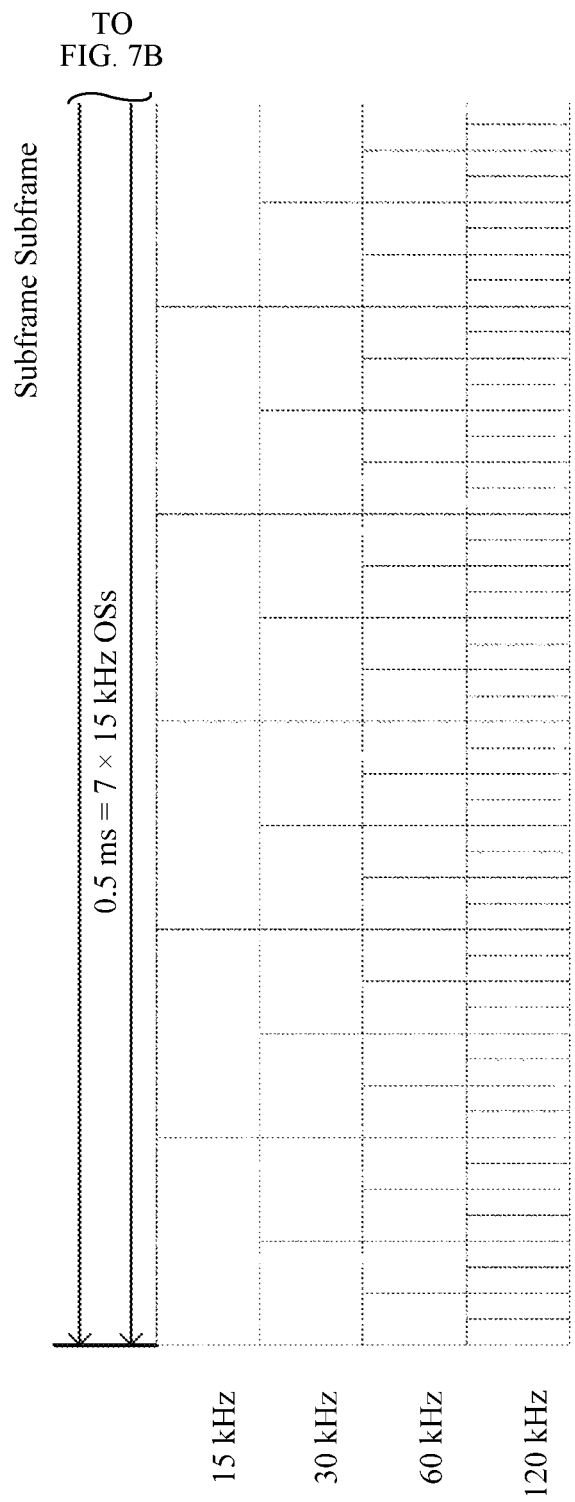
FIG. 7A and FIG. 7B are a schematic structural diagram of a random access preamble in a random access method according to an embodiment of this application.
Figure 7B:
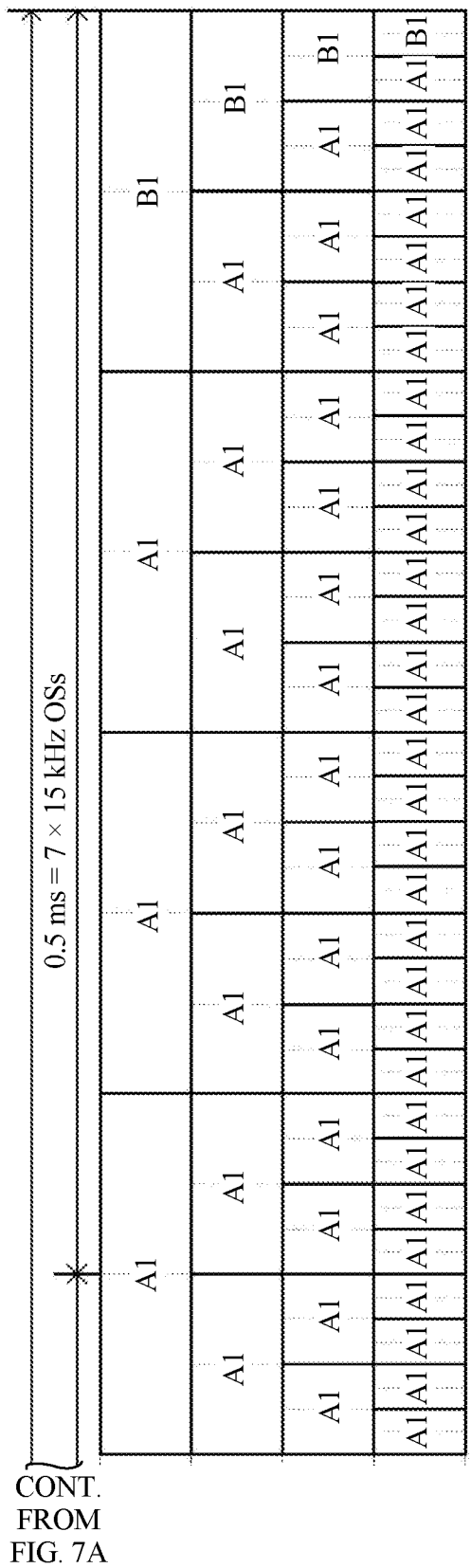
Figure 8B:
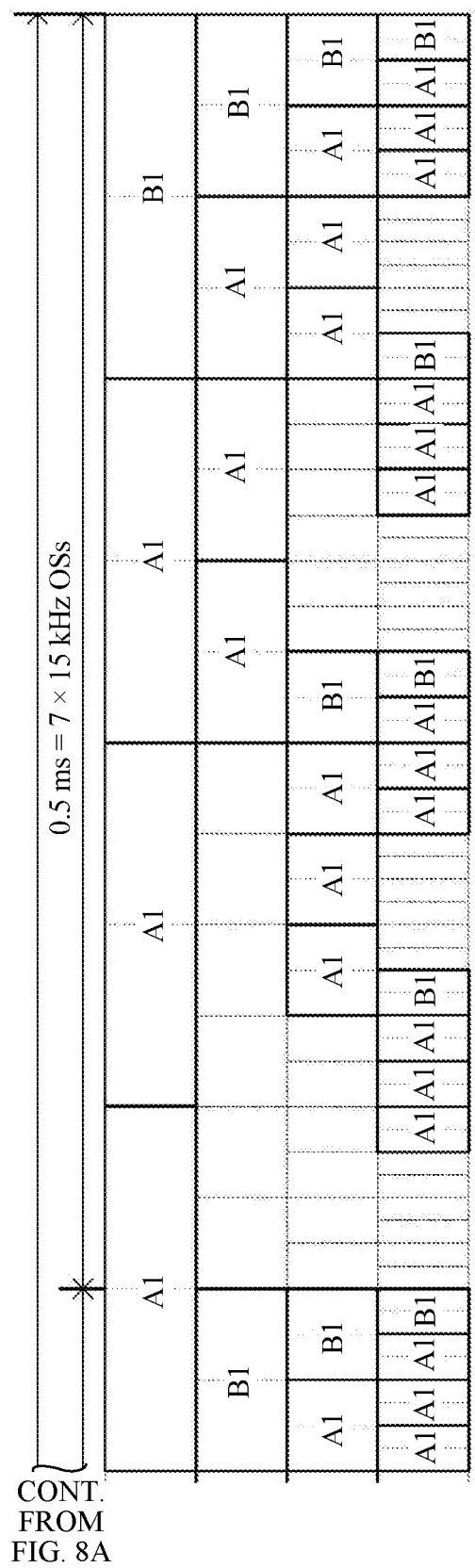
Figure 9A:
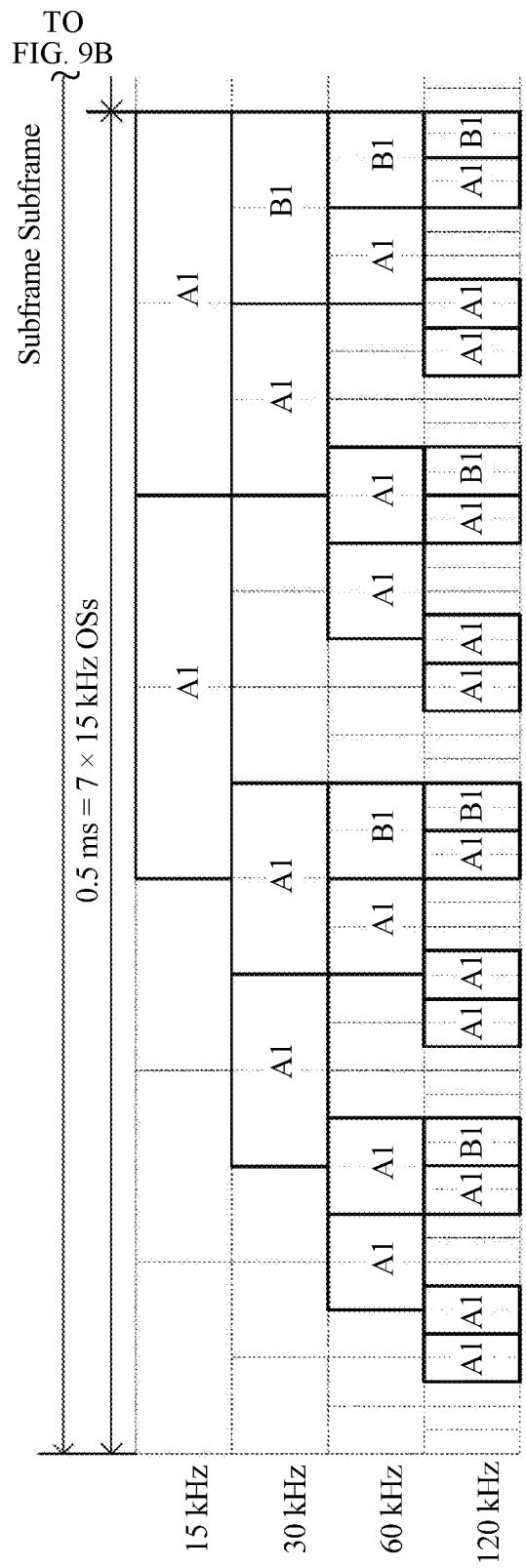
FIG. 9A and FIG. 9B are a schematic structural diagram of a random access preamble in a random access method according to another embodiment of this application.
Figure 9B:
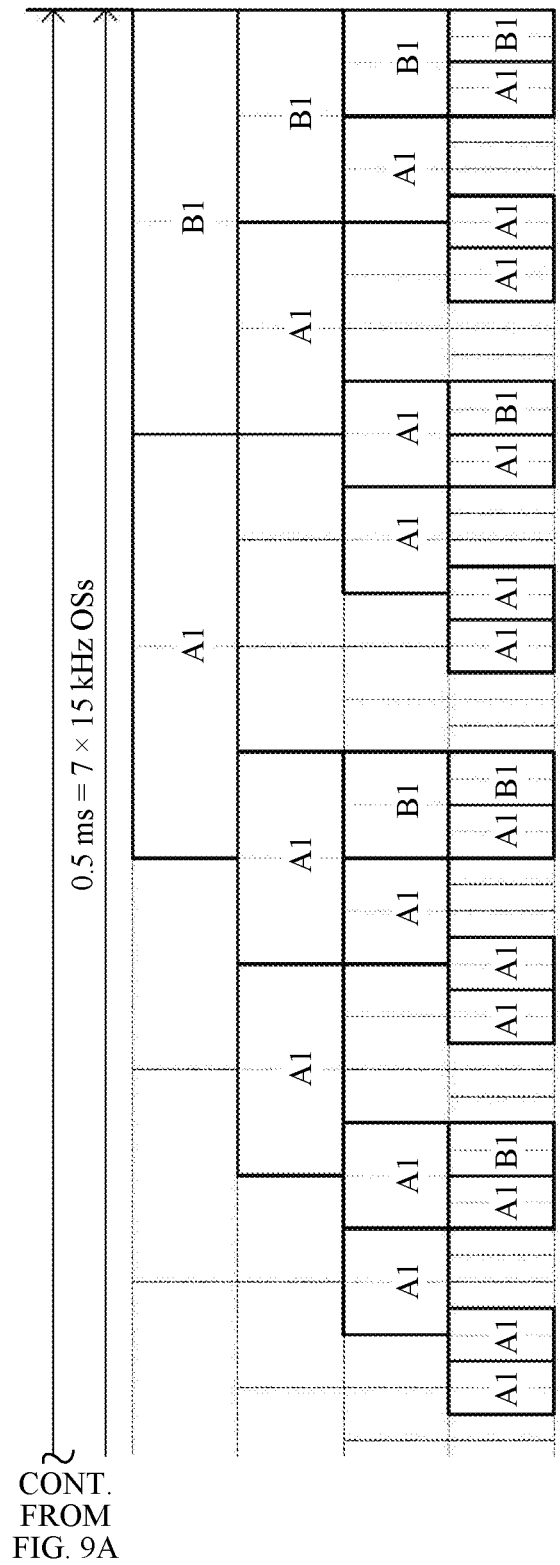
Figure 10A:
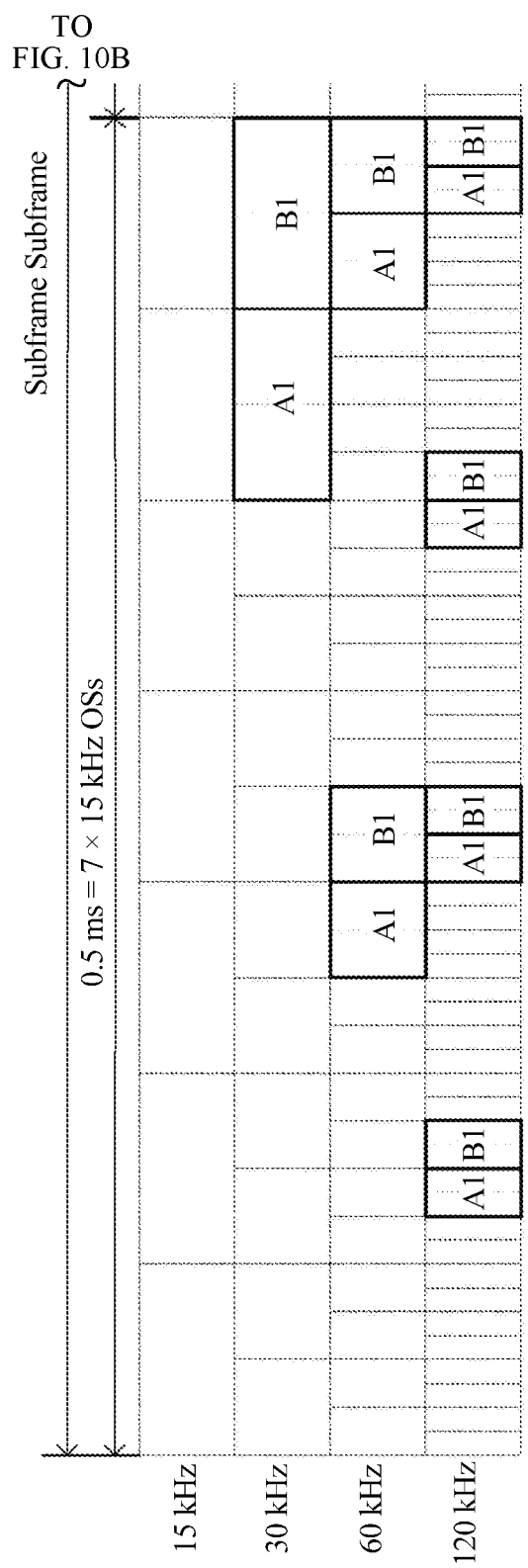
FIG. 10A and FIG. 10B are a schematic structural diagram of a random access preamble in a random access method according to another embodiment of this application.
Figure 10B:
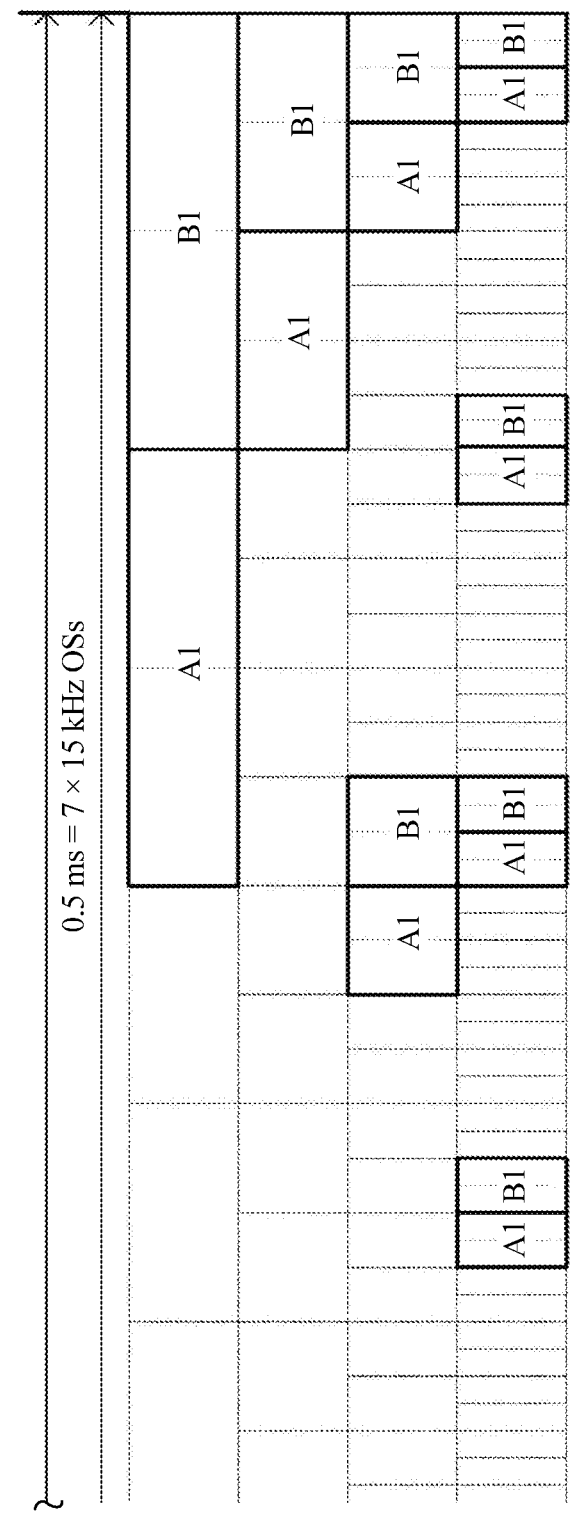
Figure 11A:
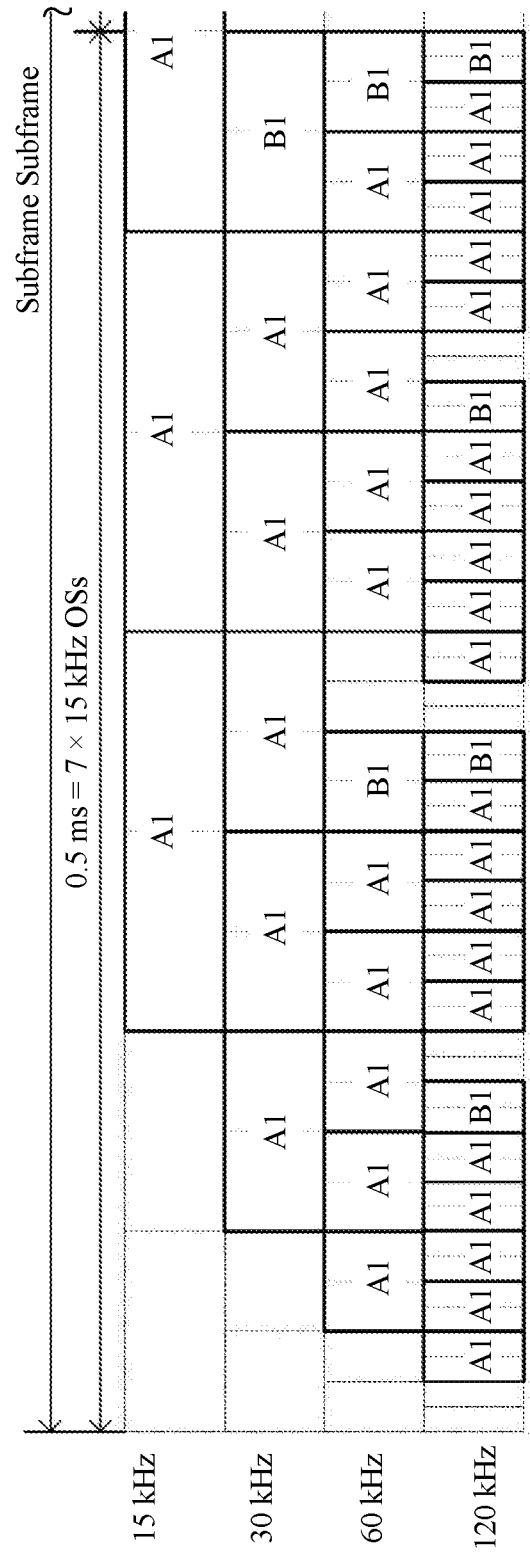
FIG. 11A and FIG. 11B are a schematic structural diagram of a random access preamble in a random access method according to another embodiment of this application.
Figures 11A, 11B:
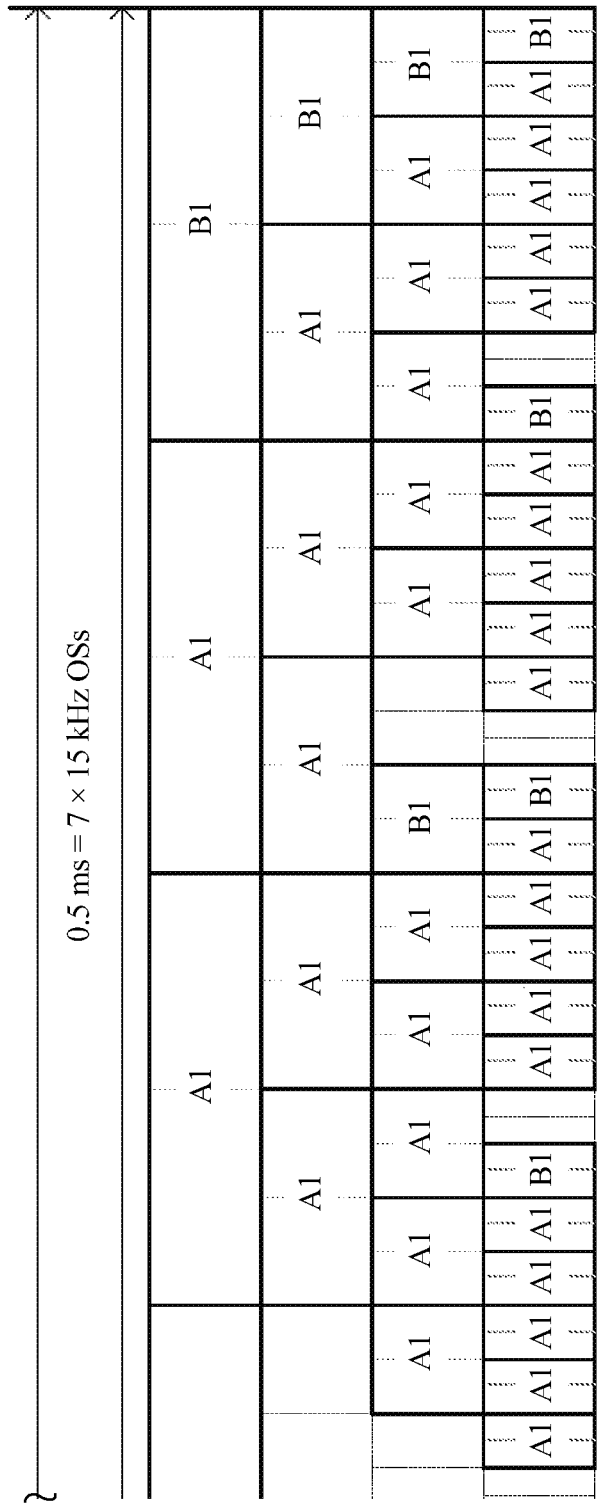
Figure 12A:
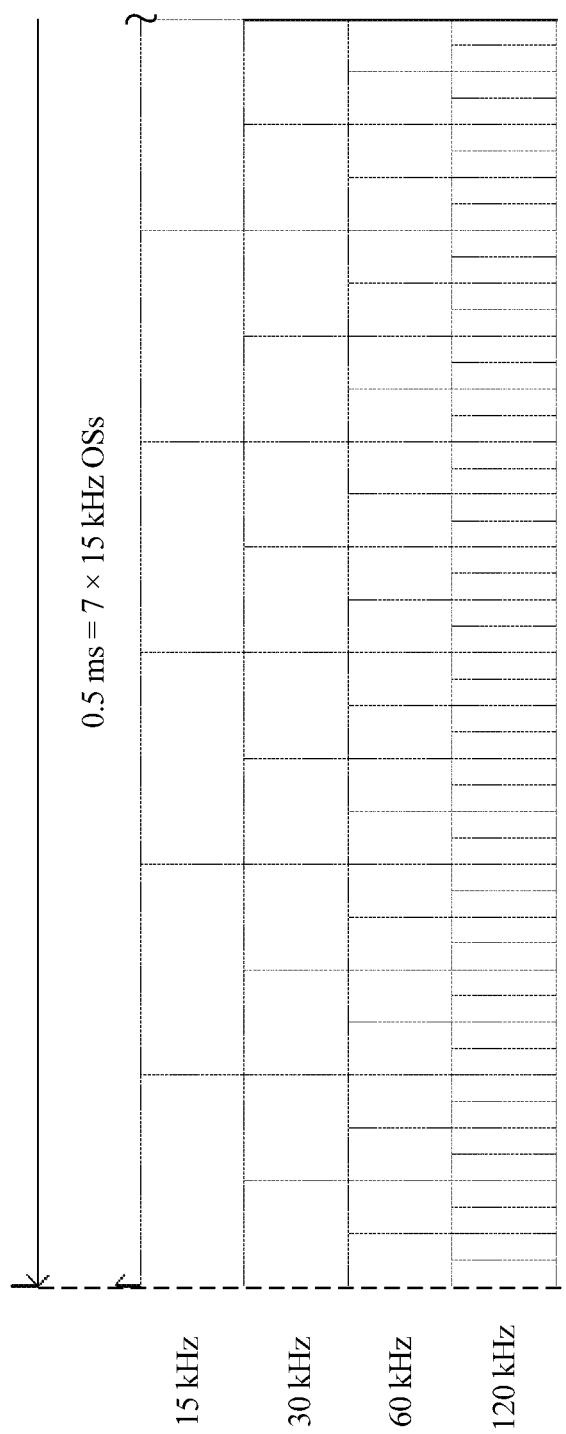
FIG. 12A and FIG. 12B are a schematic structural diagram of a random access preamble in a random access method according to another embodiment of this application.
Figure 12B:
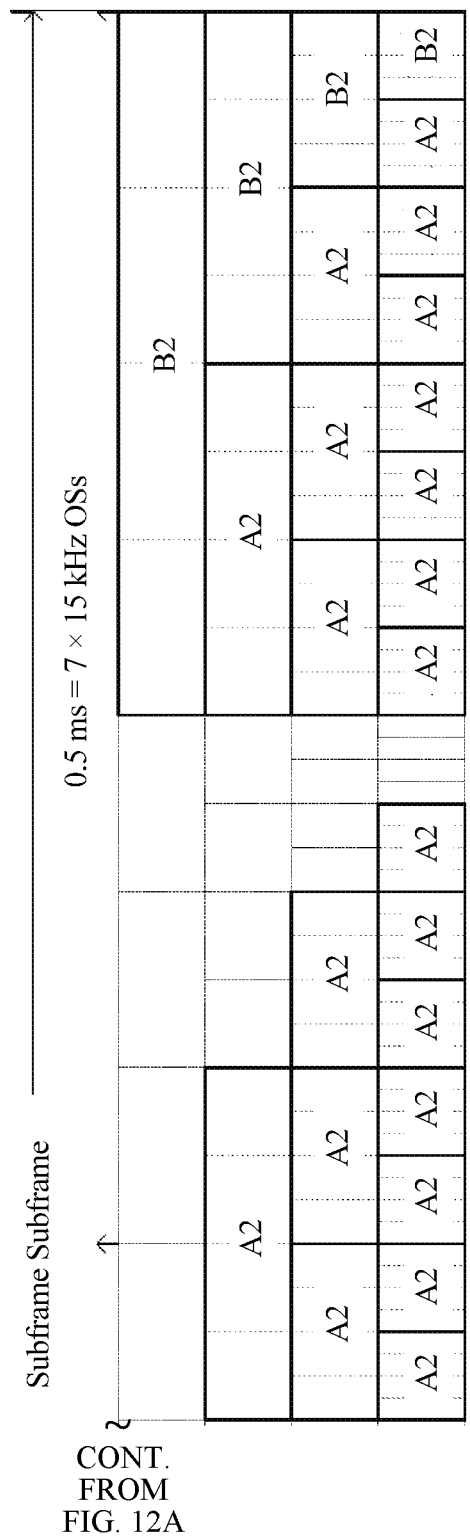
Figure 13A:
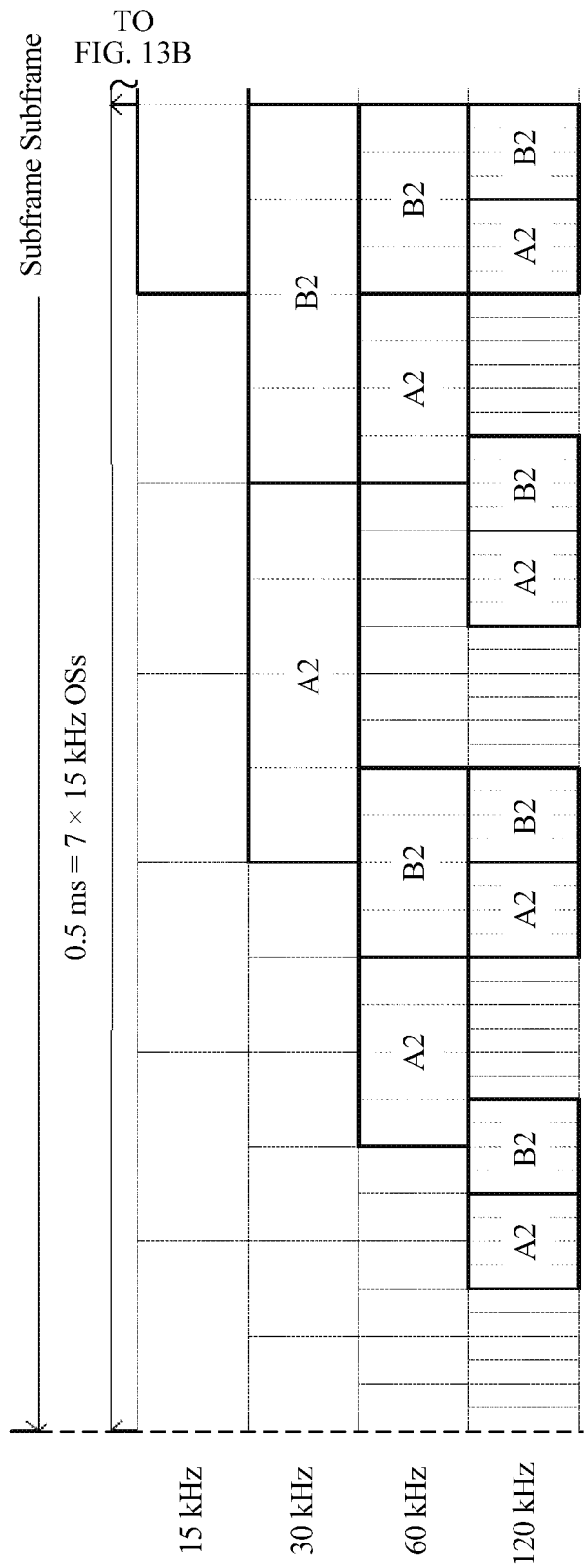
FIG. 13A and FIG. 13B are a schematic structural diagram of a random access preamble in a random access method according to another embodiment of this application.
Figure 13B:
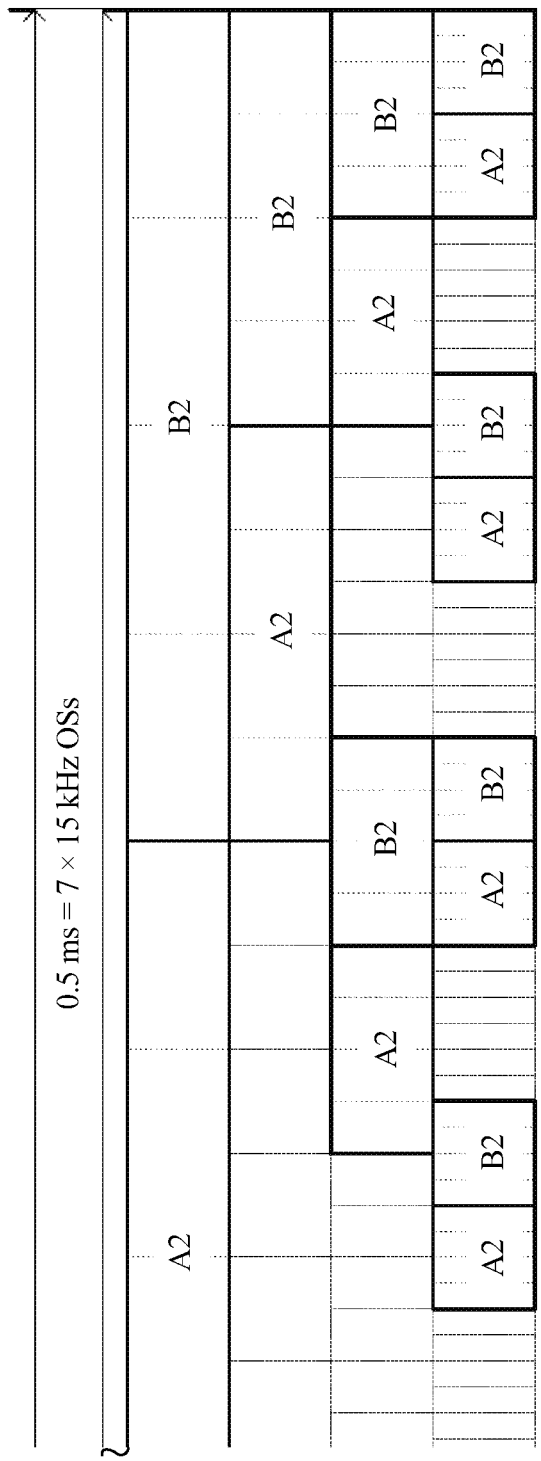
Figure 14A:
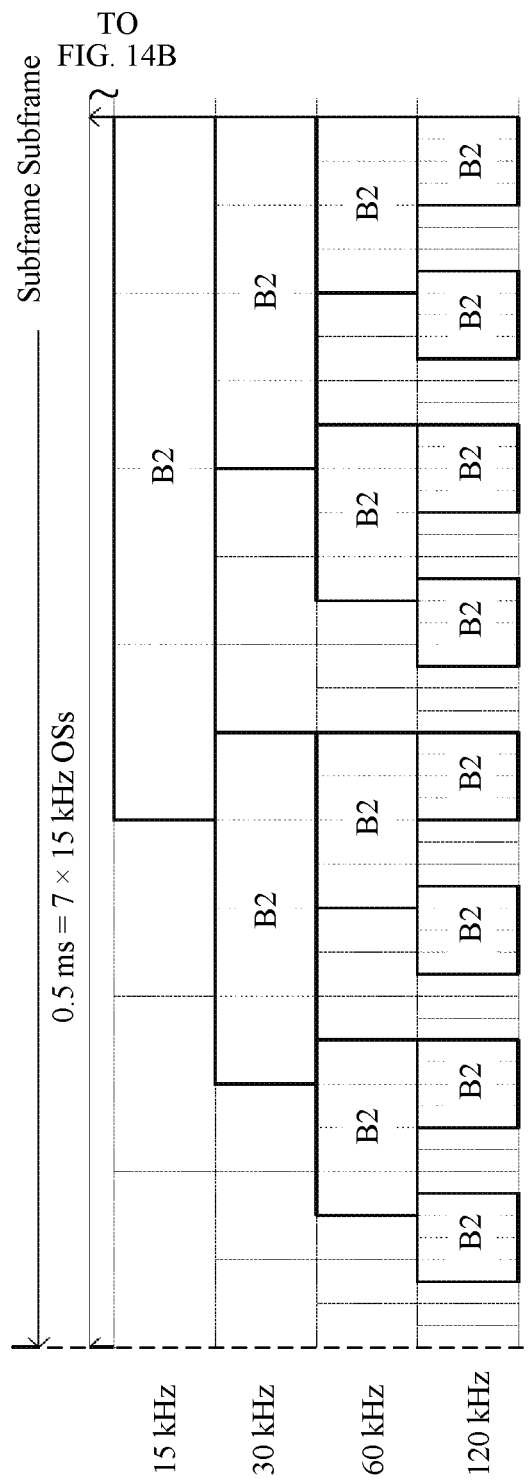
FIG. 14A and FIG. 14B are a schematic structural diagram of a random access preamble in a random access method according to another embodiment of this application.
Figure 14B:
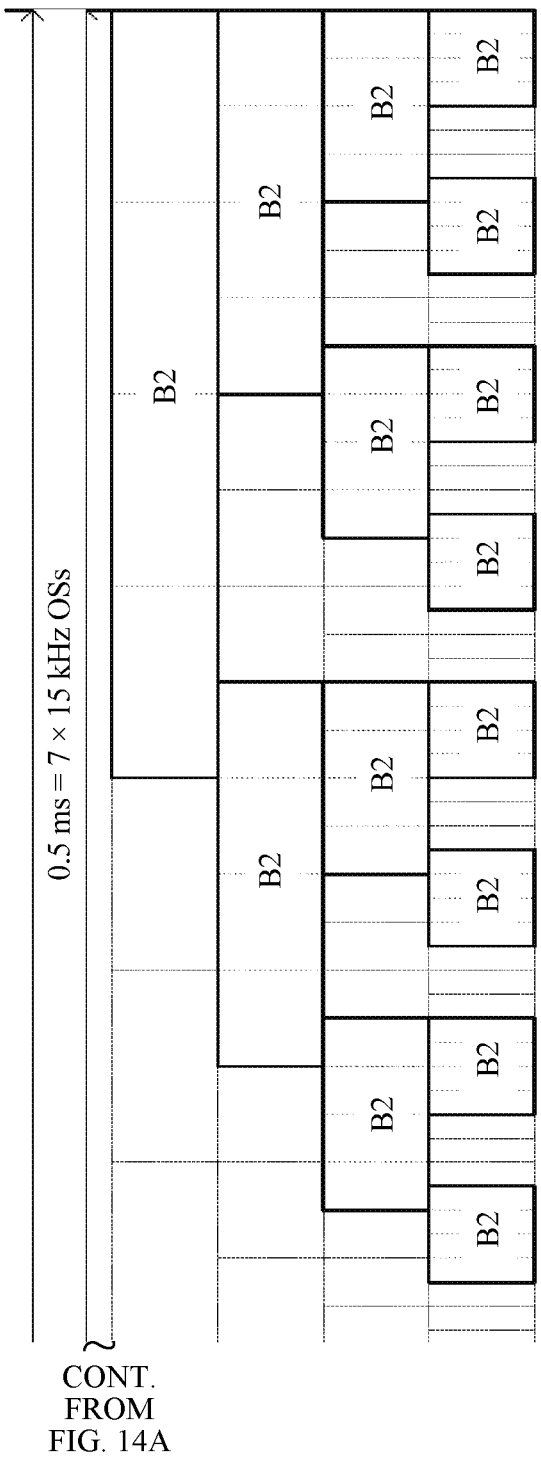
Figure 15A:
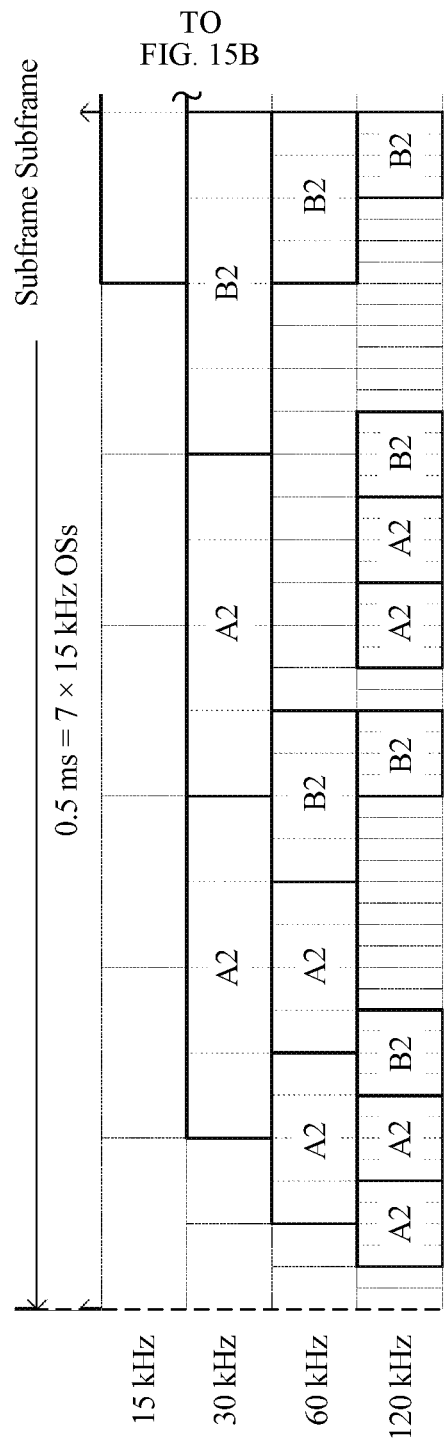
FIG. 15A and FIG. 15B are a schematic structural diagram of a random access preamble in a random access method according to another embodiment of this application.
Figures 15A, 15B:
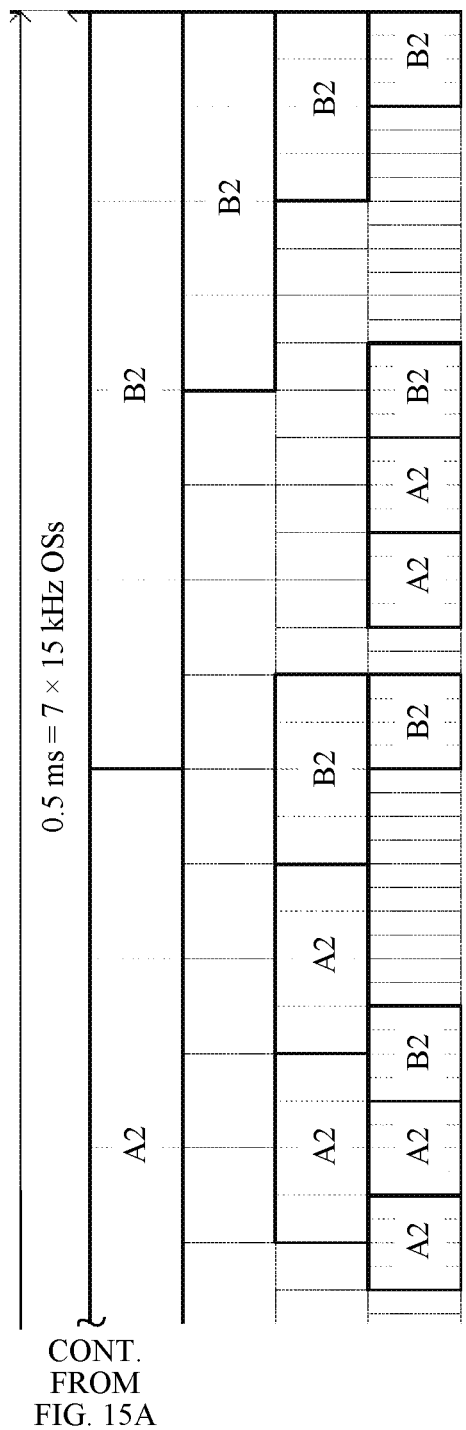

FIG. 7A and FIG. 7B are a schematic structural diagram of a random access preamble in a random access method according to an embodiment of this application. FIG. 8A and FIG. 8B are a schematic structural diagram of a random access preamble in a random access method according to another embodiment of this application. FIG. 9A and FIG. 9B are a schematic structural diagram of a random access preamble in a random access method according to another embodiment of this application. FIG. 10A and FIG. 10B are a schematic structural diagram of a random access preamble in a random access method according to another embodiment of this application. FIG. 11A and FIG. 11B are a schematic structural diagram of a random access preamble in a random access method according to another embodiment of this application. FIG. 12A and FIG. 12B are a schematic structural diagram of a random access preamble in a random access method according to another embodiment of this application. FIG. 13A and FIG. 13B are a schematic structural diagram of a random access preamble in a random access method according to another embodiment of this application. FIG. 14A and FIG. 14B are a schematic structural diagram of a random access preamble in a random access method according to another embodiment of this application. FIG. 15A and FIG. 15B are a schematic structural diagram of a random access preamble in a random access method according to another embodiment of this application.

For example, FIG. 7A and FIG. 7B to FIG. 15A and FIG. 15B show nine slot structures of random access preambles.

Optionally, a plurality of random access structures correspond to a plurality of random access resource time densities. For example, FIG. 7A and FIG. 7B to FIG. 9A and FIG. 9B, and FIG. 12A and FIG. 12B to FIG. 15A and FIG. 15B respectively show random access resources in different slots or OFDM symbol positions, but quantities of random access resources in slots in a subframe are the same. For another example, FIG. 9A and FIG. 9B to FIG. 11A and FIG. 11B respectively show that each slot includes two, four, or six random access resources (the preamble format is A1 or B1).

Optionally, quantities of random access resources in a plurality of slots are different. For example, in subframes with subcarrier spacings of 30 kHz, 60 kHz, and 120 kHz in FIG. 15A and FIG. 15B, a quantity of resources in an odd slot is different from a quantity of resources in an even slot. The foregoing {FIG. 7A and FIG. 7B to FIG. 11A and FIG. 11B} and {FIG. 12A and FIG. 12B to FIG. 15A and FIG. 15B} are respectively intended for the random access preamble formats A1 and B1, and A2 and B2. Actually, a random access preamble format is not limited to these random access preamble formats, and may be any other one or more random access preamble formats.

For example, each figure in {FIG. 7A and FIG. 7B to FIG. 11A and FIG. 11B} and {FIG. 12A and FIG. 12B to FIG. 15A and FIG. 15B} indicates a random access structure at four different subcarrier spacings: 15 kHz, 30 kHz, 60 kHz, and 120 kHz. Actually, a specific random access structure is determined based on a subcarrier spacing configured or preset by the network device and/or indication information of the random access structure. To be specific, at different subcarrier spacings, different random access structures may be any one of structures in corresponding subcarrier spacings in the figure, and are not limited to a combination of correspondences in the figure. For example, at 15 kHz, when the indication information of the random access structure is 0, it corresponds to the structure in FIG. 7A and FIG. 7B, or when the indication information of the random access structure is 1, it corresponds to the structures in FIG. 7A and FIG. 7B to FIG. 9A and FIG. 9B; and at 30 kHz, when the indication information of the random access structure is 0, it corresponds to the structure in FIG. 7A and FIG. 7B, or when the indication information of the random access structure is 1, it corresponds to the structure in FIG. 8A and FIG. 8B.

The network device indicates a current random access configuration index and structure information of a random access preamble by using signaling. The terminal device obtains a subframe or a slot in which a random access resource is located, a start OFDM symbol position, duration, or an end position, and a quantity of random access resources based on at least one of a sequence length of the random access preamble, a subcarrier spacing of the random access preamble, a random access preamble format, a serving cell identity of the random access resource, carrier frequency information of the random access resource, a carrier frequency range, a service type, a maximum quantity of downlink signals, information about an actually transmitted downlink signal, a quantity of random access resource frequencies at a same time, a random access resource period, an association relationship between a downlink signal and a random access resource, a quantity of random access resources associated with a downlink signal, a random access configuration index, and indication information of a random access structure. The signaling may be radio resource control (RRC) signaling, system information (SI), medium access control-control element (MAC CE) signaling, downlink control information (DCI), a physical downlink control channel order (PDCCH order), or the like.

For example, the subcarrier spacing of the random access preamble is determined based on a frequency of the random access resource and information indicated by the network device about the subcarrier spacing of the random access preamble. When the random access resource is located in a frequency band lower than 6 GHz and the information indicated by the network device about the subcarrier spacing of the random access preamble is a first preset value (for example, 0), the subcarrier spacing of the random access preamble is 15 kHz; when the random access resource is located in a frequency band lower than 6 GHz and the information indicated by the network device about the subcarrier spacing of the random access preamble is a second preset value (for example, 1), the subcarrier spacing of the random access preamble is 30 kHz; when the random access resource is located in a frequency band higher than 6 GHz and the information indicated by the network device about the subcarrier spacing of the random access preamble is a first preset value (for example, 0), the subcarrier spacing of the random access preamble is 60 kHz; or when the random access resource is located in a frequency band higher than 6 GHz and the information indicated by the network device about the subcarrier spacing of the random access preamble is a second preset value (for example, 1), the subcarrier spacing of the random access preamble is 120 kHz.

In an implementation, for a same random access preamble format, in a same random access resource time density (or random access resource period), there are a maximum of two different random access configuration indexes, and at least one of a system frame, a slot, and a time of the random access resource in the slot corresponding to one random access configuration index is not completely the same as or is completely different from that corresponding to the other random access configuration index. For example, system frame positions are the same, but slot positions and/or OFDM symbol positions of the random access resources in the slots are different. For another example, slot positions are the same, but system frame positions and/or OFDM symbol positions of the random access resources in the slots are different. For another example, OFDM symbol positions of the random access resources in the slots are the same, but system frame positions and/or slot positions are different. The same time density means a same quantity of random access resources in a same time interval. For example, the time interval is one of 5 ms, 10 ms, 20 ms, 40 ms, 80 ms, 160 ms, 320 ms, and 640 ms.

It should be noted that, the random access structure is a structure with one or more random access preambles or resources in one or more slots/subframes; or may be a structure with one or more random access preambles or resources in one or more OFDM symbols, for example, as shown in Table 22 to Table 24. In another embodiment, the random access resource in the random access structure may be alternatively in another form. For example, in the random access structure, one slot is used for reference, and a plurality of slots form a new random access structure (for example, random access resources may be inconsecutive in time); in the random access structure, one slot is used for reference, and slots in one or more subframes form a new random access structure (for example, random access resources may be inconsecutive in time); or in the random access structure, a plurality of OFDM symbols are used for reference, and one or more slots form a new random access structure (for example, random access resources are inconsecutive in time).

Figure 16:
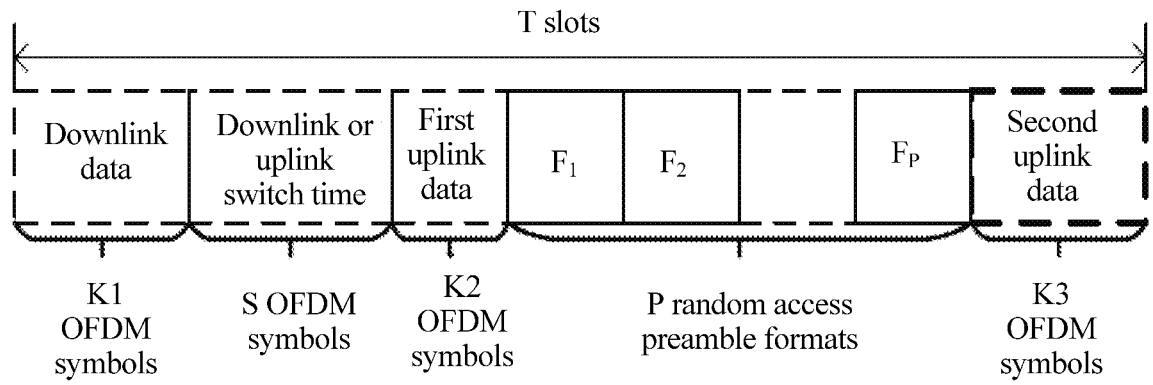
FIG. 16 is a schematic diagram of a random access structure in a random access method according to an embodiment of this application.

FIG. 16 is a schematic diagram of a random access structure in a random access method according to an embodiment of this application.

In FIG. 16, a time range of a random access resource is indicated by T slots, where T is an integer greater than 0.

As shown in FIG. 16, downlink data and/or uplink data may exist in the T slots, P random access preamble formats and the downlink data each are consecutive in time, and P random access preambles may use different formats. K1 indicates a quantity of OFDM symbols occupied by the downlink data, K2 indicates a quantity of OFDM symbols (or duration) occupied by first uplink data before a random access preamble format, K3 indicates a quantity of OFDM symbols occupied by second uplink data after the random access preamble format, and S indicates a quantity of OFDM symbols occupied by an uplink or downlink switch time.

The uplink or downlink switch time is a time of switching from uplink transmission to downlink transmission, or a time of switching from downlink transmission to uplink transmission.

The OFDM symbols in FIG. 16 use a subcarrier spacing of the uplink or downlink data for reference.

For example, when T=1, a subcarrier spacing of the uplink data and the downlink data is the same as that of the random access preamble. In this case, K1, K2, and K3 may be 0 to 12 OFDM symbols. For example, P=8, all the random access preamble formats are the same and are A0, K1=4, K2=0, K3=0, and S=2 OFDM symbols. For another example, P=8, all the random access preamble formats are C0, K1=0, K2=0, K3=0, and S=2 OFDM symbols. For another example, P=2, all the random access preamble formats are C2, K1=3, K2=0, K3=0, and S=2 OFDM symbols. In another embodiment, at least one of K1, K2, and K3 is a fixed value. For example, K1 is fixed to 0. For another example, K2 is fixed to 0. For another example, K3 is fixed to 0. In another implementation, specific values of K1, K2, K3, P, S, and T are related to at least one of a random access preamble format, a sequence length of a random access preamble, a subcarrier spacing of a random access preamble, a random access configuration index, a quantity of downlink signals, a carrier frequency range of a time-frequency resource, a service type supported by the frequency band, and a waveform parameter (for example, a subcarrier or a frame structure) at a reference time in the frequency band. A sum of total duration of uplink data and downlink data, total duration of the P random access preambles, and a downlink-to-uplink switch time S does not exceed duration of the T slots. For example, T and P are related to the random access preamble format and the subcarrier spacing of the random access preamble (or a corresponding subcarrier spacing index). When the subcarrier spacing index of the random access preamble is u, and the corresponding subcarrier spacing is $15 \times 2^u$ kHz, the corresponding $T=2^u$ slots, and $P=P0*2^u$, where P0 is a value indicated and configured by the network device by using signaling or is a predefined value related to the random access preamble format.

However, this is not limited. In the following Table 16 to Table 24, in each switch time i (indicating an uplink-downlink switch time) column, a first sub column indicates a switch time (denoted as S, where a time unit is $\kappa \cdot 2^{-u}$), a second sub column indicates a quantity (denoted as M, indicating other uplink and downlink data) of OFDM symbols in the T slots, and a third sub column indicates a quantity (denoted as S) of ROs (random access resources) in the T slots, where M=K1+K2+K3.

Optionally, the first sub column of each switch time i may be the same and is i*2192 times (the unit is $\kappa \cdot 2^{-u}$). If the switch time spans a time 0 or 0.5 ms, 16 times (the unit is $\kappa \cdot 2^{-u}$) are correspondingly added.

In an embodiment, the quantity K3 of OFDM symbols occupied by the second uplink data is equal to 0. In this case, a start time of a first random access resource in the T slots is $(2192*M+S)*k*2^{-u}$ basic time units; and a start time of a $p^{th}$ random access resource is $(2192*M+S)*k*2^{-u}+p*N$, where p=0, 1, ..., P−1, $N=N_u+N_{CP}^{RA}+N_{GT}^{RA}$ or $N=N_u+N_{CP}^{RA}$ (as described in Table 1 and Table 2, $N_u$ is a sequence length of a random access preamble format, $N_{CP}^{RA}$ is a cyclic prefix length of the random access preamble format, and $N_{GT}^{RA}$ is a guard interval of the random access preamble format). In an embodiment, the quantity K3 of OFDM symbols occupied by the second uplink data is equal to 0. In this case, a start time of a first random access resource in the T slots is $(2192*(K1+K2)+S)*k*2^{-u}$ basic time units; and a start time of a $p^{th}$ random access resource is $(2192*M+S)*k*2^{-u}+p*N$, where p=0, 1, ..., P−1.

When the downlink data, the uplink data, the switch time, or the random access preamble spans start times of n subframes or median values of subframes (for example, Q+0.5 ms, where Q is an integer), a cyclic prefix or a guard interval of the random access preamble is correspondingly extended by $16*n*k*2^{-u}$ basic time units, or a time of transmitting the random access preamble is advanced by $16*n*k*2^{-u}$ basic time units. In another embodiment, a time of transmitting each random access preamble is advanced by $8*m*k*2^{-u}$ basic time units, relative to the time (for example, at least one of a subframe, a slot, a start OFDM symbol, and an end OFDM symbol) of the random access resource, where m is a preconfigured value or a value configured by the network device by using signaling, and m=0 to 4095.

In another embodiment, P is related to a random access preamble format, a sequence length of a random access preamble, a subcarrier spacing of the random access preamble, a maximum quantity of downlink signals, an actually transmitted downlink signal, a service type, and a carrier frequency. Optionally, a quantity P of random access resources in every T slots is equal to $2^k$, where k is equal to 0 to 8. For example, when T=1, and the maximum quantity of downlink signals is 4, and the random access preamble format is A0, C0, A1, or B1, P=4. For another example, when T=1, and the maximum quantity of downlink signals is 8, and the random access preamble format is A0 or C0, P=8. For another example, when T=1, and the random access preamble format is A2, A3, or C2, P=2. For another example, when T=1, and the random access preamble format is B4, P=1.

In another embodiment, T and P are related to a random access preamble format, a sequence length of a random access preamble, a subcarrier spacing of the random access preamble, a quantity of random access resources associated with a downlink signal, a maximum quantity of downlink signals, an actually transmitted downlink signal, a service type, and a carrier frequency. For example, when the subcarrier spacing of the random access preamble is 15 kHz or 30 kHz, and the maximum quantity of downlink signals is 4, and the random access preamble format is A0, C0, A1, or B1, T=1, and P=4. For another example, when the subcarrier spacing of the random access preamble is 15 kHz or 30 kHz, and the maximum quantity of downlink signals is 4, and the random access preamble format is A2, A3, or C2, T=2, and P=2. For another example, when the subcarrier spacing of the random access preamble is 15 kHz or 30 kHz, and the maximum quantity of downlink signals is 4, and the random access preamble format is B4, T=4, and P=1. For another example, when the subcarrier spacing of the random access preamble is 15 kHz or 30 kHz, and the maximum quantity of downlink signals is 8, and the random access preamble format is A0, C0, A1, or B1, T=1, and P=8. For another example, when the subcarrier spacing of the random access preamble is 15 kHz or 30 kHz, and the maximum quantity of downlink signals is 8, and the random access preamble format is A2, A3, or C2, T=4, and P=2. For another example, when the subcarrier spacing of the random access preamble is 15 kHz, and the maximum quantity of downlink signals is 8, and the random access preamble format is B4, T=4, and P=1. For another example, when the subcarrier spacing of the random access preamble is 30 kHz, and the maximum quantity of downlink signals is 8, and the random access preamble format is B4, T=8, and P=1.

In Table 16, T=1 is used as an example.

TABLE 16

| Format | Switch time 0 | | | Switch time 1 | | | Switch time 2 | | | Switch time 3 | | | Switch time 4 | | |
|---|---|---|---|---|---|---|---|---|---|---|---|---|---|---|---|
| | S | M | P | S | M | P | S | M | P | S | M | P | S | M | P |
| A0 | 0 | 13 | 1 | 2192 | 12 | 1 | 4384 | 11 | 1 | 6576 | 10 | 1 | 8768 | 9 | 1 |
| A0 | 0 | 12 | 2 | 2192 | 11 | 2 | 4384 | 10 | 2 | 6576 | 9 | 2 | 8768 | 8 | 2 |
| A0 | 0 | 11 | 3 | 2192 | 10 | 3 | 4384 | 9 | 3 | 6576 | 8 | 3 | 8768 | 7 | 3 |
| A0 | 0 | 10 | 4 | 2192 | 9 | 4 | 4384 | 8 | 4 | 6576 | 7 | 4 | 8768 | 6 | 4 |
| A0 | 0 | 9 | 5 | 2192 | 8 | 5 | 4384 | 7 | 5 | 6576 | 6 | 5 | 8768 | 5 | 5 |
| A0 | 0 | 8 | 6 | 2192 | 7 | 6 | 4384 | 6 | 6 | 6576 | 5 | 6 | 8768 | 4 | 6 |
| A0 | 0 | 7 | 7 | 2192 | 6 | 7 | 4384 | 5 | 7 | 6576 | 4 | 7 | 8768 | 3 | 7 |
| A0 | 0 | 6 | 8 | 2192 | 5 | 8 | 4384 | 4 | 8 | 6576 | 3 | 8 | 8768 | 2 | 8 |
| A0 | 0 | 5 | 9 | 2192 | 4 | 9 | 4384 | 3 | 9 | 6576 | 2 | 9 | 8768 | 1 | 9 |
| A0 | 0 | 4 | 10 | 2192 | 3 | 10 | 4384 | 2 | 10 | 6576 | 1 | 10 | 8768 | 0 | 10 |
| A0 | 0 | 3 | 11 | 2192 | 2 | 11 | 4384 | 1 | 11 | 6576 | 0 | 11 | N/A | N/A | N/A |
| A0 | 0 | 2 | 12 | 2192 | 1 | 12 | 4384 | 0 | 12 | N/A | N/A | N/A | N/A | N/A | N/A |
| A0 | 0 | 1 | 13 | 2192 | 0 | 13 | N/A | N/A | N/A | N/A | N/A | N/A | N/A | N/A | N/A |
| A0 | 0 | 0 | 14 | N/A | N/A | N/A | N/A | N/A | N/A | N/A | N/A | N/A | N/A | N/A | N/A |
| A1 | 0 | 12 | 1 | 2192 | 11 | 1 | 4384 | 10 | 1 | 6576 | 9 | 1 | 8768 | 8 | 1 |
| A1 | 0 | 10 | 2 | 2192 | 9 | 2 | 4384 | 8 | 2 | 6576 | 7 | 2 | 8768 | 6 | 2 |
| A1 | 0 | 8 | 3 | 2192 | 7 | 3 | 4384 | 6 | 3 | 6576 | 5 | 3 | 8768 | 4 | 3 |
| A1 | 0 | 6 | 4 | 2192 | 5 | 4 | 4384 | 4 | 4 | 6576 | 3 | 4 | 8768 | 2 | 4 |
| A1 | 0 | 4 | 5 | 2192 | 3 | 5 | 4384 | 2 | 5 | 6576 | 1 | 5 | 8768 | 0 | 5 |
| A1 | 0 | 2 | 6 | 2192 | 1 | 6 | 4384 | 0 | 6 | N/A | N/A | N/A | N/A | N/A | N/A |
| A1 | 0 | 0 | 7 | N/A | N/A | N/A | N/A | N/A | N/A | N/A | N/A | N/A | N/A | N/A | N/A |
| A2 | 0 | 10 | 1 | 2192 | 9 | 1 | 4384 | 8 | 1 | 6576 | 7 | 1 | 8768 | 6 | 1 |
| A2 | 0 | 6 | 2 | 2192 | 5 | 2 | 4384 | 4 | 2 | 6576 | 3 | 2 | 8768 | 2 | 2 |
| A2 | 0 | 2 | 3 | 2192 | 1 | 3 | 4384 | 0 | 3 | N/A | N/A | N/A | N/A | N/A | N/A |
| A3 | 0 | 8 | 1 | 2192 | 7 | 1 | 4384 | 6 | 1 | 6576 | 5 | 1 | 8768 | 4 | 1 |
| A3 | 0 | 1 | 2 | 2192 | 1 | 2 | 4384 | 0 | 2 | N/A | N/A | N/A | N/A | N/A | N/A |
| B1 | 72 | 12 | 1 | 2264 | 11 | 1 | 4456 | 10 | 1 | 6648 | 9 | 1 | 8840 | 8 | 1 |
| B1 | 144 | 10 | 2 | 2336 | 9 | 2 | 4528 | 8 | 2 | 6720 | 7 | 2 | 8912 | 6 | 2 |
| B1 | 216 | 8 | 3 | 2408 | 7 | 3 | 4600 | 6 | 3 | 6792 | 5 | 3 | 8984 | 4 | 3 |
| B1 | 288 | 6 | 4 | 2480 | 5 | 4 | 4672 | 4 | 4 | 6864 | 3 | 4 | 9056 | 2 | 4 |
| B1 | 360 | 4 | 5 | 2552 | 3 | 5 | 4744 | 2 | 5 | 6936 | 1 | 5 | 9128 | 0 | 5 |
| B1 | 432 | 2 | 6 | 2624 | 1 | 6 | 4816 | 0 | 6 | N/A | N/A | N/A | N/A | N/A | N/A |
| B1 | 504 | 0 | 7 | N/A | N/A | N/A | N/A | N/A | N/A | N/A | N/A | N/A | N/A | N/A | N/A |
| B2 | 216 | 10 | 1 | 2408 | 9 | 1 | 4600 | 8 | 1 | 6792 | 7 | 1 | 8984 | 6 | 1 |
| B2 | 432 | 6 | 2 | 2624 | 5 | 2 | 4816 | 4 | 2 | 7008 | 3 | 2 | 9200 | 2 | 2 |
| B2 | 648 | 2 | 3 | 2840 | 1 | 3 | 5032 | 0 | 3 | N/A | N/A | N/A | N/A | N/A | N/A |
| B3 | 360 | 8 | 1 | 2552 | 7 | 1 | 4744 | 6 | 1 | 6936 | 5 | 1 | 9128 | 4 | 1 |
| B3 | 720 | 2 | 2 | 2912 | 1 | 2 | 5104 | 0 | 2 | N/A | N/A | N/A | N/A | N/A | N/A |
| B4 | 792 | 2 | 1 | 2984 | 1 | 1 | 5176 | 0 | 1 | N/A | N/A | N/A | N/A | N/A | N/A |
| C0 | 1096 | 12 | 1 | 3288 | 11 | 1 | 5480 | 10 | 1 | 7672 | 9 | 1 | 9864 | 8 | 1 |
| C0 | 0 | 11 | 2 | 2192 | 10 | 2 | 4384 | 9 | 2 | 6576 | 8 | 2 | 8768 | 7 | 2 |
| C0 | 1096 | 9 | 3 | 3288 | 8 | 3 | 5480 | 7 | 3 | 7672 | 6 | 3 | 9864 | 5 | 3 |
| C0 | 0 | 8 | 4 | 2192 | 7 | 4 | 4384 | 6 | 4 | 6576 | 5 | 4 | 8768 | 4 | 4 |
| C0 | 1096 | 6 | 5 | 3288 | 5 | 5 | 5480 | 4 | 5 | 7672 | 3 | 5 | 9864 | 2 | 5 |

TABLE 16-continued

| | Switch time 0 | | | Switch time 1 | | | Switch time 2 | | | Switch time 3 | | | Switch time 4 | | |
|---|---|---|---|---|---|---|---|---|---|---|---|---|---|---|---|
| Format | S | M | P | S | M | P | S | M | P | S | M | P | S | M | P |
| C0 | 0 | 5 | 6 | 2192 | 4 | 6 | 4384 | 3 | 6 | 6576 | 2 | 6 | 8768 | 1 | 6 |
| C0 | 1096 | 3 | 7 | 3288 | 2 | 7 | 5480 | 1 | 7 | 7672 | 0 | 7 | N/A | N/A | N/A |
| C0 | 0 | 2 | 8 | 2192 | 1 | 8 | N/A | N/A | N/A | N/A | N/A | N/A | N/A | N/A | N/A |
| C0 | 1096 | 0 | 9 | N/A | N/A | N/A | N/A | N/A | N/A | N/A | N/A | N/A | N/A | N/A | N/A |
| C2 | 720 | 9 | 1 | 2912 | 8 | 1 | 5104 | 7 | 1 | 7296 | 6 | 1 | 9488 | 5 | 1 |
| C2 | 1440 | 4 | 2 | 3632 | 3 | 2 | 5824 | 2 | 2 | 8016 | 1 | 2 | N/A | N/A | N/A |

In Table 17, T=2 is used as an example.

TABLE 17

| | Switch time 0 | | | Switch time 1 | | | Switch time 2 | | | Switch time 3 | | | Switch time 4 | | |
|---|---|---|---|---|---|---|---|---|---|---|---|---|---|---|---|
| Format | S | M | P | S | M | P | S | M | P | S | M | P | S | M | P |
| A0 | 0 | 13 | 15 | 2192 | 12 | 15 | 4384 | 11 | 15 | 6576 | 10 | 15 | 8768 | 9 | 15 |
| A0 | 0 | 12 | 16 | 2192 | 11 | 16 | 4384 | 10 | 16 | 6576 | 9 | 16 | 8768 | 8 | 16 |
| A0 | 0 | 11 | 17 | 2192 | 10 | 17 | 4384 | 9 | 17 | 6576 | 8 | 17 | 8768 | 7 | 17 |
| A0 | 0 | 10 | 18 | 2192 | 9 | 18 | 4384 | 8 | 18 | 6576 | 7 | 18 | 8768 | 6 | 18 |
| A0 | 0 | 9 | 19 | 2192 | 8 | 19 | 4384 | 7 | 19 | 6576 | 6 | 19 | 8768 | 5 | 19 |
| A0 | 0 | 8 | 20 | 2192 | 7 | 20 | 4384 | 6 | 20 | 6576 | 5 | 20 | 8768 | 4 | 20 |
| A0 | 0 | 7 | 21 | 2192 | 6 | 21 | 4384 | 5 | 21 | 6576 | 4 | 21 | 8768 | 3 | 21 |
| A0 | 0 | 6 | 22 | 2192 | 5 | 22 | 4384 | 4 | 22 | 6576 | 3 | 22 | 8768 | 2 | 22 |
| A0 | 0 | 5 | 23 | 2192 | 4 | 23 | 4384 | 3 | 23 | 6576 | 2 | 23 | 8768 | 1 | 23 |
| A0 | 0 | 4 | 24 | 2192 | 3 | 24 | 4384 | 2 | 24 | 6576 | 1 | 24 | 8768 | 0 | 24 |
| A0 | 0 | 3 | 25 | 2192 | 2 | 25 | 4384 | 1 | 25 | 6576 | 0 | 25 | N/A | N/A | N/A |
| A0 | 0 | 2 | 26 | 2192 | 1 | 26 | 4384 | 0 | 26 | N/A | N/A | N/A | N/A | N/A | N/A |
| A0 | 0 | 1 | 27 | 2192 | 0 | 27 | N/A | N/A | N/A | N/A | N/A | N/A | N/A | N/A | N/A |
| A0 | 0 | 0 | 28 | N/A | N/A | N/A | N/A | N/A | N/A | N/A | N/A | N/A | N/A | N/A | N/A |
| A1 | 0 | 12 | 8 | 2192 | 11 | 8 | 4384 | 10 | 8 | 6576 | 9 | 8 | 8768 | 8 | 8 |
| A1 | 0 | 10 | 9 | 2192 | 9 | 9 | 4384 | 8 | 9 | 6576 | 7 | 9 | 8768 | 6 | 9 |
| A1 | 0 | 8 | 10 | 2192 | 7 | 10 | 4384 | 6 | 10 | 6576 | 5 | 10 | 8768 | 4 | 10 |
| A1 | 0 | 6 | 11 | 2192 | 5 | 11 | 4384 | 4 | 11 | 6576 | 3 | 11 | 8768 | 2 | 11 |
| A1 | 0 | 4 | 12 | 2192 | 3 | 12 | 4384 | 2 | 12 | 6576 | 1 | 12 | 8768 | 0 | 12 |
| A1 | 0 | 2 | 13 | 2192 | 1 | 13 | 4384 | 0 | 13 | N/A | N/A | N/A | N/A | N/A | N/A |
| A1 | 0 | 0 | 14 | N/A | N/A | N/A | N/A | N/A | N/A | N/A | N/A | N/A | N/A | N/A | N/A |
| A2 | 0 | 12 | 4 | 2192 | 11 | 4 | 4384 | 10 | 4 | 6576 | 9 | 4 | 8768 | 8 | 4 |
| A2 | 0 | 8 | 5 | 2192 | 7 | 5 | 4384 | 6 | 5 | 6576 | 5 | 5 | 8768 | 4 | 5 |
| A2 | 0 | 4 | 6 | 2192 | 3 | 6 | 4384 | 2 | 6 | 6576 | 1 | 6 | 8768 | 0 | 6 |
| A2 | 0 | 0 | 7 | N/A | N/A | N/A | N/A | N/A | N/A | N/A | N/A | N/A | N/A | N/A | N/A |
| A3 | 0 | 10 | 3 | 2192 | 9 | 3 | 4384 | 8 | 3 | 6576 | 7 | 3 | 8768 | 6 | 3 |
| A3 | 0 | 4 | 4 | 2192 | 3 | 4 | 4384 | 2 | 4 | 6576 | 1 | 4 | 8768 | 0 | 4 |
| B1 | 576 | 12 | 8 | 2768 | 11 | 8 | 4960 | 10 | 8 | 7152 | 9 | 8 | 9344 | 8 | 8 |
| B1 | 648 | 10 | 9 | 2840 | 9 | 9 | 5032 | 8 | 9 | 7224 | 7 | 9 | 9416 | 6 | 9 |
| B1 | 720 | 8 | 10 | 2912 | 7 | 10 | 5104 | 6 | 10 | 7296 | 5 | 10 | 9488 | 4 | 10 |
| B1 | 792 | 6 | 11 | 2984 | 5 | 11 | 5176 | 4 | 11 | 7368 | 3 | 11 | 9560 | 2 | 11 |
| B1 | 864 | 4 | 12 | 3056 | 3 | 12 | 5248 | 2 | 12 | 7440 | 1 | 12 | 9632 | 0 | 12 |
| B1 | 936 | 2 | 13 | 3128 | 1 | 13 | 5320 | 0 | 13 | N/A | N/A | N/A | N/A | N/A | N/A |
| B1 | 1008 | 0 | 14 | N/A | N/A | N/A | N/A | N/A | N/A | N/A | N/A | N/A | N/A | N/A | N/A |
| B2 | 864 | 12 | 4 | 3056 | 11 | 4 | 5248 | 10 | 4 | 7440 | 9 | 4 | 9632 | 8 | 4 |
| B2 | 1080 | 8 | 5 | 3272 | 7 | 5 | 5464 | 6 | 5 | 7656 | 5 | 5 | 9848 | 4 | 5 |
| B2 | 1296 | 4 | 6 | 3488 | 3 | 6 | 5680 | 2 | 6 | 7872 | 1 | 6 | 10064 | 0 | 6 |
| B2 | 1512 | 0 | 7 | N/A | N/A | N/A | N/A | N/A | N/A | N/A | N/A | N/A | N/A | N/A | N/A |
| B3 | 1080 | 10 | 3 | 3272 | 9 | 3 | 5464 | 8 | 3 | 7656 | 7 | 3 | 9848 | 6 | 3 |
| B3 | 1440 | 4 | 4 | 3632 | 3 | 4 | 5824 | 2 | 4 | 8016 | 1 | 4 | 10208 | 0 | 4 |
| B4 | 1584 | 4 | 2 | 3776 | 3 | 2 | 5968 | 2 | 2 | 8160 | 1 | 2 | 10352 | 0 | 2 |
| C0 | 0 | 13 | 10 | 2192 | 12 | 10 | 4384 | 11 | 10 | 6576 | 10 | 10 | 8768 | 9 | 10 |
| C0 | 1096 | 11 | 11 | 3288 | 10 | 11 | 5480 | 9 | 11 | 7672 | 8 | 11 | 9864 | 7 | 11 |
| C0 | 0 | 10 | 12 | 2192 | 9 | 12 | 4384 | 8 | 12 | 6576 | 7 | 12 | 8768 | 6 | 12 |
| C0 | 1096 | 8 | 13 | 3288 | 7 | 13 | 5480 | 6 | 13 | 7672 | 5 | 13 | 9864 | 4 | 13 |
| C0 | 0 | 7 | 14 | 2192 | 6 | 14 | 4384 | 5 | 14 | 6576 | 4 | 14 | 8768 | 3 | 14 |
| C0 | 1096 | 5 | 15 | 3288 | 4 | 15 | 5480 | 3 | 15 | 7672 | 2 | 15 | 9864 | 1 | 15 |
| C0 | 0 | 4 | 16 | 2192 | 3 | 16 | 4384 | 2 | 16 | 6576 | 1 | 16 | N/A | N/A | N/A |
| C0 | 1096 | 2 | 17 | 3288 | 1 | 17 | 5480 | 0 | 17 | N/A | N/A | N/A | N/A | N/A | N/A |
| C0 | 0 | 1 | 18 | N/A | N/A | N/A | N/A | N/A | N/A | N/A | N/A | N/A | N/A | N/A | N/A |
| C2 | 2160 | 13 | 3 | 4352 | 12 | 3 | 6544 | 11 | 3 | 8736 | 10 | 3 | 10928 | 9 | 3 |
| C2 | 688 | 9 | 4 | 2880 | 8 | 4 | 5072 | 7 | 4 | 7264 | 6 | 4 | 9456 | 5 | 4 |
| C2 | 1408 | 4 | 5 | 3600 | 3 | 5 | 5792 | 2 | 5 | 7984 | 1 | 5 | N/A | N/A | N/A |

In Table 18, T=3 is used as an example.

TABLE 18

| Format | Switch time 0 | | | Switch time 1 | | | Switch time 2 | | | Switch time 3 | | | Switch time 4 | | |
|---|---|---|---|---|---|---|---|---|---|---|---|---|---|---|---|
| | S | M | P | S | M | P | S | M | P | S | M | P | S | M | P |
| A0 | 0 | 13 | 29 | 2192 | 12 | 29 | 4384 | 11 | 29 | 6576 | 10 | 29 | 8768 | 9 | 29 |
| A0 | 0 | 12 | 30 | 2192 | 11 | 30 | 4384 | 10 | 30 | 6576 | 9 | 30 | 8768 | 8 | 30 |
| A0 | 0 | 11 | 31 | 2192 | 10 | 31 | 4384 | 9 | 31 | 6576 | 8 | 31 | 8768 | 7 | 31 |
| A0 | 0 | 10 | 32 | 2192 | 9 | 32 | 4384 | 8 | 32 | 6576 | 7 | 32 | 8768 | 6 | 32 |
| A0 | 0 | 9 | 33 | 2192 | 8 | 33 | 4384 | 7 | 33 | 6576 | 6 | 33 | 8768 | 5 | 33 |
| A0 | 0 | 8 | 34 | 2192 | 7 | 34 | 4384 | 6 | 34 | 6576 | 5 | 34 | 8768 | 4 | 34 |
| A0 | 0 | 7 | 35 | 2192 | 6 | 35 | 4384 | 5 | 35 | 6576 | 4 | 35 | 8768 | 3 | 35 |
| A0 | 0 | 6 | 36 | 2192 | 5 | 36 | 4384 | 4 | 36 | 6576 | 3 | 36 | 8768 | 2 | 36 |
| A0 | 0 | 5 | 37 | 2192 | 4 | 37 | 4384 | 3 | 37 | 6576 | 2 | 37 | 8768 | 1 | 37 |
| A0 | 0 | 4 | 38 | 2192 | 3 | 38 | 4384 | 2 | 38 | 6576 | 1 | 38 | 8768 | 0 | 38 |
| A0 | 0 | 3 | 39 | 2192 | 2 | 39 | 4384 | 1 | 39 | 6576 | 0 | 39 | N/A | N/A | N/A |
| A0 | 0 | 2 | 40 | 2192 | 1 | 40 | 4384 | 0 | 40 | N/A | N/A | N/A | N/A | N/A | N/A |
| A0 | 0 | 1 | 41 | 2192 | 0 | 41 | N/A | N/A | N/A | N/A | N/A | N/A | N/A | N/A | N/A |
| A0 | 0 | 0 | 42 | N/A | N/A | N/A | N/A | N/A | N/A | N/A | N/A | N/A | N/A | N/A | N/A |
| A1 | 0 | 12 | 15 | 2192 | 11 | 15 | 4384 | 10 | 15 | 6576 | 9 | 15 | 8768 | 8 | 15 |
| A1 | 0 | 10 | 16 | 2192 | 9 | 16 | 4384 | 8 | 16 | 6576 | 7 | 16 | 8768 | 6 | 16 |
| A1 | 0 | 8 | 17 | 2192 | 7 | 17 | 4384 | 6 | 17 | 6576 | 5 | 17 | 8768 | 4 | 17 |
| A1 | 0 | 6 | 18 | 2192 | 5 | 18 | 4384 | 4 | 18 | 6576 | 3 | 18 | 8768 | 2 | 18 |
| A1 | 0 | 4 | 19 | 2192 | 3 | 19 | 4384 | 2 | 19 | 6576 | 1 | 19 | 8768 | 0 | 19 |
| A1 | 0 | 2 | 20 | 2192 | 1 | 20 | 4384 | 0 | 20 | N/A | N/A | N/A | N/A | N/A | N/A |
| A1 | 0 | 0 | 21 | N/A | N/A | N/A | N/A | N/A | N/A | N/A | N/A | N/A | N/A | N/A | N/A |
| A2 | 0 | 10 | 8 | 2192 | 9 | 8 | 4384 | 8 | 8 | 6576 | 7 | 8 | 8768 | 6 | 8 |
| A2 | 0 | 6 | 9 | 2192 | 5 | 9 | 4384 | 4 | 9 | 6576 | 3 | 9 | 8768 | 2 | 9 |
| A2 | 0 | 2 | 10 | 2192 | 1 | 10 | 4384 | 0 | 10 | N/A | N/A | N/A | N/A | N/A | N/A |
| A2 | 0 | 12 | 5 | 2192 | 11 | 5 | 4384 | 10 | 5 | 6576 | 9 | 5 | 8768 | 8 | 5 |
| A3 | 0 | 6 | 6 | 2192 | 5 | 6 | 4384 | 4 | 6 | 6576 | 3 | 6 | 8768 | 2 | 6 |
| A3 | 0 | 0 | 7 | N/A | N/A | N/A | N/A | N/A | N/A | N/A | N/A | N/A | N/A | N/A | N/A |
| B1 | 1080 | 12 | 15 | 3272 | 11 | 15 | 5464 | 10 | 15 | 7656 | 9 | 15 | 9848 | 8 | 15 |
| B1 | 1152 | 10 | 16 | 3344 | 9 | 16 | 5536 | 8 | 16 | 7728 | 7 | 16 | 9920 | 6 | 16 |
| B1 | 1224 | 8 | 17 | 3416 | 7 | 17 | 5608 | 6 | 17 | 7800 | 5 | 17 | 9992 | 4 | 17 |
| B1 | 1296 | 6 | 18 | 3488 | 5 | 18 | 5680 | 4 | 18 | 7872 | 3 | 18 | 10064 | 2 | 18 |
| B1 | 1368 | 4 | 19 | 3560 | 3 | 19 | 5752 | 2 | 19 | 7944 | 1 | 19 | 10136 | 0 | 19 |
| B1 | 1440 | 2 | 20 | 3632 | 1 | 20 | 5824 | 0 | 20 | N/A | N/A | N/A | N/A | N/A | N/A |
| B1 | 1512 | 0 | 21 | N/A | N/A | N/A | N/A | N/A | N/A | N/A | N/A | N/A | N/A | N/A | N/A |
| B2 | 1728 | 10 | 8 | 3920 | 9 | 8 | 6112 | 8 | 8 | 8304 | 7 | 8 | 10496 | 6 | 8 |
| B2 | 1944 | 6 | 9 | 4136 | 5 | 9 | 6328 | 4 | 9 | 8520 | 3 | 9 | 10712 | 2 | 9 |
| B2 | 2160 | 2 | 10 | 4352 | 1 | 10 | 6544 | 0 | 10 | N/A | N/A | N/A | N/A | N/A | N/A |
| B2 | 1800 | 12 | 5 | 3992 | 11 | 5 | 6184 | 10 | 5 | 8376 | 9 | 5 | 10568 | 8 | 5 |
| B3 | 2160 | 6 | 6 | 4352 | 5 | 6 | 6544 | 4 | 6 | 8736 | 3 | 6 | 10928 | 2 | 6 |
| B3 | 328 | 1 | 7 | N/A | N/A | N/A | N/A | N/A | N/A | N/A | N/A | N/A | N/A | N/A | N/A |
| B4 | 184 | 7 | 3 | 2376 | 6 | 3 | 4568 | 5 | 3 | 6760 | 4 | 3 | 8952 | 3 | 3 |
| C0 | 1096 | 13 | 19 | 3288 | 12 | 19 | 5480 | 11 | 19 | 7672 | 10 | 19 | 9864 | 9 | 19 |
| C0 | 0 | 12 | 20 | 2192 | 11 | 20 | 4384 | 10 | 20 | 6576 | 9 | 20 | 8768 | 8 | 20 |
| C0 | 1096 | 10 | 21 | 3288 | 9 | 21 | 5480 | 8 | 21 | 7672 | 7 | 21 | 9864 | 6 | 21 |
| C0 | 0 | 9 | 22 | 2192 | 8 | 22 | 4384 | 7 | 22 | 6576 | 6 | 22 | 8768 | 5 | 22 |
| C0 | 1096 | 7 | 23 | 3288 | 6 | 23 | 5480 | 5 | 23 | 7672 | 4 | 23 | 9864 | 3 | 23 |
| C0 | 0 | 6 | 24 | 2192 | 5 | 24 | 4384 | 4 | 24 | 6576 | 3 | 24 | 8768 | 2 | 24 |
| C0 | 1096 | 4 | 25 | 3288 | 3 | 25 | 5480 | 2 | 25 | 7672 | 1 | 25 | 9864 | 0 | 25 |
| C0 | 0 | 3 | 26 | 2192 | 2 | 26 | 4384 | 1 | 26 | N/A | N/A | N/A | N/A | N/A | N/A |
| C0 | 1096 | 1 | 27 | 3288 | 0 | 27 | N/A | N/A | N/A | N/A | N/A | N/A | N/A | N/A | N/A |
| C2 | 2128 | 13 | 6 | 4320 | 12 | 6 | 6512 | 11 | 6 | 8704 | 10 | 6 | 10896 | 9 | 6 |
| C2 | 656 | 9 | 7 | 2848 | 8 | 7 | 5040 | 7 | 7 | 7232 | 6 | 7 | 9424 | 5 | 7 |
| C2 | 1376 | 4 | 8 | 3568 | 3 | 8 | 5760 | 2 | 8 | 7952 | 1 | 8 | N/A | N/A | N/A |

In Table 19, T=4 is used as an example.

TABLE 19

| Format | Switch time 0 | | | Switch time 1 | | | Switch time 2 | | | Switch time 3 | | | Switch time 4 | | |
|---|---|---|---|---|---|---|---|---|---|---|---|---|---|---|---|
| | S | M | P | S | M | P | S | M | P | S | M | P | S | M | P |
| A0 | 0 | 13 | 43 | 2192 | 12 | 43 | 4384 | 11 | 43 | 6576 | 10 | 43 | 8768 | 9 | 43 |
| A0 | 0 | 12 | 44 | 2192 | 11 | 44 | 4384 | 10 | 44 | 6576 | 9 | 44 | 8768 | 8 | 44 |
| A0 | 0 | 11 | 45 | 2192 | 10 | 45 | 4384 | 9 | 45 | 6576 | 8 | 45 | 8768 | 7 | 45 |
| A0 | 0 | 10 | 46 | 2192 | 9 | 46 | 4384 | 8 | 46 | 6576 | 7 | 46 | 8768 | 6 | 46 |
| A0 | 0 | 9 | 47 | 2192 | 8 | 47 | 4384 | 7 | 47 | 6576 | 6 | 47 | 8768 | 5 | 47 |
| A0 | 0 | 8 | 48 | 2192 | 7 | 48 | 4384 | 6 | 48 | 6576 | 5 | 48 | 8768 | 4 | 48 |
| A0 | 0 | 7 | 49 | 2192 | 6 | 49 | 4384 | 5 | 49 | 6576 | 4 | 49 | 8768 | 3 | 49 |
| A0 | 0 | 6 | 50 | 2192 | 5 | 50 | 4384 | 4 | 50 | 6576 | 3 | 50 | 8768 | 2 | 50 |
| A0 | 0 | 5 | 51 | 2192 | 4 | 51 | 4384 | 3 | 51 | 6576 | 2 | 51 | 8768 | 1 | 51 |
| A0 | 0 | 4 | 52 | 2192 | 3 | 52 | 4384 | 2 | 52 | 6576 | 1 | 52 | 8768 | 0 | 52 |

TABLE 19-continued

| Format | Switch time 0 | | | Switch time 1 | | | Switch time 2 | | | Switch time 3 | | | Switch time 4 | | |
|---|---|---|---|---|---|---|---|---|---|---|---|---|---|---|---|
| | S | M | P | S | M | P | S | M | P | S | M | P | S | M | P |
| A0 | 0 | 3 | 53 | 2192 | 2 | 53 | 4384 | 1 | 53 | 6576 | 0 | 53 | N/A | N/A | N/A |
| A0 | 0 | 2 | 54 | 2192 | 1 | 54 | 4384 | 0 | 54 | N/A | N/A | N/A | N/A | N/A | N/A |
| A0 | 0 | 1 | 55 | 2192 | 0 | 55 | N/A | N/A | N/A | N/A | N/A | N/A | N/A | N/A | N/A |
| A0 | 0 | 0 | 56 | N/A | N/A | N/A | N/A | N/A | N/A | N/A | N/A | N/A | N/A | N/A | N/A |
| A1 | 0 | 12 | 22 | 2192 | 11 | 22 | 4384 | 10 | 22 | 6576 | 9 | 22 | 8768 | 8 | 22 |
| A1 | 0 | 10 | 23 | 2192 | 9 | 23 | 4384 | 8 | 23 | 6576 | 7 | 23 | 8768 | 6 | 23 |
| A1 | 0 | 8 | 24 | 2192 | 7 | 24 | 4384 | 6 | 24 | 6576 | 5 | 24 | 8768 | 4 | 24 |
| A1 | 0 | 6 | 25 | 2192 | 5 | 25 | 4384 | 4 | 25 | 6576 | 3 | 25 | 8768 | 2 | 25 |
| A1 | 0 | 4 | 26 | 2192 | 3 | 26 | 4384 | 2 | 26 | 6576 | 1 | 26 | 8768 | 0 | 26 |
| A1 | 0 | 2 | 27 | 2192 | 1 | 27 | 4384 | 0 | 27 | N/A | N/A | N/A | N/A | N/A | N/A |
| A1 | 0 | 0 | 28 | N/A | N/A | N/A | N/A | N/A | N/A | N/A | N/A | N/A | N/A | N/A | N/A |
| A2 | 0 | 12 | 11 | 2192 | 11 | 11 | 4384 | 10 | 11 | 6576 | 9 | 11 | 8768 | 8 | 11 |
| A2 | 0 | 8 | 12 | 2192 | 7 | 12 | 4384 | 6 | 12 | 6576 | 5 | 12 | 8768 | 4 | 12 |
| A2 | 0 | 4 | 13 | 2192 | 3 | 13 | 4384 | 2 | 13 | 6576 | 1 | 13 | 8768 | 0 | 13 |
| A2 | 0 | 0 | 14 | N/A | N/A | N/A | N/A | N/A | N/A | N/A | N/A | N/A | N/A | N/A | N/A |
| A3 | 0 | 8 | 8 | 2192 | 7 | 8 | 4384 | 6 | 8 | 6576 | 5 | 8 | 8768 | 4 | 8 |
| A3 | 0 | 2 | 9 | 2192 | 1 | 9 | 4384 | 0 | 9 | N/A | N/A | N/A | N/A | N/A | N/A |
| B1 | 1584 | 12 | 22 | 3776 | 11 | 22 | 5968 | 10 | 22 | 8160 | 9 | 22 | 10352 | 8 | 22 |
| B1 | 1656 | 10 | 23 | 3848 | 9 | 23 | 6040 | 8 | 23 | 8232 | 7 | 23 | 10424 | 6 | 23 |
| B1 | 1728 | 8 | 24 | 3920 | 7 | 24 | 6112 | 6 | 24 | 8304 | 5 | 24 | 10496 | 4 | 24 |
| B1 | 1800 | 6 | 25 | 3992 | 5 | 25 | 6184 | 4 | 25 | 8376 | 3 | 25 | 10568 | 2 | 25 |
| B1 | 1872 | 4 | 26 | 4064 | 3 | 26 | 6256 | 2 | 26 | 8448 | 1 | 26 | 10640 | 0 | 26 |
| B1 | 1944 | 2 | 27 | 4136 | 1 | 27 | 6328 | 0 | 27 | N/A | N/A | N/A | N/A | N/A | N/A |
| B1 | 2016 | 0 | 28 | N/A | N/A | N/A | N/A | N/A | N/A | N/A | N/A | N/A | N/A | N/A | N/A |
| B2 | 184 | 13 | 11 | 2376 | 12 | 11 | 4568 | 11 | 11 | 6760 | 10 | 11 | 8952 | 9 | 11 |
| B2 | 400 | 9 | 12 | 2592 | 8 | 12 | 4784 | 7 | 12 | 6976 | 6 | 12 | 9168 | 5 | 12 |
| B2 | 616 | 5 | 13 | 2808 | 4 | 13 | 5000 | 3 | 13 | 7192 | 2 | 13 | 9384 | 1 | 13 |
| B2 | 832 | 1 | 14 | 3024 | 0 | 14 | N/A | N/A | N/A | N/A | N/A | N/A | N/A | N/A | N/A |
| B3 | 688 | 9 | 8 | 2880 | 8 | 8 | 5072 | 7 | 8 | 7264 | 6 | 8 | 9456 | 5 | 8 |
| B3 | 1048 | 3 | 9 | 3240 | 2 | 9 | 5432 | 1 | 9 | 7624 | 0 | 9 | N/A | N/A | N/A |
| B4 | 976 | 9 | 4 | 3168 | 8 | 4 | 5360 | 7 | 4 | 7552 | 6 | 4 | 9744 | 5 | 4 |
| C0 | 1096 | 12 | 29 | 3288 | 11 | 29 | 5480 | 10 | 29 | 7672 | 9 | 29 | 9864 | 8 | 29 |
| C0 | 0 | 11 | 30 | 2192 | 10 | 30 | 4384 | 9 | 30 | 6576 | 8 | 30 | 8768 | 7 | 30 |
| C0 | 1096 | 9 | 31 | 3288 | 8 | 31 | 5480 | 7 | 31 | 7672 | 6 | 31 | 9864 | 5 | 31 |
| C0 | 0 | 8 | 32 | 2192 | 7 | 32 | 4384 | 6 | 32 | 6576 | 5 | 32 | 8768 | 4 | 32 |
| C0 | 1096 | 6 | 33 | 3288 | 5 | 33 | 5480 | 4 | 33 | 7672 | 3 | 33 | 9864 | 2 | 33 |
| C0 | 0 | 5 | 34 | 2192 | 4 | 34 | 4384 | 3 | 34 | 6576 | 2 | 34 | 8768 | 1 | 34 |
| C0 | 1096 | 3 | 35 | 3288 | 2 | 35 | 5480 | 1 | 35 | 7672 | 0 | 35 | N/A | N/A | N/A |
| C0 | 0 | 2 | 36 | 2192 | 1 | 36 | N/A | N/A | N/A | N/A | N/A | N/A | N/A | N/A | N/A |
| C0 | 1096 | 0 | 37 | N/A | N/A | N/A | N/A | N/A | N/A | N/A | N/A | N/A | N/A | N/A | N/A |
| C2 | 2096 | 13 | 9 | 4288 | 12 | 9 | 6480 | 11 | 9 | 8672 | 10 | 9 | 10864 | 9 | 9 |
| C2 | 624 | 9 | 10 | 2816 | 8 | 10 | 5008 | 7 | 10 | 7200 | 6 | 10 | 9392 | 5 | 10 |
| C2 | 1344 | 4 | 11 | 3536 | 3 | 11 | 5728 | 2 | 11 | 7920 | 1 | 11 | N/A | N/A | N/A |

In Table 20, T=5 is used as an example.

TABLE 20

| Format | Switch time 0 | | | Switch time 1 | | | Switch time 2 | | | Switch time 3 | | | Switch time 4 | | |
|---|---|---|---|---|---|---|---|---|---|---|---|---|---|---|---|
| | S | M | P | S | M | P | S | M | P | S | M | P | S | M | P |
| A0 | 0 | 13 | 57 | 2192 | 12 | 57 | 4384 | 11 | 57 | 6576 | 10 | 57 | 8768 | 9 | 57 |
| A0 | 0 | 12 | 58 | 2192 | 11 | 58 | 4384 | 10 | 58 | 6576 | 9 | 58 | 8768 | 8 | 58 |
| A0 | 0 | 11 | 59 | 2192 | 10 | 59 | 4384 | 9 | 59 | 6576 | 8 | 59 | 8768 | 7 | 59 |
| A0 | 0 | 10 | 60 | 2192 | 9 | 60 | 4384 | 8 | 60 | 6576 | 7 | 60 | 8768 | 6 | 60 |
| A0 | 0 | 9 | 61 | 2192 | 8 | 61 | 4384 | 7 | 61 | 6576 | 6 | 61 | 8768 | 5 | 61 |
| A0 | 0 | 8 | 62 | 2192 | 7 | 62 | 4384 | 6 | 62 | 6576 | 5 | 62 | 8768 | 4 | 62 |
| A0 | 0 | 7 | 63 | 2192 | 6 | 63 | 4384 | 5 | 63 | 6576 | 4 | 63 | 8768 | 3 | 63 |
| A0 | 0 | 6 | 64 | 2192 | 5 | 64 | 4384 | 4 | 64 | 6576 | 3 | 64 | 8768 | 2 | 64 |
| A0 | 0 | 5 | 65 | 2192 | 4 | 65 | 4384 | 3 | 65 | 6576 | 2 | 65 | 8768 | 1 | 65 |
| A0 | 0 | 4 | 66 | 2192 | 3 | 66 | 4384 | 2 | 66 | 6576 | 1 | 66 | 8768 | 0 | 66 |
| A0 | 0 | 3 | 67 | 2192 | 2 | 67 | 4384 | 1 | 67 | 6576 | 0 | 67 | N/A | N/A | N/A |
| A0 | 0 | 2 | 68 | 2192 | 1 | 68 | 4384 | 0 | 68 | N/A | N/A | N/A | N/A | N/A | N/A |
| A0 | 0 | 1 | 69 | 2192 | 0 | 69 | N/A | N/A | N/A | N/A | N/A | N/A | N/A | N/A | N/A |
| A0 | 0 | 0 | 70 | N/A | N/A | N/A | N/A | N/A | N/A | N/A | N/A | N/A | N/A | N/A | N/A |
| A1 | 0 | 12 | 29 | 2192 | 11 | 29 | 4384 | 10 | 29 | 6576 | 9 | 29 | 8768 | 8 | 29 |
| A1 | 0 | 10 | 30 | 2192 | 9 | 30 | 4384 | 8 | 30 | 6576 | 7 | 30 | 8768 | 6 | 30 |
| A1 | 0 | 8 | 31 | 2192 | 7 | 31 | 4384 | 6 | 31 | 6576 | 5 | 31 | 8768 | 4 | 31 |
| A1 | 0 | 6 | 32 | 2192 | 5 | 32 | 4384 | 4 | 32 | 6576 | 3 | 32 | 8768 | 2 | 32 |
| A1 | 0 | 4 | 33 | 2192 | 3 | 33 | 4384 | 2 | 33 | 6576 | 1 | 33 | 8768 | 0 | 33 |
| A1 | 0 | 2 | 34 | 2192 | 1 | 34 | 4384 | 0 | 34 | N/A | N/A | N/A | N/A | N/A | N/A |
| A1 | 0 | 0 | 35 | N/A | N/A | N/A | N/A | N/A | N/A | N/A | N/A | N/A | N/A | N/A | N/A |
| A2 | 0 | 10 | 15 | 2192 | 9 | 15 | 4384 | 8 | 15 | 6576 | 7 | 15 | 8768 | 6 | 15 |

TABLE 20-continued

| | Switch time 0 | | | Switch time 1 | | | Switch time 2 | | | Switch time 3 | | | Switch time 4 | | |
|---|---|---|---|---|---|---|---|---|---|---|---|---|---|---|---|
| Format | S | M | P | S | M | P | S | M | P | S | M | P | S | M | P |
| A2 | 0 | 6 | 16 | 2192 | 5 | 16 | 4384 | 4 | 16 | 6576 | 3 | 16 | 8768 | 2 | 16 |
| A2 | 0 | 2 | 17 | 2192 | 1 | 17 | 4384 | 0 | 17 | N/A | N/A | N/A | N/A | N/A | N/A |
| A3 | | | | 2192 | 9 | 10 | 4384 | 8 | 10 | 6576 | 7 | 10 | 8768 | 6 | 10 |
| A3 | 0 | 4 | 11 | 2192 | 3 | 11 | 4384 | 2 | 11 | 6576 | 1 | 11 | 8768 | 0 | 11 |
| B1 | 2088 | 12 | 29 | 4280 | 11 | 29 | 6472 | 10 | 29 | 8664 | 9 | 29 | 10856 | 8 | 29 |
| B1 | 2160 | 10 | 30 | 4352 | 9 | 30 | 6544 | 8 | 30 | 8736 | 7 | 30 | 10928 | 6 | 30 |
| B1 | 40 | 9 | 31 | 2232 | 8 | 31 | 4424 | 7 | 31 | 6616 | 6 | 31 | 8808 | 5 | 31 |
| B1 | 112 | 7 | 32 | 2304 | 6 | 32 | 4496 | 5 | 32 | 6688 | 4 | 32 | 8880 | 3 | 32 |
| B1 | 184 | 5 | 33 | 2376 | 4 | 33 | 4568 | 3 | 33 | 6760 | 2 | 33 | 8952 | 1 | 33 |
| B1 | 256 | 3 | 34 | 2448 | 2 | 34 | 4640 | 1 | 34 | 6832 | 0 | 34 | N/A | N/A | N/A |
| B1 | 328 | 1 | 35 | 2520 | 0 | 35 | N/A | N/A | N/A | N/A | N/A | N/A | N/A | N/A | N/A |
| B2 | 1048 | 11 | 15 | 3240 | 10 | 15 | 5432 | 9 | 15 | 7624 | 8 | 15 | 9816 | 7 | 15 |
| B2 | 1264 | 7 | 16 | 3456 | 6 | 16 | 5648 | 5 | 16 | 7840 | 4 | 16 | 10032 | 3 | 16 |
| B2 | 1480 | 3 | 17 | 3672 | 2 | 17 | 5864 | 1 | 17 | 8056 | 0 | 17 | N/A | N/A | N/A |
| B3 | 1408 | 11 | 10 | 3600 | 10 | 10 | 5792 | 9 | 10 | 7984 | 8 | 10 | 10176 | 7 | 10 |
| B3 | 1768 | 5 | 11 | 3960 | 4 | 11 | 6152 | 3 | 11 | 8344 | 2 | 11 | 10536 | 1 | 11 |
| B4 | 1768 | 11 | 5 | 3960 | 10 | 5 | 6152 | 9 | 5 | 8344 | 8 | 5 | 10536 | 7 | 5 |
| C0 | 0 | 13 | 38 | 2192 | 12 | 38 | 4384 | 11 | 38 | 6576 | 10 | 38 | 8768 | 9 | 38 |
| C0 | 1096 | 11 | 39 | 3288 | 10 | 39 | 5480 | 9 | 39 | 7672 | 8 | 39 | 9864 | 7 | 39 |
| C0 | 0 | 10 | 40 | 2192 | 9 | 40 | 4384 | 8 | 40 | 6576 | 7 | 40 | 8768 | 6 | 40 |
| C0 | 1096 | 8 | 41 | 3288 | 7 | 41 | 5480 | 6 | 41 | 7672 | 5 | 41 | 9864 | 4 | 41 |
| C0 | 0 | 7 | 42 | 2192 | 6 | 42 | 4384 | 5 | 42 | 6576 | 4 | 42 | 8768 | 3 | 42 |
| C0 | 1096 | 5 | 43 | 3288 | 4 | 43 | 5480 | 3 | 43 | 7672 | 2 | 43 | 9864 | 1 | 43 |
| C0 | 0 | 4 | 44 | 2192 | 3 | 44 | 4384 | 2 | 44 | 6576 | 1 | 44 | N/A | N/A | N/A |
| C0 | 1096 | 2 | 45 | 3288 | 1 | 45 | 5480 | 0 | 45 | N/A | N/A | N/A | N/A | N/A | N/A |
| C0 | 0 | 1 | 46 | N/A | N/A | N/A | N/A | N/A | N/A | N/A | N/A | N/A | N/A | N/A | N/A |
| C2 | 2064 | 13 | 12 | 4256 | 12 | 12 | 6448 | 11 | 12 | 8640 | 10 | 12 | 10832 | 9 | 12 |
| C2 | 592 | 9 | 13 | 2784 | 8 | 13 | 4976 | 7 | 13 | 7168 | 6 | 13 | 9360 | 5 | 13 |
| C2 | 1312 | 4 | 14 | 3504 | 3 | 14 | 5696 | 2 | 14 | 7888 | 1 | 14 | N/A | N/A | N/A |

In Table 21, T=6 is used as an example.

TABLE 21

| | Switch time 0 | | | Switch time 1 | | | Switch time 2 | | | Switch time 3 | | | Switch time 4 | | |
|---|---|---|---|---|---|---|---|---|---|---|---|---|---|---|---|
| Format | S | M | P | S | M | P | S | M | P | S | M | P | S | M | P |
| A0 | 0 | 13 | 71 | 2192 | 12 | 71 | 4384 | 11 | 71 | 6576 | 10 | 71 | 8768 | 9 | 71 |
| A0 | 0 | 12 | 72 | 2192 | 11 | 72 | 4384 | 10 | 72 | 6576 | 9 | 72 | 8768 | 8 | 72 |
| A0 | 0 | 11 | 73 | 2192 | 10 | 73 | 4384 | 9 | 73 | 6576 | 8 | 73 | 8768 | 7 | 73 |
| A0 | 0 | 10 | 74 | 2192 | 9 | 74 | 4384 | 8 | 74 | 6576 | 7 | 74 | 8768 | 6 | 74 |
| A0 | 0 | 9 | 75 | 2192 | 8 | 75 | 4384 | 7 | 75 | 6576 | 6 | 75 | 8768 | 5 | 75 |
| A0 | 0 | 8 | 76 | 2192 | 7 | 76 | 4384 | 6 | 76 | 6576 | 5 | 76 | 8768 | 4 | 76 |
| A0 | 0 | 7 | 77 | 2192 | 6 | 77 | 4384 | 5 | 77 | 6576 | 4 | 77 | 8768 | 3 | 77 |
| A0 | 0 | 6 | 78 | 2192 | 5 | 78 | 4384 | 4 | 78 | 6576 | 3 | 78 | 8768 | 2 | 78 |
| A0 | 0 | 5 | 79 | 2192 | 4 | 79 | 4384 | 3 | 79 | 6576 | 2 | 79 | 8768 | 1 | 79 |
| A0 | 0 | 4 | 80 | 2192 | 3 | 80 | 4384 | 2 | 80 | 6576 | 1 | 80 | 8768 | 0 | 80 |
| A0 | 0 | 3 | 81 | 2192 | 2 | 81 | 4384 | 1 | 81 | 6576 | 0 | 81 | N/A | N/A | N/A |
| A0 | 0 | 2 | 82 | 2192 | 1 | 82 | 4384 | 0 | 82 | N/A | N/A | N/A | N/A | N/A | N/A |
| A0 | 0 | 1 | 83 | 2192 | 0 | 83 | N/A | N/A | N/A | N/A | N/A | N/A | N/A | N/A | N/A |
| A0 | 0 | 0 | 84 | N/A | N/A | N/A | N/A | N/A | N/A | N/A | N/A | N/A | N/A | N/A | N/A |
| A1 | 0 | 12 | 36 | 2192 | 11 | 36 | 4384 | 10 | 36 | 6576 | 9 | 36 | 8768 | 8 | 36 |
| A1 | 0 | 10 | 37 | 2192 | 9 | 37 | 4384 | 8 | 37 | 6576 | 7 | 37 | 8768 | 6 | 37 |
| A1 | 0 | 8 | 38 | 2192 | 7 | 38 | 4384 | 6 | 38 | 6576 | 5 | 38 | 8768 | 4 | 38 |
| A1 | 0 | 6 | 39 | 2192 | 5 | 39 | 4384 | 4 | 39 | 6576 | 3 | 39 | 8768 | 2 | 39 |
| A1 | 0 | 4 | 40 | 2192 | 3 | 40 | 4384 | 2 | 40 | 6576 | 1 | 40 | 8768 | 0 | 40 |
| A1 | 0 | 2 | 41 | 2192 | 1 | 41 | 4384 | 0 | 41 | N/A | N/A | N/A | N/A | N/A | N/A |
| A1 | 0 | 0 | 42 | N/A | N/A | N/A | N/A | N/A | N/A | N/A | N/A | N/A | N/A | N/A | N/A |
| A2 | 0 | 12 | 18 | 2192 | 11 | 18 | 4384 | 10 | 18 | 6576 | 9 | 18 | 8768 | 8 | 18 |
| A2 | 0 | 8 | 19 | 2192 | 7 | 19 | 4384 | 6 | 19 | 6576 | 5 | 19 | 8768 | 4 | 19 |
| A2 | 0 | 4 | 20 | 2192 | 3 | 20 | 4384 | 2 | 20 | 6576 | 1 | 20 | 8768 | 0 | 20 |
| A2 | 0 | 0 | 21 | N/A | N/A | N/A | N/A | N/A | N/A | N/A | N/A | N/A | N/A | N/A | N/A |
| A3 | 0 | 12 | 12 | 2192 | 11 | 12 | 4384 | 10 | 12 | 6576 | 9 | 12 | 8768 | 8 | 12 |
| A3 | 0 | 6 | 13 | 2192 | 5 | 13 | 4384 | 4 | 13 | 6576 | 3 | 13 | 8768 | 2 | 13 |
| A3 | 0 | 0 | 14 | N/A | N/A | N/A | N/A | N/A | N/A | N/A | N/A | N/A | N/A | N/A | N/A |
| B1 | 400 | 13 | 36 | 2592 | 12 | 36 | 4784 | 11 | 36 | 6976 | 10 | 36 | 9168 | 9 | 36 |
| B1 | 472 | 11 | 37 | 2664 | 10 | 37 | 4856 | 9 | 37 | 7048 | 8 | 37 | 9240 | 7 | 37 |
| B1 | 544 | 9 | 38 | 2736 | 8 | 38 | 4928 | 7 | 38 | 7120 | 6 | 38 | 9312 | 5 | 38 |
| B1 | 616 | 7 | 39 | 2808 | 6 | 39 | 5000 | 5 | 39 | 7192 | 4 | 39 | 9384 | 3 | 39 |
| B1 | 688 | 5 | 40 | 2880 | 4 | 40 | 5072 | 3 | 40 | 7264 | 2 | 40 | 9456 | 1 | 40 |
| B1 | 760 | 3 | 41 | 2952 | 2 | 41 | 5144 | 1 | 41 | 7336 | 0 | 41 | N/A | N/A | N/A |
| B1 | 832 | 1 | 42 | 3024 | 0 | 42 | N/A | N/A | N/A | N/A | N/A | N/A | N/A | N/A | N/A |
| B2 | 1696 | 13 | 18 | 3888 | 12 | 18 | 6080 | 11 | 18 | 8272 | 10 | 18 | 10464 | 9 | 18 |

TABLE 21-continued

|        | Switch time 0 | | | Switch time 1 | | | Switch time 2 | | | Switch time 3 | | | Switch time 4 | | |
|--------|------|----|----|------|----|----|------|-----|----|------|-----|----|-------|-----|----|
| Format | S    | M  | P  | S    | M  | P  | S    | M   | P  | S    | M   | P  | S     | M   | P  |
| B2 | 1912 | 9 | 19 | 4104 | 8 | 19 | 6296 | 7 | 19 | 8488 | 6 | 19 | 10680 | 5 | 19 |
| B2 | 2128 | 5 | 20 | 4320 | 4 | 20 | 6512 | 3 | 20 | 8704 | 2 | 20 | 10896 | 1 | 20 |
| B2 | 152 | 2 | 21 | 2344 | 1 | 21 | N/A | N/A | N/A | N/A | N/A | N/A | N/A | N/A | N/A |
| B3 | 2128 | 13 | 12 | 4320 | 12 | 12 | 6512 | 11 | 12 | 8704 | 10 | 12 | 10896 | 9 | 12 |
| B3 | 296 | 8 | 13 | 2488 | 7 | 13 | 4680 | 6 | 13 | 6872 | 5 | 13 | 9064 | 4 | 13 |
| B3 | 656 | 2 | 14 | 2848 | 1 | 14 | 5040 | 0 | 14 | N/A | N/A | N/A | N/A | N/A | N/A |
| B4 | 1160 | 2 | 7 | 3352 | 1 | 7 | 5544 | 0 | 7 | N/A | N/A | N/A | N/A | N/A | N/A |
| C0 | 1096 | 13 | 47 | 3288 | 12 | 47 | 5480 | 11 | 47 | 7672 | 10 | 47 | 9864 | 9 | 47 |
| C0 | 0 | 12 | 48 | 2192 | 11 | 48 | 4384 | 10 | 48 | 6576 | 9 | 48 | 8768 | 8 | 48 |
| C0 | 1096 | 10 | 49 | 3288 | 9 | 49 | 5480 | 8 | 49 | 7672 | 7 | 49 | 9864 | 6 | 49 |
| C0 | 0 | 9 | 50 | 2192 | 8 | 50 | 4384 | 7 | s0 | 6576 | 6 | s0 | 8768 | 5 | 50 |
| C0 | 1096 | 7 | 51 | 3288 | 6 | 51 | 5480 | 5 | 51 | 7672 | 4 | 51 | 9864 | 3 | 51 |
| C0 | 0 | 6 | 52 | 2192 | 5 | 52 | 4384 | 4 | 52 | 6576 | 3 | 52 | 8768 | 2 | 52 |
| C0 | 1096 | 4 | 53 | 3288 | 3 | 53 | 5480 | 2 | 53 | 7672 | 1 | 53 | 9864 | 0 | 53 |
| C0 | 0 | 3 | 54 | 2192 | 2 | 54 | 4384 | 1 | 54 | N/A | N/A | N/A | N/A | N/A | N/A |
| C0 | 1096 | 1 | 55 | 3288 | 0 | 55 | N/A | N/A | N/A | N/A | N/A | N/A | N/A | N/A | N/A |
| C2 | 2032 | 13 | 15 | 4224 | 12 | 15 | 6416 | 11 | 15 | 8608 | 10 | 15 | 10800 | 9 | 15 |
| C2 | 560 | 9 | 16 | 2752 | 8 | 16 | 4944 | 7 | 16 | 7136 | 6 | 16 | 9328 | 5 | 16 |
| C2 | 1280 | 4 | 17 | 3472 | 3 | 17 | 5664 | 2 | 17 | 7856 | 1 | 17 | N/A | N/A | N/A |

In Table 22, T=½ (or seven OFDM symbols) is used as an example.

TABLE 22

|        | Switch time 0 | | | Switch time 1 | | | Switch time 2 | | | Switch time 3 | | | Switch time 4 | | |
|--------|------|----|----|------|-----|-----|------|-----|-----|------|-----|-----|------|-----|-----|
| Format | S | M | P | S | M | P | S | M | P | S | M | P | S | M | P |
| A0 | 0 | 6 | 1 | 2192 | 5 | 1 | 4384 | 4 | 1 | 6576 | 3 | 1 | 8768 | 2 | 1 |
| A0 | 0 | 5 | 2 | 2192 | 4 | 2 | 4384 | 3 | 2 | 6576 | 2 | 2 | 8768 | 1 | 2 |
| A0 | 0 | 4 | 3 | 2192 | 3 | 3 | 4384 | 2 | 3 | 6576 | 1 | 3 | 8768 | 0 | 3 |
| A0 | 0 | 3 | 4 | 2192 | 2 | 4 | 4384 | 1 | 4 | 6576 | 0 | 4 | N/A | N/A | N/A |
| A0 | 0 | 2 | 5 | 2192 | 1 | 5 | 4384 | 0 | 5 | N/A | N/A | N/A | N/A | N/A | N/A |
| A0 | 0 | 1 | 6 | 2192 | 0 | 6 | N/A | N/A | N/A | N/A | N/A | N/A | N/A | N/A | N/A |
| A0 | 0 | 0 | 7 | N/A | N/A | N/A | N/A | N/A | N/A | N/A | N/A | N/A | N/A | N/A | N/A |
| A1 | 0 | 5 | 1 | 2192 | 4 | 1 | 4384 | 3 | 1 | 6576 | 2 | 1 | 8768 | 1 | 1 |
| A1 | 0 | 3 | 2 | 2192 | 2 | 2 | 4384 | 1 | 2 | 6576 | 0 | 2 | N/A | N/A | N/A |
| A1 | 0 | 1 | 3 | 2192 | 0 | 3 | N/A | N/A | N/A | N/A | N/A | N/A | N/A | N/A | N/A |
| A2 | 0 | 3 | 1 | 2192 | 2 | 1 | 4384 | 1 | 1 | 6576 | 0 | 1 | N/A | N/A | N/A |
| A3 | 0 | 1 | 1 | 2192 | 0 | 1 | N/A | N/A | N/A | N/A | N/A | N/A | N/A | N/A | N/A |
| B1 | 72 | 5 | 1 | 2264 | 4 | 1 | 4456 | 3 | 1 | 6648 | 2 | 1 | 8840 | 1 | 1 |
| B1 | 144 | 3 | 2 | 2336 | 2 | 2 | 4528 | 1 | 2 | 6720 | 0 | 2 | N/A | N/A | N/A |
| B1 | 216 | 1 | 3 | 2408 | 0 | 3 | N/A | N/A | N/A | N/A | N/A | N/A | N/A | N/A | N/A |
| B2 | 216 | 3 | 1 | 2408 | 2 | 1 | 4600 | 1 | 1 | 6792 | 0 | 1 | N/A | N/A | N/A |
| B3 | 360 | 1 | 1 | 2552 | 0 | 1 | N/A | N/A | N/A | N/A | N/A | N/A | N/A | N/A | N/A |
| C0 | 1096 | 5 | 1 | 3288 | 4 | 1 | 5480 | 3 | 1 | 7672 | 2 | 1 | 9864 | 1 | 1 |
| C0 | 0 | 4 | 2 | 2192 | 3 | 2 | 4384 | 2 | 2 | 6576 | 1 | 2 | N/A | N/A | N/A |
| C0 | 1096 | 2 | 3 | 3288 | 1 | 3 | 5480 | 0 | 3 | N/A | N/A | N/A | N/A | N/A | N/A |
| C0 | 0 | 1 | 4 | N/A | N/A | N/A | N/A | N/A | N/A | N/A | N/A | N/A | N/A | N/A | N/A |
| C2 | 720 | 2 | 1 | N/A | N/A | N/A | N/A | N/A | N/A | N/A | N/A | N/A | N/A | N/A | N/A |

In Table 23, T=¼ (or four OFDM symbols) is used as an example.

TABLE 23

|        | Switch time 0 | | | Switch time 1 | | | Switch time 2 | | | Switch time 3 | | |
|--------|------|-----|-----|------|-----|-----|------|-----|-----|------|-----|-----|
| Format | S | M | P | S | M | P | S | M | P | S | M | P |
| A0 | 0 | 3 | 1 | 2192 | 2 | 1 | 4384 | 1 | 1 | 6576 | 0 | 1 |
| A0 | 0 | 2 | 2 | 2192 | 1 | 2 | 4384 | 0 | 2 | N/A | N/A | N/A |
| A0 | 0 | 1 | 3 | 2192 | 0 | 3 | N/A | N/A | N/A | N/A | N/A | N/A |
| A0 | 0 | 0 | 4 | N/A | N/A | N/A | N/A | N/A | N/A | N/A | N/A | N/A |
| A1 | 0 | 2 | 1 | 2192 | 1 | 1 | 4384 | 0 | 1 | N/A | N/A | N/A |
| A1 | 0 | 0 | 2 | N/A | N/A | N/A | N/A | N/A | N/A | N/A | N/A | N/A |
| A2 | 0 | 0 | 1 | N/A | N/A | N/A | N/A | N/A | N/A | N/A | N/A | N/A |
| B1 | 72 | 2 | 1 | 2264 | 1 | 1 | 4456 | 0 | 1 | N/A | N/A | N/A |
| B1 | 144 | 0 | 2 | N/A | N/A | N/A | N/A | N/A | N/A | N/A | N/A | N/A |
| B2 | 216 | 0 | 1 | N/A | N/A | N/A | N/A | N/A | N/A | N/A | N/A | N/A |

TABLE 23-continued

|  | Switch time 0 | | | Switch time 1 | | | Switch time 2 | | | Switch time 3 | | |
| --- | --- | --- | --- | --- | --- | --- | --- | --- | --- | --- | --- | --- |
| Format | S | M | P | S | M | P | S | M | P | S | M | P |
| C0 | 1096 | 2 | 1 | 3288 | 1 | 1 | 5480 | 0 | 1 | N/A | N/A | N/A |
| C0 | 0 | 1 | 2 | N/A | N/A | N/A | N/A | N/A | N/A | N/A | N/A | N/A |

In Table 24, T=2/14 (or two OFDM symbols) is used as an example.

TABLE 24

|  | Switch time 0 | | | Switch time 1 | | |
| --- | --- | --- | --- | --- | --- | --- |
| Format | S | M | P | S | M | P |
| A0 | 0 | 1 | 1 | 2192 | 0 | 1 |
| A0 | 0 | 0 | 2 | N/A | N/A | N/A |
| A1 | 0 | 0 | 1 | N/A | N/A | N/A |
| B1 | 72 | 0 | 1 | N/A | N/A | N/A |
| C0 | 1096 | 0 | 1 | N/A | N/A | N/A |

"Format" in the foregoing tables is a format of a random access preamble.

Figure 17:
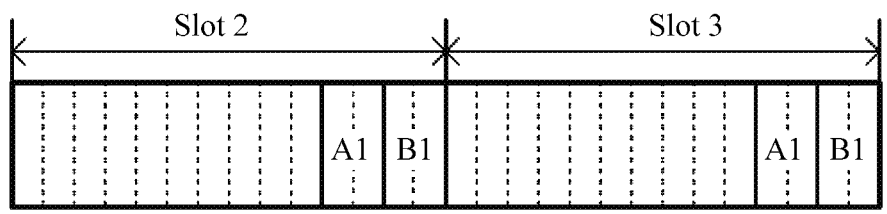
FIG. 17 is a schematic diagram of a slot structure in a random access method according to another embodiment of this application.
Figure 18:
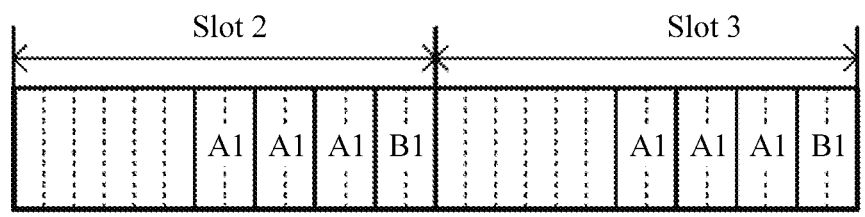
FIG. 18 is a schematic diagram of a slot structure in a random access method according to still another embodiment of this application.

FIG. 17 is a schematic diagram of a slot structure in a random access method according to another embodiment of this application. FIG. 18 is a schematic diagram of a slot structure in a random access method according to still another embodiment of this application.

For content determined based on a same random access configuration index, that is, a slot in which a same random access resource is located, a format of a random access preamble, a system frame position, and the like, specific arrangements may be alternatively different. The network device may transmit structure indication information to the terminal, where the structure indication information carries a structure flag bit.

For example, when the structure flag bit is "1", distribution of random access preambles in T slots is shown in FIG. 17. When the structure flag bit is "o", distribution of random access preambles in T slots is shown in FIG. 18.

Specifically, when T=1, a structure in FIG. 17 includes two random access preambles, and the random access preamble format corresponding to the index 26 in Table 3 is used as an example of a random access preamble format.

When T=2, a structure in FIG. 18 includes four random access preambles, and the random access preamble format corresponding to the index 26 in Table 3 is used as an example of a random access preamble format.

Further, when a downlink signal block actually transmitted by the network device changes, a random access resource in a random access period may also change.

Specifically, a random access resource is associated with a downlink signal, and one downlink signal corresponds to one or more random access resources. During downlink synchronization, the terminal selects a downlink signal i, and determines, based on the association relationship, a time-frequency position of a random access resource corresponding to the downlink signal i. In a random access configuration, a random access resource associated with a downlink signal in a maximum downlink signal set (or a downlink signal sweeping period) is just a random access resource in one random access period (one downlink signal may be associated with one or more resources, and a plurality of resources associated with a same downlink signal may be consecutive in time or may be inconsecutive in time). The maximum downlink signal set may be a maximum quantity of allowed downlink signal blocks corresponding to a carrier frequency or a frequency band (for example, a maximum downlink signal set below 3 gigahertz (GHz) includes four downlink signal blocks).

For example, when a downlink signal set includes four downlink signal blocks, and a random access configuration index is 26, a structure of a random access resource is shown in FIG. 17, where there is only one random access resource in frequency domain, and each downlink signal block is associated with a random access resource at one time. To be specific, a random access resource associated with a downlink signal block in a downlink signal set is just a specified resource in one random access period.

However, in actual application, a downlink signal block actually transmitted by the network device, in the downlink signal set may be adjusted. For example, only some of downlink signal blocks in the downlink signal set are transmitted. The adjustment affects a correspondence between a downlink signal and a random access resource. If a fixed random access resource is used, uncertainty of the time-frequency position of the random access resource associated with the downlink signal block in the downlink signal set is inevitably caused. Optionally, based on the actually transmitted downlink signal block in the maximum downlink signal set, the random access resource in the random access period is correspondingly adjusted, and/or the quantity of random access resources associated with the downlink signal block is adjusted. For example, an implementation is: sequentially mapping the actually transmitted downlink signal block (signal index i) to a random access resource (resource index i) in the random access period; and releasing remaining random access resources in the random access resource period for other uplink or downlink communication, or adjusting the structure of the random access resource in the random access period according to a pre-configured rule or a rule specified by the network device. Specifically, if two downlink signal blocks in the maximum downlink signal set N=4 are actually transmitted, in the structure shown in FIG. 17, random access resources in a slot 2 or a slot 3 may be reserved, and remaining access resources are released for other purposes. Alternatively, a random access resource whose format is B1 is reserved in each of a slot 2 and a slot 3 in FIG. 17, and two random access resources whose formats are A1 are released for other purposes. Alternatively, a quantity of random access resources associated with two actually transmitted downlink signal blocks is adjusted to 2, and a manner of associating the downlink signal blocks with the random access resources may be adjusted according to a preset rule, or the network device indicates an association manner. For example, a random access resource associated with a first downlink signal block is adjusted to indexes 1 and 2 (1 or 3), and a random access resource associated with a second downlink signal block is adjusted to indexes 3 and 4 (correspondingly, 2 or 4). For another example, if three downlink signals in the maximum downlink signal set N=4 are actually transmitted, in the structure shown in FIG. 17, only all random access resources in a slot 2 and a random access resource whose format is B1 in a slot 3 are reserved, and a random access resource whose format is A1 in the slot 3 is released for other purposes. Alternatively, in FIG. 17, all random access resources in a slot 3 and a random access resource whose format is B1 in a slot 2 are reserved, and a random access resource whose format is A1 in the slot 2 is released for other purposes. Alternatively, the network device instructs the terminal to adjust the structure of the random access resource, or the terminal adjusts the structure of the random access resource according to a predefined rule. Alternatively, a quantity of random access resources associated with one actually transmitted downlink signal block is adjusted to 2, and random access resources associated with other downlink signal blocks remain unchanged. For example, a quantity of random access resources associated with a first downlink signal block is adjusted to 2. Alternatively, a random access resource corresponding to another downlink signal block that is not transmitted is adjusted and provided for a first downlink signal block.

For another example, when a downlink signal set includes N=4 downlink signals, and a random access configuration index is 26, a structure of a random access resource is shown in FIG. 18, where there is only one random access resource in frequency domain, and each downlink signal block is associated with random access resources at two times. To be specific, a random access resource associated with a downlink signal block in a downlink signal set is just a specified resource in one random access period. As described above, in an implementation, two downlink signals in the maximum downlink signal set N=4 are actually transmitted. In this case, as shown in FIG. 18, random access resources in a slot 2 or a slot 3 are reserved, and remaining random access resources are released for other purposes. Alternatively, in FIG. 18, two last random access resources whose formats are A1 and B1 are reserved in a slot 2 and a slot 3 respectively, and first two random access resources whose formats are A1 in each slot are released for other purposes. Alternatively, a quantity of random access resources associated with two actually transmitted downlink signal blocks is adjusted to 4. To be specific, purposes of the random access resources are not changed, and a manner of associating the downlink signals with the random access resources may be adjusted according to a preset rule, or an association manner is indicated by the network device. For another example, if three downlink signals in the maximum downlink signal set N=4 are actually transmitted, in the structure shown in FIG. 18, all random access resources in a slot 2 and last two random access resources whose formats are A1 and B1 in a slot 3 are reserved, and first two random access resources whose formats are A1 in the slot 3 are released for other purposes. Alternatively, in the structure shown in FIG. 18, all random access resources in a slot 3 and last two random access resources whose formats are A1 and B1 in a slot 2 are reserved, and first two random access resources whose formats are A1 in the slot 2 are released for other purposes. Alternatively, the network device instructs the terminal to adjust the structure of the random access resource, or the structure of the random access resource is adjusted according to a predefined rule. Alternatively, a quantity of random access resources associated with one actually transmitted downlink signal block is adjusted to 4, and random access resources associated with other downlink signal blocks remain unchanged. For example, a quantity of resources associated with a first downlink signal block is adjusted to 4. Alternatively, a resource corresponding to another downlink signal block that is not transmitted is adjusted and provided for a first downlink signal.

In an implementation, a correspondence between a random access resource and a downlink signal is determined based on a maximum possible quantity of downlink signal blocks, and a downlink signal block index i1 corresponds to a random access resource j1 in a random access period. Actually, some downlink signal blocks (for example, a downlink signal block whose index is i2) are not transmitted. In this case, a corresponding random access resource (for example, a random access resource j2) may be used for random access of another type, for example, at least one of beam recovery, requesting system information, triggering transmission of a paging message, transmitting a plurality of messages 1 (transmitting a plurality of messages 1 before a random access response is received), and 2-step random access (2-step RACH procedure).

Optionally, in a random access process, main parameters for transmitting a random access preamble include one or more of parameters shown in Table 25.

TABLE 25

| Field name | Description |
| --- | --- |
| NumberOfRA-Preambles | Quantity of preambles |
| PreambleInitialReceivedTargetPower | Initial preamble (received) power |
| rootSequenceIndex | Root (of a Zadoff-Chu sequence) |
| Prach-ConfigIndex | PRACH configuration index |
| zeroCorrelationZoneConfig | Cyclic shift value index |
| highSpeedFlag | Mobility type |
| prach-FreqOffset | Frequency position of a random access resource |
| SequenceLengthType | Sequence length type of a random access preamble |
| Msg1SubcarrierSpacing | Subcarrier spacing of a random access preamble |
| Association | Association relationship between a downlink signal and a random access resource or a quantity of associated random access resources |
| RSRPThreshold | Downlink signal selection threshold |
| ActuallyTxSSBlock | Actually transmitted downlink signal |
| SSBTxPower | Downlink signal transmit power |

It should be noted that, the frequency position of the random access resource may be an offset relative to an initial access bandwidth, or may be an offset relative to a frequency of the downlink signal (for example, a center frequency or a start frequency or an end frequency of the downlink signal), and a unit may be a quantity of subcarriers or a physical resource block (physical resource block) or a physical resource block group (physical resource block group).

The subcarrier spacing of the random access preamble (Msg1SubcarrierSpacing), the association relationship (Association), the downlink signal received power threshold (RSRPThreshold), the actually transmitted downlink signal (ActuallyTxSSBlock), and the downlink signal transmit power (SSBTxPower) are parameters added based on LTE. The actually transmitted downlink signal (ActuallyTxSSBlock), the initial preamble received power PreambleInitialReceivedTargetPower, and the downlink signal transmit power SSBTxPower are configured based on a plurality of downlink signals. A maximum possible quantity of downlink signals in a frequency band is N. For example, if the frequency band is lower than 3 GHz, N=4. For example, if the frequency band is higher than 3 GHz and is not higher than 6 GHz, N=8. For example, if the frequency band is higher than 6 GHz, N=64. Actually, due to impact of factors such as an implementation capability and coverage of the network device, a quantity of downlink signals actually used in a cell is less than the maximum possible quantity of downlink signals. Therefore, actually transmitted downlink signals, that is, a quantity and indexes of downlink signals used for implementing cell coverage, need to be indicated. The downlink signal may be a downlink synchronization signal SS block or a PBCH block (synchronization signal or physical broadcast channel block), and/or a downlink channel state reference signal CSI-RS (channel state information reference signal).

In an implementation, the actually transmitted downlink signal may be configured by using a bitmap, and a quantity of bits required in the bitmap is related to the frequency band. For example, if one bit is used to indicate whether a downlink signal or a downlink signal group is transmitted, four bits are required when the frequency band is lower than 3 GHz; eight bits are required when the frequency band is higher than 3 GHz and is not higher than 6 GHz; or up to 64 bits are required when the frequency band is higher than 6 GHz. When the frequency band is higher than 6 GHz, the quantity of bits required in the bitmap may be reduced. In a manner 1, 64 downlink signals are classified into L groups, and each group includes M downlink signals, where L may be 2, 4, 8, 16, or 32, and correspondingly, M may be 32, 16, 8, 4, or 2. In this case, L bits may be used to indicate whether a downlink signal is transmitted in each downlink signal group. For example, if a first bit is 1, it indicates that a downlink signal in a first downlink signal group is transmitted. M bits are used to indicate actually transmitted downlink signals in a downlink signal group, and actually transmitted downlink signals in all downlink signal groups are the same. For example, if an $m^{th}$ bit is 1, it indicates that an $m^{th}$ downlink signal in a downlink signal group is transmitted.

Figure 19:
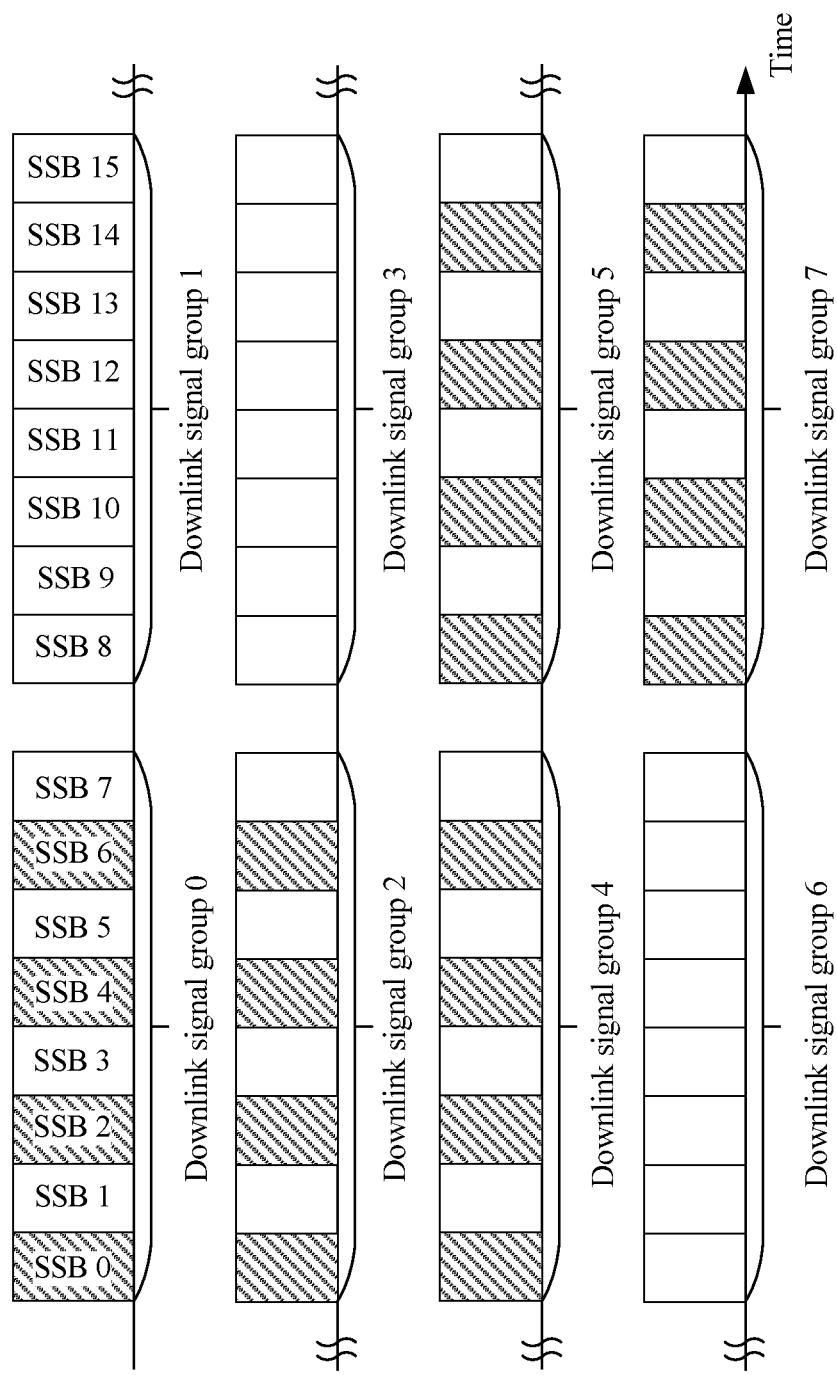
FIG. 19 is a schematic diagram of a downlink signal in a random access method according to an embodiment of this application.

FIG. 19 is a schematic diagram of a downlink signal in a random access method according to an embodiment of this application. Specifically, as shown in FIG. 19, L=8 and a corresponding bitmap is 10101101, and M=8 and a corresponding bitmap is 10101010, where a shadow part indicates that a downlink signal (denoted as an SSB) is transmitted.

During random access, at least the following parameters are required: whether a downlink signal (or a downlink signal group) is transmitted, transmit power of the downlink signal (or the downlink signal group), a transmit beamforming gain on the network device, a quantity of associated random access resources, initial preamble received power on a random access resource corresponding to the downlink signal (or the downlink signal group), and a receive beamforming gain on the network device, but the foregoing parameters may be different for different downlink signals (or different downlink signal groups). Therefore, the foregoing parameters are combined for transmission. For example, any quantity of the foregoing parameters are combined, and are configured separately from remaining parameters.

Specifically, for example, whether a downlink signal is transmitted, the transmit power of the downlink signal, and the transmit beamforming gain on the network device are configured by using a same parameter.

For another example, whether a downlink signal is transmitted and the quantity of associated random access resources are configured by using a same parameter.

For another example, whether a downlink signal is transmitted, the initial preamble received power on the random access resource corresponding to the downlink signal, and the receive beamforming gain on the network device are configured by using a same parameter.

Further, in an embodiment, whether a downlink signal is transmitted and the quantity of associated random access resources are configured by using a same parameter. For example, when the frequency band is lower than 3 GHz, for each downlink signal, 2 to 4 (or more) bits, 8 or 12 or 16 bits in total, are used to indicate whether the downlink signal is transmitted and the quantity of associated random access resources. Using two bits per downlink signal as an example, eight bits in total are required. A downlink signal m is indicated by using bits $2m$ and $2m+1$. When the bits $2m$ and $2m+1$ are 00, it indicates that the downlink signal is not transmitted; when the bits $2m$ and $2m+1$ are 01, it indicates that the downlink signal is transmitted, and a quantity of random access resources associated with the downlink signal is 1; when the bits $2m$ and $2m+1$ are 10, it indicates that the downlink signal is transmitted, and a quantity of random access resources associated with the downlink signal is 2; or when the bits $2m$ and $2m+1$ are 11, it indicates that the downlink signal is transmitted, and a quantity of random access resources associated with the downlink signal is 3. Herein one random access resource indicates one random access time-frequency resource or preamble in a set, and a size of the set is configured by the network device or is predefined or prestored. Similarly, when the frequency band is higher than 3 GHz and is not higher than 6 GHz, 8*2 or 8*3 or 8*4, that is, 16 or 24 or 32 bits, may be required; or when the frequency band is higher than 6 GHz, L bits are used to indicate an actually transmitted downlink signal group, actually transmitted downlink signals in the downlink signal group, and a quantity of random access resources associated with each downlink signal; and to indicate a quantity of downlink signals, M*2 or M*3 or M*4 bits are required. To be specific, L+2M or L+3M or L+4M bits in total are required. In another implementation, the foregoing indication may be a time of a random access resource, a frequency position, or an index, and/or a quantity of random access resources.

In another embodiment, the network device notifies the terminal of a currently used manner by using indication information. For example, when the indication information carries Flag=0, the used manner is: whether a downlink signal is transmitted and the quantity of associated random access resources are configured by using a same parameter; or when the indication information carries Flag=1, the used manner is: whether a downlink signal group is transmitted and the quantity of associated random access resources are configured by using a same parameter.

In an embodiment, whether a downlink signal group is transmitted and the quantity of associated random access resources are configured by using a same parameter. The quantity of associated random access resources may be a total quantity of random access resources associated with the downlink signal group, or a quantity of random access resources associated with downlink signals in the downlink signal group. Quantities of random access resources associated with downlink signals in a same downlink signal group are the same. For example, when the frequency band is higher than 6 GHz, downlink signals are classified into L groups, and each group includes M signals. For each downlink signal group, 2 to 4 (or more) bits, 2L or 3L or 4L bits in total, are used to indicate whether the downlink signal group is transmitted and a quantity of associated random access resources. To be specific, 2L+M or 3L+M or 4L+M bits in total are required for indicating an actually transmitted downlink signal group, actually transmitted downlink signals in the downlink signal group, and a quantity of random access resources associated with each downlink signal.

In another embodiment, the foregoing parameters are configured based on the downlink signal group. For example, during random access, at least the following parameters are required: whether a downlink signal group is transmitted, transmit power of the downlink signal group, a transmit beamforming gain on the network device, a quantity of associated random access resources, initial preamble received power on a random access resource corresponding to the downlink signal group, and a receive beamforming gain on the network device, but the foregoing parameters may be different for different downlink signal groups. Therefore, the foregoing parameters are combined for transmission. For example, any quantity of the foregoing parameters are combined, and are configured separately from remaining parameters. The parameter configuration based on the downlink signal group may be specifically as follows: Power parameters of downlink signals in a same downlink signal group are the same; or power parameters of downlink signals in a same downlink signal group are different, but power parameters of downlink signals in a same index position in different downlink signal groups are the same. A parameter configuration method based on the downlink signal group is similar to the foregoing parameter configuration method based on the downlink signal. Details are not described herein again.

In another embodiment, the transmit power of the downlink signal, the transmit beamforming gain on the network device, the initial preamble received power on the random access resource corresponding to the downlink signal, and the receive beamforming gain on the network device are configured by using two parameters separately, for example, a transmit power parameter of the network device and a received power parameter of the network device. The two parameters may be combinations of the foregoing four parameters. For example, the transmit power of the network device includes at least the transmit power of the downlink signal, and the received power parameter of the network device includes at least the initial preamble received power. For another example, the transmit power of the network device includes the transmit power of the downlink signal and a transmit/receive beamforming gain difference on the network device, and the received power parameter of the network device includes the initial preamble received power. For another example, the transmit power of the network device is the transmit power of the downlink signal, and the received power parameter of the network device includes the initial preamble received power and a transmit/receive beamforming gain difference on the network device. The two parameters may be transmitted in a plurality of manners. For example, manner 1: a transmit power parameter of the network device and a received power parameter of the network device are configured for each downlink signal (or downlink signal group) separately; manner 2: for a transmit power parameter of the network device for each downlink signal (or downlink signal group), refer to the transmit power parameter of the network device and a transmit power offset corresponding to the downlink signal (or downlink signal group), and for a received power parameter of the network device for each downlink signal (or downlink signal group), refer to the received power parameter of the network device and a received power offset corresponding to the downlink signal (or downlink signal group). In the manner 2, whether a downlink signal (or downlink signal group) is transmitted may be combined with the transmit power offset and the received power offset for transmission.

For example, in an embodiment, whether a downlink signal is transmitted and the received power offset are configured by using a same parameter. When the frequency band is lower than 3 GHz, for each downlink signal, 2 to 4 (or more) bits, 8 or 12 or 16 bits in total, are used to indicate whether the downlink signal is transmitted and the received power offset. Using two bits per downlink signal as an example, eight bits in total are required. A downlink signal m is indicated by using bits $2m$ and $2m+1$. When the bits $2m$ and $2m+1$ are 00, it indicates that the downlink signal is not transmitted; when the bits $2m$ and $2m+1$ are 01, it indicates that the downlink signal is transmitted, and a received power offset corresponding to the downlink signal is p1 (dBm); when the bits $2m$ and $2m+1$ are 00, it indicates that the downlink signal is transmitted, and a received power offset corresponding to the downlink signal is p2 (dBm); or when the bits $2m$ and $2m+1$ are 11, it indicates that the downlink signal is transmitted, and a received power offset corresponding to the downlink signal is p3 (dBm). Herein p1, p2, and p3 are predefined or prestored values. Similarly, when the frequency band is higher than 3 GHz and is not higher than 6 GHz, 8*2 or 8*3 or 8*4, that is, 16 or 24 or 32 bits, may be required; or when the frequency band is higher than 6 GHz, L bits are used to indicate an actually transmitted downlink signal group, and to indicate a quantity of downlink signals, M*2 or M*3 or M*4 bits are required. To be specific, L+2M or L+3M or L+4M bits in total are required. A method for configuring whether the downlink signal is transmitted and the transmit power offset by using a same parameter, and configuring whether the downlink signal is transmitted and the received power offset by using a same parameter is similar to the foregoing method. Details are not described herein again.

In another implementation, the methods in the foregoing embodiments may be combined in any manner. Details are not described herein again.

In another embodiment, values in a random access configuration table are relative slot positions. An actual slot position of a random access resource needs to be determined based on a subcarrier spacing, relative slot positions in all random access configuration tables corresponding to a maximum quantity of downlink signals, and a time offset position of a downlink signal. The time offset position of the downlink signal is a time offset of the downlink signal relative to a time or a slot in which a reference downlink signal is transmitted. For example, the time at which the reference downlink signal is transmitted is in a time 0 (that is, a slot 0) in 0 to 5 ms (that is, slots 0 to $5*2^u-1$) in a system frame, where u is a downlink signal subcarrier index or a reference subcarrier spacing index corresponding to the downlink signal time. In an embodiment, if the time offset between the time at which the downlink signal is transmitted and the time or the slot in which the reference downlink signal is transmitted is T_Offset (ms or slot index), relative slot positions specified in all configuration tables need to be adjusted based on the T_offset, to obtain an actual slot position. To be specific, the actual slot position of the random access resource is related to the T_offset and a slot position specified by a corresponding random access configuration index.

In an NR system, because a bandwidth of a downlink synchronization signal SS block or a PBCH block is 288 subcarriers, when a subcarrier spacing of a random access preamble is the same as that of the downlink synchronization signal block, the bandwidth of the downlink synchronization signal block may support positions of two random access resources. Therefore, only two positions are required in time domain, and four possible different positions of the random access resources may be provided. Therefore, random access can be performed at a same frequency in four neighboring cells, random access is performed in different time-frequency positions in different cells, and no mutual interference exists. It should be noted that, an LTE design criterion is that three cells do not interfere with each other, and only one random access resource can be placed within a minimum system bandwidth 1.25 MHz in an LTE system. Therefore, three positions are required in frequency domain.

Figure 20:
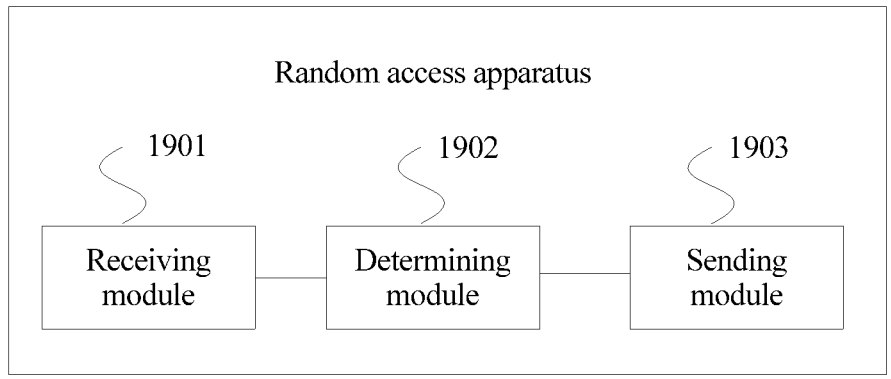
FIG. 20 is a schematic structural diagram of a random access apparatus according to an embodiment of this application.

FIG. 20 is a schematic structural diagram of a random access apparatus according to an embodiment of this application. The apparatus is integrated in a terminal or is a chip or a functional module integrated in a terminal. As shown in FIG. 20, the apparatus includes a receiving module 1901, a determining module 1902, and a sending module 1903.

The receiving module 1901 is configured to receive first indication information transmitted by a network device, where the first indication information is used to indicate a random access configuration index.

The determining module 1902 is configured to determine a random access resource based on the random access configuration index, and determine, based on an association relationship between the random access resource and a downlink signal, a random access resource corresponding to the downlink signal.

The sending module 1903 is configured to transmit a random access preamble to the network device based on the random access resource corresponding to the downlink signal.

Optionally, the association relationship between the random access resource and the downlink signal includes an indexing mode of the random access resource.

Optionally, the determining module 1902 is specifically configured to: first determine, at a time of the random access resource based on the indexing mode of the random access resource and a quantity of random access resources at a same time, a time t of the random access resource corresponding to the downlink signal, and then determine, at the time t, a frequency position f of the random access resource corresponding to the downlink signal; or first determine, within a time of the random access resource in frequency domain based on the indexing mode of the random access resource and a quantity of random access resources at a same time, a frequency position f of the random access resource corresponding to the downlink signal, and then determine, in the frequency position f, a time t of the random access resource corresponding to the downlink signal; or first determine, in N slots or subframes in a period of the random access resource based on the indexing mode of the random access resource and a quantity of random access resources at a same time, a time t of the random access resource corresponding to the downlink signal, and then determine, at the time t, a frequency position f of the random access resource corresponding to the downlink signal, where N is an integer greater than 0.

Optionally, the determining module 1902 is specifically configured to determine a time range of the random access resource based on the random access configuration index and one or more of a subcarrier spacing of the random access preamble, a sequence length of the random access preamble, a maximum quantity of downlink signal blocks, and an actually transmitted downlink signal block.

Optionally, the determining module 1902 is further configured to: before the sending module transmits the random access preamble to the network device based on the random access resource corresponding to the downlink signal, determine a time of the random access resource in the time range of the random access resource based on preset structure information of a slot or a subframe; or receive second indication information transmitted by the network device, where the second indication information includes structure information of a random access slot or subframe; and determine a time of the random access resource in the time range of the random access resource based on the structure information of the random access slot or subframe.

Optionally, the determining module 1902 is further configured to obtain a preset indexing mode of the random access resource; or the receiving module is further configured to receive third indication information transmitted by the network device, where the third indication information is used to indicate the indexing mode of the random access resource.

Optionally, the determining module 1902 is further configured to determine a format and a system frame position of the random access preamble in the time range of the random access resource based on the random access configuration index and one or more of the subcarrier spacing of the random access preamble, the sequence length of the random access preamble, the maximum quantity of downlink signal blocks, and the actually transmitted downlink signal block.

Optionally, the receiving module 1901 is further configured to receive fourth indication information transmitted by the network device, where the fourth indication information is used to indicate the actually transmitted downlink signal block.

Figure 21:
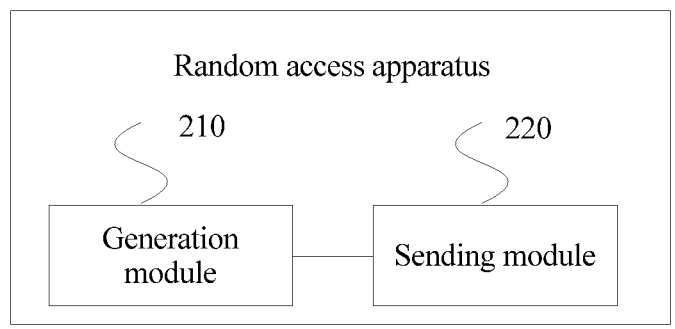
FIG. 21 is a schematic structural diagram of a random access apparatus according to another embodiment of this application.

FIG. 21 is a schematic structural diagram of a random access apparatus according to another embodiment of this application. The apparatus may be a network device, or is a chip or a functional module integrated in a network device. As shown in FIG. 21, the apparatus includes a generation module 210 and a sending module 220.

The generation module 210 is configured to generate first indication information, where the first indication information is used to indicate a random access configuration index.

The sending module 220 is configured to transmit the first indication information to a terminal, where a random access resource of the terminal is determined based on the random access configuration index, and a random access resource corresponding to a downlink signal is determined based on an association relationship between the random access resource and the downlink signal.

Optionally, the association relationship between the random access resource and the downlink signal includes an indexing mode of the random access resource.

In a possible implementation, the indexing mode of the random access resource includes: first determining, at a time of the random access resource based on the indexing mode of the random access resource and a quantity of random access resources at a same time, a time t of the random access resource corresponding to the downlink signal, and then determining, at the time t, a frequency position f of the random access resource corresponding to the downlink signal; or first determining, within a time of the random access resource in frequency domain based on the indexing mode of the random access resource and a quantity of random access resources at a same time, a frequency position f of the random access resource corresponding to the downlink signal, and then determining, in the frequency position f, a time t of the random access resource corresponding to the downlink signal; or first determining, in N slots or subframes in a period of the random access resource based on the indexing mode of the random access resource and a quantity of random access resources at a same time, a time t of the random access resource corresponding to the downlink signal, and then determining, at the time t, a frequency position f of the random access resource corresponding to the downlink signal, where N is an integer greater than 0.

Optionally, a time range of the random access resource is determined based on the random access configuration index and one or more of a subcarrier spacing of a random access preamble, a sequence length of a random access preamble, a maximum quantity of downlink signal blocks, and an actually transmitted downlink signal block.

In another implementation, the sending module 220 is further configured to transmit second indication information to the terminal, where the second indication information includes structure information of a random access slot or subframe, and a time of the random access resource is determined in the time range of the random access resource based on the structure information of the random access slot or subframe.

The sending module 220 is further configured to transmit third indication information to the terminal, where the third indication information is used to indicate the indexing mode of the random access resource, and the random access resource corresponding to the downlink signal is determined within the time of the random access resource based on the indexing mode of the random access resource.

Further, a format and a system frame position of the random access preamble in the time range of the random access resource are determined based on the random access configuration index and one or more of the subcarrier spacing of the random access preamble, the sequence length of the random access preamble, the maximum quantity of downlink signal blocks, and the actually transmitted downlink signal block.

Optionally, the sending module 220 is further configured to transmit fourth indication information to the terminal, where the fourth indication information is used to indicate the actually transmitted downlink signal block.

The foregoing apparatus may be configured to perform the method provided in the foregoing method embodiment. A specific implementation and a technical effect of the apparatus are similar to those of the method embodiment, and details are not described herein again.

It should be understood that division of modules of the apparatus is merely logical function division, and the modules may be all or partially integrated in one physical entity or may be physically separated in actual implementation. The modules may be all implemented in a form of software and invoked by a processing element, or may be all implemented in a form of hardware; or some modules may be implemented in a form of software and invoked by a processing element, and some modules are implemented in a form of hardware. For example, the determining module may be a processing element separately disposed, or may be integrated in a chip of the foregoing apparatus for implementation. In addition, the determining module may be stored in a memory of the foregoing apparatus in a form of program code, and is invoked by a processing element of the foregoing apparatus to perform a function of the foregoing determining module. Implementations of other modules are similar to this. In addition, the modules may be all or partially integrated, or may be implemented separately. The processing element may be an integrated circuit and has a signal processing capability. In an implementation process, steps in the foregoing methods or the foregoing modules may be implemented by using a hardware integrated logic circuit in the processing element, or by using instructions in a form of software.

For example, the modules may be configured as one or more integrated circuits for implementing the foregoing method, for example, one or more application-specific integrated circuits (ASIC), one or more microprocessors (digital signal processor, DSP), or one or more field programmable gate arrays (FPGA). For another example, when a module is implemented in a form of program code and invoked by a processing element, the processing element may be a general-purpose processor, for example, a central processing unit (CPU) or another processor that can invoke the program code. For another example, the modules may be integrated together, and implemented in a form of a system-on-a-chip (SOC).

Figure 22:
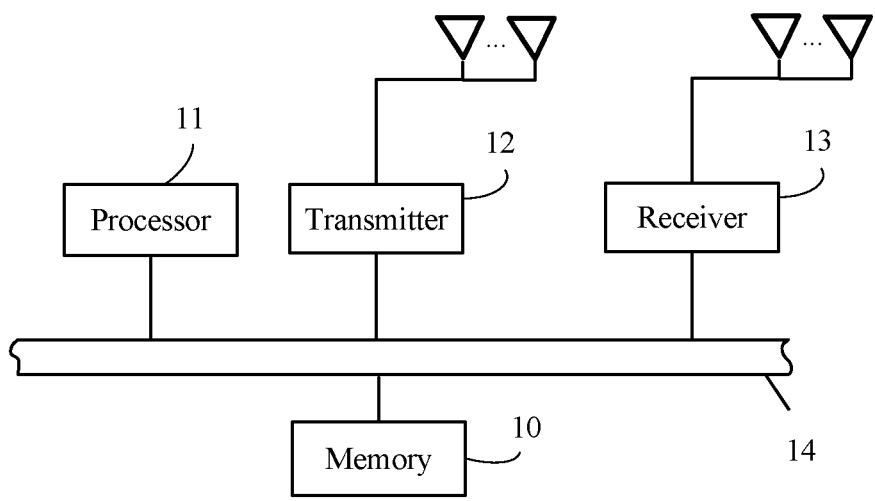
FIG. 22 is a schematic structural diagram of a random access apparatus according to another embodiment of this application.

FIG. 22 is a schematic structural diagram of a random access apparatus according to another embodiment of this application. The apparatus may be integrated in the foregoing network device or terminal. As shown in FIG. 22, the apparatus includes a memory 10, a processor 11, a transmitter 12, and a receiver 13.

The memory 10 may be an independent physical unit, and may be connected to the processor 11, the transmitter 12, and the receiver 13 by using a bus 14. Alternatively, the memory 10, the processor 11, the transmitter 12, and the receiver 13 may be integrated together and implemented by hardware, or the like.

The transmitter 12 and the receiver 13 may be further connected to antennas. The receiver 13 receives, by using an antenna, information transmitted by another device. Correspondingly, the transmitter 12 transmits information to another device by using an antenna.

The memory 10 is configured to store a program for implementing the foregoing method embodiment or each module in the apparatus embodiment, and the processor 11 invokes the program to perform an operation of the foregoing method embodiment.

Optionally, when the random access method in the foregoing embodiment is completely or partially implemented by software, the random access apparatus may alternatively include only the processor. The memory configured to store a program is located outside the random access apparatus, and the processor is connected to the memory by using a circuit/wire and configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

In the foregoing embodiments, the sending module or the transmitter performs the step of transmission in the foregoing method embodiments, the receiving module or the receiver performs the step of reception in the foregoing method embodiments, and other steps are performed by other modules or processors. The sending module and the receiving module may form a transceiver module. The receiver and the transmitter may form a transceiver.

An embodiment of this application further provides a computer storage medium storing a computer program, where the computer program is used to perform the random access method provided in the foregoing embodiment.

An embodiment of this application further provides a computer program product including an instruction, where when the computer program product runs on a computer, the computer is enabled to perform the random access method provided in the foregoing embodiment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method comprising:
receiving, by a terminal, a first synchronization signal/physical broadcast channel (SS/PBCH) block from a network device;
determining, by the terminal, a first random access resource according to a mapping between the first SS/PBCH block and the first random access resource, wherein the first random access resource is in a first random access period of a plurality of random access periods, each of the plurality of random access periods comprising random access resources that are mapped to a plurality of SS/PBCH blocks transmitted by the network device, and the first one of the random access resources in each of the plurality of random access periods corresponding to a same SS/PBCH block number, and wherein the first SS/PBCH block is one of the plurality of SS/PBCH blocks transmitted by the network device; and
transmitting, by the terminal, a random access preamble to the network device based on the determined first random access resource; and
wherein a duration of the first random access period is 5 ms, 10 ms, 20 ms, 40 ms, 80 ms, 160 ms, 320 ms, or, 640 ms.

2. The method according to claim 1, wherein the plurality of SS/PBCH blocks transmitted by the network device are mapped to the random access resources in the first random access period in one or more cycles.

3. The method according to claim 1, wherein the plurality of SS/PBCH blocks transmitted by the network device are cyclically mapped to the random access resources in the first random access period, and each of the plurality of SS/PBCH blocks is mapped to a same quantity of random access resources in the first random access period.

4. The method according to claim 1, wherein the random access resources are random access occasions, and the plurality of SS/PBCH blocks transmitted by the network device are mapped to the random access occasions in the first random access period in one or more cycles, and wherein the first random access period further comprises one or more random access occasions that are not associated with any SS/PBCH block.

5. The method according to claim 1, wherein the first random access resource in the first random access period is a random access occasion;
wherein:
a number k indicating the first SS/PBCH block and an index i of the random access occasion in the first random access period satisfy $$k = \text{floor}\left(\frac{i}{F}\right);$$

or
the number k indicating the first SS/PBCH block and the index i of the random access occasion in the first random access period satisfy k=mod(i, K); or
the first random access resource is a random access preamble set in the random access occasion in the first random access period, and the number k indicating the first SS/PBCH block and the index i of the random access preamble set satisfy k=mod(i, K); and
wherein k is the number indicating the first SS/PBCH block in K SS/PBCH blocks transmitted by the network device, F is a quantity of random access occasions associated with a SS/PBCH block, and K is a quantity of SS/PBCH blocks transmitted by the network device.

6. The method according to claim 1, wherein the first random access period comprises one or more random access slots, each of the one or more random access slots comprises one or more random access time resources, and each of the one or more random access time resources comprises one or more random access occasions.

7. The method according to claim 6, wherein an index of a random access occasion of the one or more random access occasions in the first random access period is determined by:
sequentially increasing the index of the random access occasion on a first random access time resource of a first random access slot of the one or more random access slots;
increasing the first random access time resource until all of the one or more random access occasions are indexed on all random access time resources in the first random access slot; and
increasing the first random access slot until all of the one or more random access occasions are indexed on all of the one or more random access slots in the first random access period.

8. The method according to claim 6, wherein a random access occasion of the one or more random access occasions comprises M random access preamble sets with each random access preamble set comprising one or more random access preambles, wherein M is a quantity of SS/PBCH blocks mapped to the random access occasion; and
wherein a quantity of preambles in one of the M random access preamble sets is determined based on network configuration information.

9. The method according to claim 1, wherein the random access resources are random access occasions, and the plurality of SS/PBCH blocks transmitted by the network device are mapped to the random access occasions according to following steps:
the plurality of SS/PBCH blocks transmitted by the network device are sequentially mapped to random access preambles in a first random access occasion on a first random access time resource in a first random access slot based on an increasing order of random access preamble indexes;
the plurality of SS/PBCH blocks transmitted by the network device are sequentially mapped to random access occasions on the first random access time resource, based on a frequency increasing order of the random access occasions;
the plurality of SS/PBCH blocks transmitted by the network device are sequentially mapped to random access time resources in the first random access slot, based on a time increasing order of the random access time resources; and
the plurality of SS/PBCH blocks transmitted by the network device are sequentially mapped to random access slots in the first random access period, based on a slot increasing order of the random access slots.

10. The method according to claim 1, wherein the first random access resource is determined according to a carrier frequency range of the first random access resource and a random access configuration index received from the network device, and the first random access resource comprises one or more of following parameters: a random access preamble format, a system frame in which the first random access resource is located, and a subframe in which the first random access resource is located; and
wherein:
the random access preamble format corresponding to the random access configuration index is C0, and the first random access resource corresponding to the random access configuration index is located in a subframe 4 in the system frame, wherein a frame number of the system frame satisfies that the frame number modulo 4 is equal to 0; or
the random access preamble format corresponding to the random access configuration index is C0, and the first random access resource corresponding to the random access configuration index is located in a subframe 1 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 4 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 7 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 1 in the system frame, wherein a frame number of the system frame satisfies that the frame number modulo 1 is equal to 0; or
the random access preamble format corresponding to the random access configuration index is C0, and the first random access resource corresponding to the random access configuration index is located in a subframe 4 in the system frame, wherein a frame number of the system frame satisfies that the frame number modulo 1 is equal to 0; or
the random access preamble format corresponding to the random access configuration index is C0, and the first random access resource corresponding to the random access configuration index is located in a subframe 7 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 1 and 6 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 4 and 9 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 2 and 7 in the system frame, wherein a frame number of the system frame satisfies that the frame number modulo 1 is equal to 0; or the random access preamble format corresponding to the random access configuration index is C2, and the first random access resource corresponding to the random access configuration index is located in subframes 4 and 9 in the system frame, wherein a frame number of the system frame satisfies that the frame number modulo 8 is equal to 1; or the random access preamble format corresponding to the random access configuration index is C2, and the first random access resource corresponding to the random access configuration index is located in subframes 4 and 9 in the system frame, wherein a frame number of the system frame satisfies that the frame number modulo 4 is equal to 0; or the random access preamble format corresponding to the random access configuration index is C2, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is C2, and the first random access resource corresponding to the random access configuration index is located in subframes 2 and 7 in the system frame, wherein a frame number of the system frame satisfies that the frame number modulo 1 is equal to 0; or the random access preamble format corresponding to the random access configuration index is C2, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 4 in the system frame, wherein a frame number of the system frame satisfies that the frame number modulo 2 is equal to 0; or the random access preamble format corresponding to the random access configuration index is A1 or B1, and the first random access resource corresponding to the random access configuration index is located in subframes 4 and 9 in the system frame, wherein a frame number of the system frame satisfies that the frame number modulo 2 is equal to 0; or the random access preamble format corresponding to the random access configuration index is A1 or B1, and the first random access resource corresponding to the random access configuration index is located in a subframe 1 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 4 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 7 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A2 or B2, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A2 or B2, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A3 or B3, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A3 or B3, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is 0, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 9 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 9 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 9 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 9 in the system frame, wherein a frame number of the system frame satisfies that the frame number modulo 9 is equal to 1; or the random access preamble format corresponding to the random access configuration index is 2, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 2, and the first random access resource corresponding to the random access configuration index is located in a subframe 4 in the system frame, wherein a frame number of the system frame satisfies that the frame number modulo 4 is equal to 0; or the random access preamble format corresponding to the random access configuration index is 3, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 9 in the system frame, wherein a frame number of the system frame satisfies that the frame number modulo 4 is equal to 1.

11. The method according to claim 1, wherein the first random access resource is determined according to a carrier frequency range of the random access resources and a random access configuration index received from the network device, and the first random access resource comprises one or more of following parameters: a random access preamble format, a quantity of random access time resources in a slot in which the first random access resource is located; wherein:

the random access preamble format corresponding to the random access configuration index is A1, and the quantity of the random access time resources in the slot in which the first random access resource corresponding to the random access configuration index is located is 3; or the random access preamble format corresponding to the random access configuration index is A1, and the quantity of the random access time resources in the slot in which the first random access resource corresponding to the random access configuration index is located is 6; or the random access preamble format corresponding to the random access configuration index is A1, and the quantity of the random access time resources in the slot in which the first random access resource corresponding to the random access configuration index is located is 7; or the random access preamble format corresponding to the random access configuration index is B1, and the quantity of the random access time resources in the slot in which the first random access resource corresponding to the random access configuration index is located is 3; or the random access preamble format corresponding to the random access configuration index is B1, and the quantity of the random access time resources in the slot in which the first random access resource corresponding to the random access configuration index is located is 6; or the random access preamble format corresponding to the random access configuration index is B1, and the quantity of the random access time resources in the slot in which the first random access resource corresponding to the random access configuration index is located is 7; or the random access preamble format corresponding to the random access configuration index is B4, and the quantity of the random access time resources in the slot in which the first random access resource corresponding to the random access configuration index is located is 1; or the random access preamble format corresponding to the random access configuration index is A2, and the quantity of the random access time resources in the slot in which the first random access resource corresponding to the random access configuration index is located is 1; or the random access preamble format corresponding to the random access configuration index is A2, and the quantity of the random access time resources in the slot in which the first random access resource corresponding to the random access configuration index is located is 2; or the random access preamble format corresponding to the random access configuration index is A2, and the quantity of the random access time resources in the slot in which the first random access resource corresponding to the random access configuration index is located is 3; or the random access preamble format corresponding to the random access configuration index is A3, and the quantity of the random access time resources in the slot in which the first random access resource corresponding to the random access configuration index is located is 1; or the random access preamble format corresponding to the random access configuration index is A3, and the quantity of the random access time resources in the slot in which the first random access resource corresponding to the random access configuration index is located is 2; or the random access preamble format corresponding to the random access configuration index is C0, and the quantity of the random access time resources in the slot in which the first random access resource corresponding to the random access configuration index is located is 3; or the random access preamble format corresponding to the random access configuration index is C0, and the quantity of the random access time resources in the slot in which the first random access resource corresponding to the random access configuration index is located is 6; or the random access preamble format corresponding to the random access configuration index is C0, and the quantity of the random access time resources in the slot in which the first random access resource corresponding to the random access configuration index is located is 7; or the random access preamble format corresponding to the random access configuration index is C2, and the quantity of the random access time resources in the slot in which the first random access resource corresponding to the random access configuration index is located is 1; or the random access preamble format corresponding to the random access configuration index is C2, and the quantity of the random access time resources in the slot in which the first random access resource corresponding to the random access configuration index is located is 2; or the random access preamble format corresponding to the random access configuration index is A1 or B1, and the quantity of the random access time resources in the slot in which the first random access resource corresponding to the random access configuration index is located is 3; or the random access preamble format corresponding to the random access configuration index is A1 or B1, and the quantity of the random access time resources in the slot in which the first random access resource corresponding to the random access configuration index is located is 6; or the random access preamble format corresponding to the random access configuration index is A1 or B1, and the quantity of the random access time resources in the slot in which the first random access resource corresponding to the random access configuration index is located is 7; or the random access preamble format corresponding to the random access configuration index is A2 or B2, and the quantity of the random access time resources in the slot in which the first random access resource corresponding to the random access configuration index is located is 1; or the random access preamble format corresponding to the random access configuration index is A2 or B2, and the quantity of the random access time resources in the slot in which the first random access resource corresponding to the random access configuration index is located is 2; or the random access preamble format corresponding to the random access configuration index is A2 or B2, and the quantity of the random access time resources in the slot in which the first random access resource corresponding to the random access configuration index is located is 3; or the random access preamble format corresponding to the random access configuration index is A3 or B3, and the quantity of the random access time resources in the slot in which the first random access resource corresponding to the random access configuration index is located is 1; or the random access preamble format corresponding to the random access configuration index is A3 or B3, and the quantity of the random access time resources in the slot in which the first random access resource corresponding to the random access configuration index is located is 2.

12. The method according to claim 1, wherein the plurality of SS/PBCH blocks transmitted by the network device are determined according to configuration information from the network device.

13. A communication apparatus, comprising:
a non-transitory memory storage comprising instructions; and
one or more processors in communication with the memory storage, wherein the instructions, when executed by the one or more processors, cause the communication apparatus to:
receive a first synchronization signal/physical broadcast channel (SS/PBCH) block from a network device;
determine a first random access resource according to a mapping between the first SS/PBCH block and the first random access resource, wherein the first random access resource is in a first random access period of a plurality of random access periods, each of the plurality of random access periods comprising random access resources that are mapped to a plurality of SS/PBCH blocks transmitted by the network device, and the first one of the random access resources in each of the plurality of random access periods corresponding to a same SS/PBCH block number, and wherein the first SS/PBCH block is one of the plurality of SS/PBCH blocks transmitted by the network device; and
transmit a random access preamble to the network device based on the determined first random access resource; and
wherein a duration of the first random access period is 5 ms, 10 ms, 20 ms, 40 ms, 80 ms, 160 ms, 320 ms, or, 640 ms.

14. The communication apparatus according to claim 13, wherein the plurality of SS/PBCH blocks transmitted by the network device are mapped to the random access resources in the first random access period in one or more cycles.

15. The communication apparatus according to claim 13, wherein the plurality of SS/PBCH blocks transmitted by the network device are cyclically mapped to the random access resources in the first random access period, and each of the plurality of SS/PBCH blocks is mapped to a same quantity of random access resources in the first random access period.

16. The communication apparatus according to claim 13, wherein the random access resources are random access occasions, and the plurality of SS/PBCH blocks transmitted by the network device are mapped to the random access occasions in the first random access period in one or more cycles, and wherein the first random access period further comprises one or more random access occasions that are not associated with any SS/PBCH block.

17. The communication apparatus according to claim 13, wherein the first random access period comprises one or more random access slots, each of the one or more random access slots comprises one or more random access time resources, and each of the one or more random access time resources comprises one or more random access occasions.

18. The communication apparatus according to claim 17, wherein an index of a random access occasion of the one or more random access occasions in the first random access period is determined by:
sequentially increasing the index of the random access occasion on a first random access time resource of a first random access slot of the one or more random access slots;
increasing the first random access time resource until all of the one or more random access occasions are indexed on all random access time resources in the first random access slot; and
increasing the first random access slot until all of the one or more random access occasions are indexed on all of the one or more random access slots in the first random access period.

19. The communication apparatus according to claim 17, wherein a random access occasion of the one or more random access occasions comprises M random access preamble sets with each random access preamble set comprising one or more random access preambles, wherein M is a quantity of SS/PBCH blocks mapped to the random access occasion; and
wherein a quantity of preambles in one of the M random access preamble sets is determined based on network configuration information.

20. The communication apparatus according to claim 13, wherein the random access resources are random access occasions, and the plurality of SS/PBCH blocks transmitted by the network device are mapped to the random access occasions according to following steps:
the plurality of SS/PBCH blocks transmitted by the network device are sequentially mapped to random access preambles in a first random access occasion on a first random access time resource in a first random access slot based on an increasing order of random access preamble indexes;
the plurality of SS/PBCH blocks transmitted by the network device are sequentially mapped to random access occasions on the first random access time resource, based on a frequency increasing order of the random access occasions;
the plurality of SS/PBCH blocks transmitted by the network device are sequentially mapped to random access time resources in the first random access slot, based on a time increasing order of the random access time resources; and
the plurality of SS/PBCH blocks transmitted by the network device are sequentially mapped to random access slots in the first random access period, based on a slot increasing order of the random access slots.

21. The communication apparatus according to claim 13, wherein the first random access resource in the first random access period is a random access occasion;
wherein:
a number k indicating the first SS/PBCH block and an index i of the random access occasion in the first random access period satisfy $$k = \text{floor}\left(\frac{i}{F}\right);$$

or
the number k indicating the first SS/PBCH block and the index i of the random access occasion in the first random access period satisfy k=mod(i, K); or
the first random access resource is a random access preamble set in the random access occasion in the first random access period, and the number k indicating the first SS/PBCH block and the index i of the random access preamble set satisfy k=mod(i, K); and
wherein k is the number indicating the first SS/PBCH block in K SS/PBCH blocks transmitted by the network device, F is a quantity of random access occasions associated with a SS/PBCH block, and K is a quantity of SS/PBCH blocks transmitted by the network device.

22. The communication apparatus according to claim 13, wherein the first random access resource is determined according to a carrier frequency range of the first random access resource and a random access configuration index received from the network device, and the first random access resource comprises one or more of following parameters: a random access preamble format, a system frame in which the first random access resource is located, and a subframe in which the first random access resource is located; and
wherein:
the random access preamble format corresponding to the random access configuration index is C0, and the first random access resource corresponding to the random access configuration index is located in a subframe 4 in the system frame, wherein a frame number of the system frame satisfies that the frame number modulo 4 is equal to 0; or
the random access preamble format corresponding to the random access configuration index is C0, and the first random access resource corresponding to the random access configuration index is located in a subframe 1 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 4 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 7 in the system frame, wherein a frame number of the system frame satisfies that the frame number modulo 2 is equal to 0; or
the random access preamble format corresponding to the random access configuration index is C0, and the first random access resource corresponding to the random access configuration index is located in a subframe 1 in the system frame, wherein a frame number of the system frame satisfies that the frame number modulo 1 is equal to 0; or
the random access preamble format corresponding to the random access configuration index is C0, and the first random access resource corresponding to the random access configuration index is located in a subframe 4 in the system frame, wherein a frame number of the system frame satisfies that the frame number modulo 1 is equal to 0; or
the random access preamble format corresponding to the random access configuration index is C0, and the first random access resource corresponding to the random access configuration index is located in a subframe 7 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 1 and 6 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 4 and 9 in the system frame, wherein a frame number of the system frame satisfies that the frame number modulo 1 is equal to 0; or
the random access preamble format corresponding to the random access configuration index is C0, and the first random access resource corresponding to the random access configuration index is located in subframes 2 and 7 in the system frame, wherein a frame number of the system frame satisfies that the frame number modulo 1 is equal to 0; or
the random access preamble format corresponding to the random access configuration index is C2, and the first random access resource corresponding to the random access configuration index is located in subframes 4 and 9 in the system frame, wherein a frame number of the system frame satisfies that the frame number modulo 8 is equal to 1; or the random access preamble format corresponding to the random access configuration index is C2, and the first random access resource corresponding to the random access configuration index is located in subframes 4 and 9 in the system frame, wherein a frame number of the system frame satisfies that the frame number modulo 4 is equal to 0; or the random access preamble format corresponding to the random access configuration index is C2, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is C2, and the first random access resource corresponding to the random access configuration index is located in subframes 2 and 7 in the system frame, wherein a frame number of the system frame satisfies that the frame number modulo 1 is equal to 0; or the random access preamble format corresponding to the random access configuration index is C2, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 4 in the system frame, wherein a frame number of the system frame satisfies that the frame number modulo 2 is equal to 0; or the random access preamble format corresponding to the random access configuration index is A1 or B1, and the first random access resource corresponding to the random access configuration index is located in subframes 4 and 9 in the system frame, wherein a frame number of the system frame satisfies that the frame number modulo 2 is equal to 0; or the random access preamble format corresponding to the random access configuration index is A1 or B1, and the first random access resource corresponding to the random access configuration index is located in a subframe 1 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 4 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in a subframe 7 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A1 or B1, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A2 or B2, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A2 or B2, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A3 or B3, and the first random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A3 to B3, and the first random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is 0, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 9 in the system frame, wherein a frame number of the system frame satisfies that the frame number modulo 8 is equal to 1; or the random access preamble format corresponding to the random access configuration index is 0, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 0, and the first random access resource corresponding to the random access configuration index is located in a subframe 9 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 9 in the system frame, wherein a frame number of the system frame satisfies that the frame number modulo 8 is equal to 1; or the random access preamble format corresponding to the random access configuration index is 1, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 1, and the first random access resource corresponding to the random access configuration index is located in a subframe 9 in the system frame, wherein a frame number of the system frame satisfies that the frame number modulo 4 is equal to 1; or the random access preamble format corresponding to the random access configuration index is 2, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 2, and the first random access resource corresponding to the random access configuration index is located in a subframe 4 in the system frame, wherein a frame number of the system frame satisfies that the frame number modulo 4 is equal to 0; or the random access preamble format corresponding to the random access configuration index is 3, and the first random access resource corresponding to the random access configuration index is located in a subframe 1 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 4 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 7 in the system frame, wherein a frame number of the system frame satisfies that the frame number modulo 8 is equal to 1; or the random access preamble format corresponding to the random access configuration index is 3, and the first random access resource corresponding to the random access configuration index is located in a subframe 1 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 4 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 7 in the system frame, wherein a frame number of the system frame satisfies that the frame number modulo 4 is equal to 1; or the random access preamble format corresponding to the random access configuration index is 3, and the first random access resource corresponding to the random access configuration index is located in a subframe 9 in the system frame, wherein a frame number of the system frame satisfies that the frame number modulo 4 is equal to 1.

23. The communication apparatus according to claim 13, wherein the first random access resource is determined according to a carrier frequency range of the random access resources and a random access configuration index received from the network device, and the first random access resource comprises one or more of following parameters: a random access preamble format, a quantity of random access time resources in a slot in which the first random access resource is located;

wherein:

the random access preamble format corresponding to the random access configuration index is A1, and the quantity of the random access time resources in the slot in which the first random access resource corresponding to the random access configuration index is located is 3; or the random access preamble format corresponding to the random access configuration index is A1, and the quantity of the random access time resources in the slot in which the first random access resource corresponding to the random access configuration index is located is 6; or the random access preamble format corresponding to the random access configuration index is A1, and the quantity of the random access time resources in the slot in which the first random access resource corresponding to the random access configuration index is located is 7; or the random access preamble format corresponding to the random access configuration index is B1, and the quantity of the random access time resources in the slot in which the first random access resource corresponding to the random access configuration index is located is 3; or the random access preamble format corresponding to the random access configuration index is B1, and the quantity of the random access time resources in the slot in which the first random access resource corresponding to the random access configuration index is located is 6; or the random access preamble format corresponding to the random access configuration index is B1, and the quantity of the random access time resources in the slot in which the first random access resource corresponding to the random access configuration index is located is 7; or the random access preamble format corresponding to the random access configuration index is B4, and the quantity of the random access time resources in the slot in which the first random access resource corresponding to the random access configuration index is located is 1; or the random access preamble format corresponding to the random access configuration index is A2, and the quantity of the random access time resources in the slot in which the first random access resource corresponding to the random access configuration index is located is 1; or the random access preamble format corresponding to the random access configuration index is A2, and the quantity of the random access time resources in the slot in which the first random access resource corresponding to the random access configuration index is located is 2; or the random access preamble format corresponding to the random access configuration index is A2, and the quantity of the random access time resources in the slot in which the first random access resource corresponding to the random access configuration index is located is 3; or the random access preamble format corresponding to the random access configuration index is A3, and the quantity of the random access time resources in the slot in which the first random access resource corresponding to the random access configuration index is located is 1; or the random access preamble format corresponding to the random access configuration index is A3, and the quantity of the random access time resources in the slot in which the first random access resource corresponding to the random access configuration index is located is 2; or the random access preamble format corresponding to the random access configuration index is C0, and the quantity of the random access time resources in the slot in which the first random access resource corresponding to the random access configuration index is located is 3; or the random access preamble format corresponding to the random access configuration index is C0, and the quantity of the random access time resources in the slot in which the first random access resource corresponding to the random access configuration index is located is 6; or the random access preamble format corresponding to the random access configuration index is C0, and the quantity of the random access time resources in the slot in which the first random access resource corresponding to the random access configuration index is located is 7; or the random access preamble format corresponding to the random access configuration index is C2, and the quantity of the random access time resources in the slot in which the first random access resource corresponding to the random access configuration index is located is 1; or the random access preamble format corresponding to the random access configuration index is C2, and the quantity of the random access time resources in the slot in which the first random access resource corresponding to the random access configuration index is located is 2; or the random access preamble format corresponding to the random access configuration index is A1 or B1, and the quantity of the random access time resources in the slot in which the first random access resource corresponding to the random access configuration index is located is 3; or
the random access preamble format corresponding to the random access configuration index is A1 or B1, and the quantity of the random access time resources in the slot in which the first random access resource corresponding to the random access configuration index is located is 6; or
the random access preamble format corresponding to the random access configuration index is A1 or B1, and the quantity of the random access time resources in the slot in which the first random access resource corresponding to the random access configuration index is located is 7; or
the random access preamble format corresponding to the random access configuration index is A2 or B2, and the quantity of the random access time resources in the slot in which the first random access resource corresponding to the random access configuration index is located is 1; or
the random access preamble format corresponding to the random access configuration index is A2 or B2, and the quantity of the random access time resources in the slot in which the first random access resource corresponding to the random access configuration index is located is 2; or
the random access preamble format corresponding to the random access configuration index is A2 or B2, and the quantity of the random access time resources in the slot in which the first random access resource corresponding to the random access configuration index is located is 3; or
the random access preamble format corresponding to the random access configuration index is A3 or B3, and the quantity of the random access time resources in the slot in which the first random access resource corresponding to the random access configuration index is located is 1; or
the random access preamble format corresponding to the random access configuration index is A3 or B3, and the quantity of the random access time resources in the slot in which the first random access resource corresponding to the random access configuration index is located is 2.

24. The communication apparatus according to claim 13, wherein the plurality of SS/PBCH blocks transmitted by the network device are determined according to configuration information from the network device.

25. A method comprising:
transmitting, by a network device, a synchronization signal/physical broadcast channel (SS/PBCH) block to a terminal;
determining, by the network device, a random access resource according to a mapping between the SS/PBCH block and the random access resource, wherein the random access resource is in a random access period of a plurality of random access periods, each of the plurality of random access periods comprising random access resources that are mapped to a plurality of SS/PBCH blocks, and the first one of the random access resources in each of the plurality of random access periods corresponding to a same SS/PBCH block number, and wherein the SS/PBCH block is one of the plurality of SS/PBCH blocks, and a duration of the random access period is 5 ms, 10 ms, 20 ms, 40 ms, 80 ms, 160 ms, 320 ms, or, 640 ms; and
receiving, by the network device, a random access preamble from the terminal based on the determined random access resource.

26. The method according to claim 25, wherein the plurality of SS/PBCH blocks transmitted by the network device are cyclically mapped to the random access resources in the random access period, and each of the plurality of SS/PBCH blocks is mapped to a same quantity of random access resources in the random access period.

27. The method according to claim 25, wherein the random access resources are random access occasions, and the plurality of SS/PBCH blocks transmitted by the network device are mapped to the random access occasions in the random access period in one or more cycles, and wherein the random access period further comprises one or more random access occasions that are not associated with any SS/PBCH block.

28. The method according to claim 25, wherein the random access resource in the random access period is a random access occasion;
wherein:
a number k indicating the SS/PBCH block and an index i of the random access occasion in the random access period satisfy $$k = \text{floor}\left(\frac{i}{F}\right);$$

or
the number k indicating the SS/PBCH block and the index i of the random access occasion in the random access period satisfy k=mod (i, K); or
the random access resource is a random access preamble set in the random access occasion in the random access period, and the number k indicating the SS/PBCH block and the index i of the random access preamble set satisfy k=mod (i, K); and
wherein k is the number indicating the SS/PBCH block in K SS/PBCH blocks transmitted by the network device, F is a quantity of random access occasions associated with a SS/PBCH block, and K is a quantity of SS/PBCH blocks transmitted by the network device.

29. The method according to claim 25, wherein the random access resources are random access occasions, and the plurality of SS/PBCH blocks transmitted by the network device are mapped to the random access occasions according to following steps:
the plurality of SS/PBCH blocks transmitted by the network device are sequentially mapped to random access preambles in a random access occasion on a random access time resource in a random access slot based on an increasing order of random access preamble indexes;
the plurality of SS/PBCH blocks transmitted by the network device are sequentially mapped to random access occasions on the random access time resource, based on a frequency increasing order of the random access occasions;
the plurality of SS/PBCH blocks transmitted by the network device are sequentially mapped to random access time resources in the random access slot, based on a time increasing order of the random access time resources; and
the plurality of SS/PBCH blocks transmitted by the network device are sequentially mapped to random access slots in the random access period, based on a slot increasing order of the random access slots.

30. The method according to claim 25, wherein the random access resource is determined according to a carrier frequency range of the random access resource and a random access configuration index received from the network device, and the random access resource comprises one or more of following parameters: a random access preamble format, a system frame in which the random access resource is located, and a subframe in which the random access resource is located; and
wherein:
the random access preamble format corresponding to the random access configuration index is C0, and the random access resource corresponding to the random access configuration index is located in a subframe 4 in the system frame, wherein a frame number of the system frame satisfies that the frame number modulo 4 is equal to 0; or
the random access preamble format corresponding to the random access configuration index is C0, and the random access resource corresponding to the random access configuration index is located in a subframe 1 in the system frame, wherein a frame number of the system frame satisfies that the frame number modulo 2 is equal to 0; or the random access preamble format corresponding to the random access configuration index is C0, and the random access resource corresponding to the random access configuration index is located in a subframe 4 in the system frame, wherein a frame number of the system frame satisfies that the frame number modulo 2 is equal to 0; or
the random access preamble format corresponding to the random access configuration index is C0, and the random access resource corresponding to the random access configuration index is located in a subframe 7 in the system frame, wherein a frame number of the system frame satisfies that the frame number modulo 2 is equal to 0; or
the random access preamble format corresponding to the random access configuration index is C0, and the random access resource corresponding to the random access configuration index is located in a subframe 1 in the system frame, wherein a frame number of the system frame satisfies that the frame number modulo 1 is equal to 0; or
the random access preamble format corresponding to the random access configuration index is C0, and the random access resource corresponding to the random access configuration index is located in a subframe 4 in the system frame, wherein a frame number of the system frame satisfies that the frame number modulo 1 is equal to 0; or
the random access preamble format corresponding to the random access configuration index is C0, and the random access resource corresponding to the random access configuration index is located in a subframe 7 in the system frame, wherein a frame number of the system frame satisfies that the frame number modulo 1 is equal to 0; or
the random access preamble format corresponding to the random access configuration index is C0, and the random access resource corresponding to the random access configuration index is located in subframes 1 and 6 in the system frame, wherein a frame number of the system frame satisfies that the frame number modulo 1 is equal to 0; or
the random access preamble format corresponding to the random access configuration index is C0, and the random access resource corresponding to the random access configuration index is located in subframes 4 and 9 in the system frame, wherein a frame number of the system frame satisfies that the frame number modulo 1 is equal to 0; or
the random access preamble format corresponding to the random access configuration index is C0, and the random access resource corresponding to the random access configuration index is located in subframes 2 and 7 in the system frame, wherein a frame number of the system frame satisfies that the frame number modulo 1 is equal to 0; or
the random access preamble format corresponding to the random access configuration index is C2, and the random access resource corresponding to the random access configuration index is located in subframes 4 and 9 in the system frame, wherein a frame number of the system frame satisfies that the frame number modulo 8 is equal to 1; or
the random access preamble format corresponding to the random access configuration index is C2, and the random access resource corresponding to the random access configuration index is located in subframes 4 and 9 in the system frame, wherein a frame number of the system frame satisfies that the frame number modulo 4 is equal to 0; or
the random access preamble format corresponding to the random access configuration index is C2, and the random access resource corresponding to the random access configuration index is located in subframes 1 and 6 in the system frame, wherein a frame number of the system frame satisfies that the frame number modulo 1 is equal to 0; or
the random access preamble format corresponding to the random access configuration index is C2, and the random access resource corresponding to the random access configuration index is located in subframes 2 and 7 in the system frame, wherein a frame number of the system frame satisfies that the frame number modulo 1 is equal to 0; or
the random access preamble format corresponding to the random access configuration index is C2, and the random access resource corresponding to the random access configuration index is located in subframes 4 and 9 in the system frame, wherein a frame number of the system frame satisfies that the frame number modulo 1 is equal to 0; or
the random access preamble format corresponding to the random access configuration index is A1 or B1, and the random access resource corresponding to the random access configuration index is located in a subframe 4 in the system frame, wherein a frame number of the system frame satisfies that the frame number modulo 2 is equal to 0; or
the random access preamble format corresponding to the random access configuration index is A1 or B1, and the random access resource corresponding to the random access configuration index is located in subframes 4 and 9 in the system frame, wherein a frame number of the system frame satisfies that the frame number modulo 2 is equal to 0; or
the random access preamble format corresponding to the random access configuration index is A1 or B1, and the random access resource corresponding to the random access configuration index is located in a subframe 1 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in a subframe 4 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in a subframe 7 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A2 or B2, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A2 or B2, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A3 or B3, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A3 or B3, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is 0, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 9 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 9 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 9 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 9 in the system frame, wherein a frame number of the system frame satisfies that the frame number modulo 4 is equal to 1; or the random access preamble format corresponding to the random access configuration index is 2, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 2, and the random access resource corresponding to the random access configuration index is located in a subframe 4 in the system frame, wherein a frame number of the system frame satisfies that the frame number modulo 4 is equal to 0; or the random access preamble format corresponding to the random access configuration index is 3, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 9 in the system frame, wherein a frame number of the system frame satisfies that the frame number modulo 4 is equal to 1.

31. The method according to claim 25, wherein the random access resource is determined according to a carrier frequency range of the random access resources and a random access configuration index received from the network device, and the random access resource comprises one or more of following parameters: a random access preamble format, a quantity of random access time resources in a slot in which the random access resource is located;
wherein:
the random access preamble format corresponding to the random access configuration index is A1, and the quantity of the random access time resources in the slot in which the random access resource corresponding to the random access configuration index is located is 3; or the random access preamble format corresponding to the random access configuration index is A1, and the quantity of the random access time resources in the slot in which the random access resource corresponding to the random access configuration index is located is 6; or the random access preamble format corresponding to the random access configuration index is A1, and the quantity of the random access time resources in the slot in which the random access resource corresponding to the random access configuration index is located is 7; or the random access preamble format corresponding to the random access configuration index is B1, and the quantity of the random access time resources in the slot in which the random access resource corresponding to the random access configuration index is located is 3; or the random access preamble format corresponding to the random access configuration index is B1, and the quantity of the random access time resources in the slot in which the random access resource corresponding to the random access configuration index is located is 6; or the random access preamble format corresponding to the random access configuration index is B1, and the quantity of the random access time resources in the slot in which the random access resource corresponding to the random access configuration index is located is 7; or the random access preamble format corresponding to the random access configuration index is B4, and the quantity of the random access time resources in the slot in which the random access resource corresponding to the random access configuration index is located is 1; or the random access preamble format corresponding to the random access configuration index is A2, and the quantity of the random access time resources in the slot in which the random access resource corresponding to the random access configuration index is located is 1; or the random access preamble format corresponding to the random access configuration index is A2, and the quantity of the random access time resources in the slot in which the random access resource corresponding to the random access configuration index is located is 2; or the random access preamble format corresponding to the random access configuration index is A2, and the quantity of the random access time resources in the slot in which the random access resource corresponding to the random access configuration index is located is 3; or the random access preamble format corresponding to the random access configuration index is A3, and the quantity of the random access time resources in the slot in which the random access resource corresponding to the random access configuration index is located is 1; or the random access preamble format corresponding to the random access configuration index is A3, and the quantity of the random access time resources in the slot in which the random access resource corresponding to the random access configuration index is located is 2; or the random access preamble format corresponding to the random access configuration index is C0, and the quantity of the random access time resources in the slot in which the random access resource corresponding to the random access configuration index is located is 3; or the random access preamble format corresponding to the random access configuration index is C0, and the quantity of the random access time resources in the slot in which the random access resource corresponding to the random access configuration index is located is 6; or the random access preamble format corresponding to the random access configuration index is C0, and the quantity of the random access time resources in the slot in which the random access resource corresponding to the random access configuration index is located is 7; or the random access preamble format corresponding to the random access configuration index is C2, and the quantity of the random access time resources in the slot in which the random access resource corresponding to the random access configuration index is located is 1; or the random access preamble format corresponding to the random access configuration index is C2, and the quantity of the random access time resources in the slot in which the random access resource corresponding to the random access configuration index is located is 2; or the random access preamble format corresponding to the random access configuration index is A1 or Bi, and the quantity of the random access time resources in the slot in which the random access resource corresponding to the random access configuration index is located is 3; or the random access preamble format corresponding to the random access configuration index is A1 or B1, and the quantity of the random access time resources in the slot in which the random access resource corresponding to the random access configuration index is located is 6; or the random access preamble format corresponding to the random access configuration index is A1 or B1, and the quantity of the random access time resources in the slot in which the random access resource corresponding to the random access configuration index is located is 7; or the random access preamble format corresponding to the random access configuration index is A2 or B2, and the quantity of the random access time resources in the slot in which the random access resource corresponding to the random access configuration index is located is 1; or the random access preamble format corresponding to the random access configuration index is A2 or B2, and the quantity of the random access time resources in the slot in which the random access resource corresponding to the random access configuration index is located is 2; or the random access preamble format corresponding to the random access configuration index is A2 or B2, and the quantity of the random access time resources in the slot in which the random access resource corresponding to the random access configuration index is located is 3; or the random access preamble format corresponding to the random access configuration index is A3 or B3, and the quantity of the random access time resources in the slot in which the random access resource corresponding to the random access configuration index is located is 1; or the random access preamble format corresponding to the random access configuration index is A3 or B3, and the quantity of the random access time resources in the slot in which the random access resource corresponding to the random access configuration index is located is 2.

32. A communication apparatus which is a network device or comprised in the network device, comprising:
a non-transitory memory storage comprising instructions; and
one or more processors in communication with the memory storage, wherein the instructions, when executed by the one or more processors, cause the communication apparatus to:

transmit a synchronization signal/physical broadcast channel (SS/PBCH) block to a terminal;

determine a random access resource according to a mapping between the SS/PBCH block and the random access resource, wherein the random access resource is in a random access period of a plurality of random access periods, each of the plurality of random access periods comprising random access resources that are mapped to a plurality of SS/PBCH blocks, and the first one of the random access resources in each of the plurality of random access periods corresponding to a same SS/PBCH block number, and wherein the SS/PBCH block is one of the plurality of SS/PBCH blocks, and a duration of the random access period is 5 ms, 10 ms, 20 ms, 40 ms, 80 ms, 160 ms, 320 ms, or, 640 ms; and receive a random access preamble from the terminal based on the determined random access resource.

33. The communication apparatus according to claim 32, wherein the plurality of SS/PBCH blocks transmitted by the network device are cyclically mapped to the random access resources in the random access period, and each of the plurality of SS/PBCH blocks is mapped to a same quantity of random access resources in the random access period.

34. The communication apparatus according to claim 32, wherein the random access resources are random access occasions, and the plurality of SS/PBCH blocks transmitted by the network device are mapped to the random access occasions in the random access period in one or more cycles, and wherein the random access period further comprises one or more random access occasions that are not associated with any SS/PBCH block.

35. The communication apparatus according to claim 32, wherein the random access resource in the random access period is a random access occasion;

wherein:
a number k indicating the SS/PBCH block and an index i of the random access occasion in the random access period satisfy $$k = \text{floor}\left(\frac{i}{F}\right);$$

or
the number k indicating the SS/PBCH block and the index i of the random access occasion in the random access period satisfy k=mod (i, K); or
the random access resource is a random access preamble set in the random access occasion in the random access period, and the number k indicating the SS/PBCH block and the index i of the random access preamble set satisfy k=mod (i, K); and
wherein k is the number indicating the SS/PBCH block in K SS/PBCH blocks transmitted by the network device, F is a quantity of random access occasions associated with a SS/PBCH block, and K is a quantity of SS/PBCH blocks transmitted by the network device.

36. The communication apparatus according to claim 32, wherein the random access resources are random access occasions, and the plurality of SS/PBCH blocks transmitted by the network device are mapped to the random access occasions according to following steps:

the plurality of SS/PBCH blocks transmitted by the network device are sequentially mapped to random access preambles in a random access occasion on a random access time resource in a random access slot based on an increasing order of random access preamble indexes;

the plurality of SS/PBCH blocks transmitted by the network device are sequentially mapped to random access occasions on the random access time resource, based on a frequency increasing order of the random access occasions;

the plurality of SS/PBCH blocks transmitted by the network device are sequentially mapped to random access time resources in the random access slot, based on a time increasing order of the random access time resources; and the plurality of SS/PBCH blocks transmitted by the network device are sequentially mapped to random access slots in the random access period, based on a slot increasing order of the random access slots.

37. The communication apparatus according to claim 32, wherein the random access resource is determined according to a carrier frequency range of the random access resource and a random access configuration index received from the network device, and the random access resource comprises one or more of following parameters: a random access preamble format, a system frame in which the random access resource is located, and a subframe in which the random access resource is located; and wherein:
the random access preamble format corresponding to the random access configuration index is C0, and the random access resource corresponding to the random access configuration index is located in a subframe 4 in the system frame, wherein a frame number of the system frame satisfies that the frame number modulo 4 is equal to 0; or the random access preamble format corresponding to the random access configuration index is C0, and the random access resource corresponding to the random access configuration index is located in a subframe 1 in the system frame, wherein a frame number of the system frame satisfies that the frame number modulo 2 is equal to 0; or the random access preamble format corresponding to the random access configuration index is C0, and the random access resource corresponding to the random access configuration index is located in a subframe 4 in the system frame, wherein a frame number of the system frame satisfies that the frame number modulo 2 is equal to 0; or the random access preamble format corresponding to the random access configuration index is C0, and the random access resource corresponding to the random access configuration index is located in a subframe 7 in the system frame, wherein a frame number of the system frame satisfies that the frame number modulo 2 is equal to 0; or the random access preamble format corresponding to the random access configuration index is C0, and the random access resource corresponding to the random access configuration index is located in a subframe 1 in the system frame, wherein a frame number of the system frame satisfies that the frame number modulo 1 is equal to 0; or the random access preamble format corresponding to the random access configuration index is C0, and the random access resource corresponding to the random access configuration index is located in a subframe 4 in the system frame, wherein a frame number of the system frame satisfies that the frame number modulo 1 is equal to 0; or the random access preamble format corresponding to the random access configuration index is C0, and the random access resource corresponding to the random access configuration index is located in a subframe 7 in the system frame, wherein a frame number of the system frame satisfies that the frame number modulo 1 is equal to 0; or the random access preamble format corresponding to the random access configuration index is C0, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is C0, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is C0, and the random access resource corresponding to the random access configuration index is located in subframes 2and 7 in the system frame, wherein a frame number of the system frame satisfies that the frame number modulo 1 is equal to 0; or the random access preamble format corresponding to the random access configuration index is C2, and the random access resource corresponding to the random access configuration index is located in subframes 4 and 9 in the system frame, wherein a frame number of the system frame satisfies that the frame number modulo 8 is equal to 1; or the random access preamble format corresponding to the random access configuration index is C2, and the random access resource corresponding to the random access configuration index is located in subframes 4 and 9 in the system frame, wherein a frame number of the system frame satisfies that the frame number modulo 4 is equal to 0; or the random access preamble format corresponding to the random access configuration index is C2, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is C2, and the random access resource corresponding to the random access configuration index is located in subframes 2 and 7 in the system frame, wherein a frame number of the system frame satisfies that the frame number modulo 1 is equal to 0; or the random access preamble format corresponding to the random access configuration index is C2, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in a subframe 4 in the system frame, wherein a frame number of the system frame satisfies that the frame number modulo 2 is equal to 0; or the random access preamble format corresponding to the random access configuration index is A1 or B1, and the random access resource corresponding to the random access configuration index is located in subframes 4 and 9 in the system frame, wherein a frame number of the system frame satisfies that the frame number modulo 2 is equal to 0; or the random access preamble format corresponding to the random access configuration index is A1 or B1, and the random access resource corresponding to the random access configuration index is located in a subframe 1 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in a subframe 4 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in a subframe 7 in the system frame, wherein a frame number of the system frame satisfies that the frame number modulo 1 is equal to 0; or the random access preamble format corresponding to the random access configuration index is A1 or B1, and the random access resource corresponding to the random access configuration index is located in subframes i and 6 in the system frame, wherein a frame number of the system frame satisfies that the frame number modulo i is equal to 0; or the random access preamble format corresponding to the random access configuration index is A1 or B1, and the random access resource corresponding to the random access configuration index is located in subframes 4 and 9 in the system frame, wherein a frame number of the system frame satisfies that the frame number modulo i is equal to 0; or the random access preamble format corresponding to the random access configuration index is A2 or B2, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A2 or B2, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is A3 or B3, and the random access resource corresponding to the random access configuration index is located in subframes 1 and 6 in the system frame, wherein a frame number of the system frame satisfies that the frame number modulo 1 is equal to 0; or the random access preamble format corresponding to the random access configuration index is A3 or B3, and the random access resource corresponding to the random access configuration index is located in subframes 4 and 9 in the system frame, wherein a frame number of the system frame satisfies that the frame number modulo 1 is equal to 0; or the random access preamble format corresponding to the random access configuration index is 0, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 9 in the system frame, wherein a frame number of the system frame satisfies that the frame number modulo 8 is equal to 1; or the random access preamble format corresponding to the random access configuration index is 0, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 0, and the random access resource corresponding to the random access configuration index is located in a subframe 9 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 9 in the system frame, wherein a frame number of the system frame satisfies that the frame number modulo 8 is equal to 1; or the random access preamble format corresponding to the random access configuration index is 1, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 1, and the random access resource corresponding to the random access configuration index is located in a subframe 9 in the system frame, wherein a frame number of the system frame satisfies that the frame number modulo 4 is equal to 1; or the random access preamble format corresponding to the random access configuration index is 2, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 2, and the random access resource corresponding to the random access configuration index is located in a subframe 4 in the system frame, wherein a frame number of the system frame satisfies that the frame number modulo 4 is equal to 0; or the random access preamble format corresponding to the random access configuration index is 3, and the random access resource corresponding to the random access configuration index is located in a subframe 1 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 4 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 7 in the system frame, wherein a frame number of the system frame satisfies that the frame number modulo 8 is equal to 1; or the random access preamble format corresponding to the random access configuration index is 3, and the random access resource corresponding to the random access configuration index is located in a subframe 1 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 4 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 7 in the system frame, wherein a frame number of the system frame satisfies that the frame number modulo 4 is equal to 1; or the random access preamble format corresponding to the random access configuration index is 3, and the random access resource corresponding to the random access configuration index is located in a subframe 9 in the system frame, wherein a frame number of the system frame satisfies that the frame number modulo 4 is equal to 1.

38. The communication apparatus according to claim 32, wherein the random access resource is determined according to a carrier frequency range of the random access resources and a random access configuration index received from the network device, and the random access resource comprises one or more of following parameters: a random access preamble format, a quantity of random access time resources in a slot in which the random access resource is located; wherein:

the random access preamble format corresponding to the random access configuration index is A1, and the quantity of the random access time resources in the slot in which the random access resource corresponding to the random access configuration index is located is 3; or the random access preamble format corresponding to the random access configuration index is A1, and the quantity of the random access time resources in the slot in which the random access resource corresponding to the random access configuration index is located is 6; or the random access preamble format corresponding to the random access configuration index is A1, and the quantity of the random access time resources in the slot in which the random access resource corresponding to the random access configuration index is located is 7; or the random access preamble format corresponding to the random access configuration index is B1, and the quantity of the random access time resources in the slot in which the random access resource corresponding to the random access configuration index is located is 3; or the random access preamble format corresponding to the random access configuration index is B1, and the quantity of the random access time resources in the slot in which the random access resource corresponding to the random access configuration index is located is 6; or the random access preamble format corresponding to the random access configuration index is B1, and the quantity of the random access time resources in the slot in which the random access resource corresponding to the random access configuration index is located is 7; or the random access preamble format corresponding to the random access configuration index is B4, and the quantity of the random access time resources in the slot in which the random access resource corresponding to the random access configuration index is located is 1; or the random access preamble format corresponding to the random access configuration index is A2, and the quantity of the random access time resources in the slot in which the random access resource corresponding to the random access configuration index is located is 1; or the random access preamble format corresponding to the random access configuration index is A2, and the quantity of the random access time resources in the slot in which the random access resource corresponding to the random access configuration index is located is 2; or the random access preamble format corresponding to the random access configuration index is A2, and the quantity of the random access time resources in the slot in which the random access resource corresponding to the random access configuration index is located is 3; or the random access preamble format corresponding to the random access configuration index is A3, and the quantity of the random access time resources in the slot in which the random access resource corresponding to the random access configuration index is located is 1; or the random access preamble format corresponding to the random access configuration index is A3, and the quantity of the random access time resources in the slot in which the random access resource corresponding to the random access configuration index is located is 2; or the random access preamble format corresponding to the random access configuration index is C0, and the quantity of the random access time resources in the slot in which the random access resource corresponding to the random access configuration index is located is 3; or the random access preamble format corresponding to the random access configuration index is C0, and the quantity of the random access time resources in the slot in which the random access resource corresponding to the random access configuration index is located is 6; or the random access preamble format corresponding to the random access configuration index is C0, and the quantity of the random access time resources in the slot in which the random access resource corresponding to the random access configuration index is located is 7; or the random access preamble format corresponding to the random access configuration index is C2, and the quantity of the random access time resources in the slot in which the random access resource corresponding to the random access configuration index is located is 1; or the random access preamble format corresponding to the random access configuration index is C2, and the quantity of the random access time resources in the slot in which the random access resource corresponding to the random access configuration index is located is 2; or the random access preamble format corresponding to the random access configuration index is A1 or B1, and the quantity of the random access time resources in the slot in which the random access resource corresponding to the random access configuration index is located is 3; or the random access preamble format corresponding to the random access configuration index is A1or B1, and the quantity of the random access time resources in the slot in which the random access resource corresponding to the random access configuration index is located is 6; or the random access preamble format corresponding to the random access configuration index is A1 or B1, and the quantity of the random access time resources in the slot in which the random access resource corresponding to the random access configuration index is located is 7; or the random access preamble format corresponding to the random access configuration index is A2 or B2, and the quantity of the random access time resources in the slot in which the random access resource corresponding to the random access configuration index is located is 1; or the random access preamble format corresponding to the random access configuration index is A2 or B2, and the quantity of the random access time resources in the slot in which the random access resource corresponding to the random access configuration index is located is 2; or the random access preamble format corresponding to the random access configuration index is A2 or B2, and the quantity of the random access time resources in the slot in which the random access resource corresponding to the random access configuration index is located is 3; or the random access preamble format corresponding to the random access configuration index is A3 or B3, and the quantity of the random access time resources in the slot in which the random access resource corresponding to the random access configuration index is located is 1; or the random access preamble format corresponding to the random access configuration index is A3 or B3, and the quantity of the random access time resources in the slot in which the random access resource corresponding to the random access configuration index is located is 2.

39. A communications system comprising: a terminal and a network device;
wherein the terminal is configured to:
  receive a first synchronization signal/physical broadcast channel (SS/PBCH) block from the network device;
  determine a first random access resource according to a mapping between the first SS/PBCH block and the first random access resource, wherein the first random access resource is in a first random access period of a plurality of random access periods, each of the plurality of random access periods comprising random access resources that are mapped to a plurality of SS/PBCH blocks transmitted by the network device, and the first one of the random access resources in each of the plurality of random access periods corresponding to a same SS/PBCH block number, and wherein the first SS/PBCH block is one of the plurality of SS/PBCH blocks transmitted by the network device; and
  transmit a random access preamble to the network device based on the determined first random access resource; and
the network device is configured to:
  send the first synchronization signal/physical broadcast channel (SS/PBCH) block to the terminal; and
  receive the random access preamble from the terminal; and
wherein a duration of the first random access period is 5 ms, 10 ms, 20 ms, 40 ms, 80 ms, 160 ms, 320 ms, or, 640 ms.

* * * * *

UNITED STATES PATENT AND TRADEMARK OFFICE
CERTIFICATE OF CORRECTION

PATENT NO. : 11,503,646 B2
APPLICATION NO. : 16/829928
DATED : November 15, 2022
INVENTOR(S) : Mao Yan et al.

It is certified that error appears in the above-identified patent and that said Letters Patent is hereby corrected as shown below:

In the Specification

In the Detailed Description of Illustrative Embodiments, Column 12, Line 33; delete "S3001" and insert --S301--.

In the Detailed Description of Illustrative Embodiments, Column 50, Line 64; delete "6$o$" and insert --60--.

In the Detailed Description of Illustrative Embodiments, Column 75, Line 41; delete "o" and insert --0--.

In the Detailed Description of Illustrative Embodiments, Column 82, Line 18; delete "00" insert --10--.

In the Claims

Claim 10, Column 94, Line 24; delete "9" and insert --4--.

Claim 22, Column 102, Line 37; delete "A3 to B3" and insert --A3 or B3--.

Claim 31, Column 116, Line 14; delete "A1 or Bi" and insert --A1 or B1--.

Claim 37, Column 119, Line 29; delete "2and" and insert --2 and--.

Claim 37, Column 120, Line 39; delete "i" and insert --1--.

Claim 37, Column 120, Line 41; delete "i" and insert --1--.

Signed and Sealed this
Twentieth Day of December, 2022

*Katherine Kelly Vidal*

Katherine Kelly Vidal
*Director of the United States Patent and Trademark Office*

CERTIFICATE OF CORRECTION (continued)
U.S. Pat. No. 11,503,646 B2

Claim 37, Column 120, Line 49; delete "i" and insert --1--.

Claim 38, Column 125, Line 39; delete "A1or" and insert --A1 or--.